United States Patent
Araujo et al.

(10) Patent No.: US 10,277,745 B1
(45) Date of Patent: Apr. 30, 2019

(54) ANSWERING MACHINE DETECTION FOR A CONTACT CENTER

(71) Applicant: Noble Systems Corporation, Atlanta, GA (US)

(72) Inventors: Marlon F. Araujo, Marietta, GA (US); Richard Holman, Cumming, GA (US); Chad Hitchcock, Johns Creek, GA (US); Karl H Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 15/608,405

(22) Filed: May 30, 2017

(51) Int. Cl.
| H04M 1/64 | (2006.01) |
| H04M 3/533 | (2006.01) |
| H04M 3/51 | (2006.01) |
| G10L 25/48 | (2013.01) |
| G10L 25/78 | (2013.01) |

(52) U.S. Cl.
CPC ............ H04M 3/533 (2013.01); G10L 25/48 (2013.01); G10L 25/78 (2013.01); H04M 1/642 (2013.01); H04M 3/5158 (2013.01); H04M 3/5166 (2013.01)

(58) Field of Classification Search
CPC .......... H04M 2203/2027; H04M 3/51; H04M 3/5158
USPC ........................................... 379/88.01–88.19
See application file for complete search history.

(56) References Cited

U.S. PATENT DOCUMENTS

| 5,371,787 | A | * | 12/1994 | Hamilton | H04M 1/654 379/216.01 |
| 5,581,602 | A | * | 12/1996 | Szlam | H04M 3/51 379/196 |
| 5,828,731 | A | | 10/1998 | Szlam et al. | |
| 6,850,602 | B1 | | 2/2005 | Chou | |
| 8,065,146 | B2 | | 11/2011 | Acero et al. | |
| 8,224,362 | B1 | | 7/2012 | Osinga | |
| 9,596,578 | B1 | | 3/2017 | Clark et al. | |
| 2004/0037397 | A1 | | 2/2004 | Roby | |
| 2006/0056600 | A1 | | 3/2006 | Merrow et al. | |

(Continued)

OTHER PUBLICATIONS

Asterisk-Users—AMD Detect Answering Machine, printed from http://lists.digium.com/pipermail/asterisk-users/2012-February/269986.html on Mar. 1, 2017, dated Feb. 3, 2012, 3 pages.

(Continued)

*Primary Examiner* — Solomon G Bezuayehu

(57) ABSTRACT

Answering machine detection ("AMD") processes in a contact center are improved by obtaining and storing call pickup times regarding answered calls. The call pickup time is based on the time between detection of a signaling message indicating the call was offered to the remote interface and a signaling message indicating the call was answered. The value of the call pickup time may be useful to determine if an automatic voice messaging capability ("AVMC") or a live human answered the call. In other embodiments, the call pickup time is used to generate a call pickup time weighting factor that is used to supplement the analysis of the initial audio greeting after the call has been answered to determine whether an AVMC or live person answered the call. The analysis can be used to determine whether the AVMC is an answering machine or a voice mail service.

16 Claims, 23 Drawing Sheets

A  Time Before Speech Detected – Initial Silence
B  Silence Time Between Words
C  Silence After Greeting
D  Minimum Duration of Speech to be Considered a Word
E  Duration of Analysis
F  Duration of Greeting

(56) References Cited

U.S. PATENT DOCUMENTS

| | | | |
|---|---|---|---|
| 2007/0121894 A1* | 5/2007 | Noble, Jr. ........... | H04M 3/5158 |
| | | | 379/265.02 |
| 2008/0043969 A1* | 2/2008 | Shi .................... | H04M 3/42263 |
| | | | 379/211.02 |
| 2011/0216888 A1 | 9/2011 | Bhasin et al. | |
| 2014/0220526 A1 | 8/2014 | Sylves | |
| 2017/0230504 A1* | 8/2017 | Singer ................. | H04M 3/5166 |

OTHER PUBLICATIONS

Asterisk Answering Machine Detection—Always Detects Receiver as Machine, printed from http://stackoverflow.com/questions/15714996/asterisk-answering-machine-detection-amd-always-detects-receiver-as-machine on Mar. 1, 2017, 3 pages.

Diversion Indication in SIP, RFC 5806, Internet Engineering Task Force, ISSSN 2070-1721, Mar. 2010, 53 pages.

WombatDialer: Effective Anwering-Machine Detection (AMD), printed from www.loway.ch, dated Jan. 1, 2016, 5 pages.

U.S. Appl. No. 15/459,861, Second Office Action, dated Dec. 13, 2017 (14 pages).

U.S. Appl. No. 15/700,389 Office Action, dated Dec. 14, 2017, 17 pages.

U.S. Appl. No. 15/700,389, Office Action dated Jul. 27, 2018, 6 pages, USPTO.

U.S. Appl. No. 15/700,389, Notice of Allowance, dated Oct. 3, 2018, 19 pages.

\* cited by examiner

ANSWERING MACHINE DETECTION FOR A CONTACT CENTER

FIELD OF THE DISCLOSURE

The concepts and technologies disclosed herein generally pertain to improving answering machine detection for an outbound call that originated from a contact center based on analysis of a greeting received after the call has been answered and/or the call pickup time.

BACKGROUND OF THE INVENTION

Contact centers originate outbound telephone calls for various reasons. In various applications, the calls may be directed to wireline or wireless telephone numbers and are made for the purpose of either playing an announcement or connecting an agent to speak with the called party after they have answered the call. When connecting the agent to speak with the called party after the call is answered, it may be desirous to avoid connecting the agent if an answering machine answers the call. In various contexts, if this occurs, the agent may disposition the call as being answered by an answering machine. Dispositioning the call involves the agent entering information that characterizes the outcome of the call. One way to avoid the agent being connected to an answering machine that has answered the call is to employ automation that detects and determines whether the greeting received after call has been answered has been provided by a "live" person or a voice mail/answering machine. Once it is determined that the call has been answered by a live person, then the agent may be connected to the call. If it is determined that the call has been answered by an answering machine or voice mail service, then the call may be terminated or an announcement may be played. The process of determining whether the greeting is from a live person or an answering machine is frequently known in the industry as "answering machine detection" ("AMD").

Accurately determining whether a live person or not has answered the call is important, because it increases the agent's efficiency and avoids wasting time. However, accurately determining whether a live person has answered can be difficult to determine in various situations. Typically, algorithms and techniques that detect a live person versus an automated technology are often somewhere in the 90%+ accuracy range. However, this type of accuracy measurement must be further qualified, since there are different ways of measuring accuracy. However it is measured, increasing the accuracy directly correlates to reducing wasted agent time and increasing agent productivity, so there is an obvious motivation to increase the accuracy of answering machine detection.

SUMMARY

Various embodiments are disclosed for providing increased accuracy in distinguishing whether a greeting has been provided by a live person or a voice mail/answering machine that has answered an outgoing call from a contact center. Detecting this situation is a proxy for determining whether the call was answered by the live person or the voice mail/answering machine.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
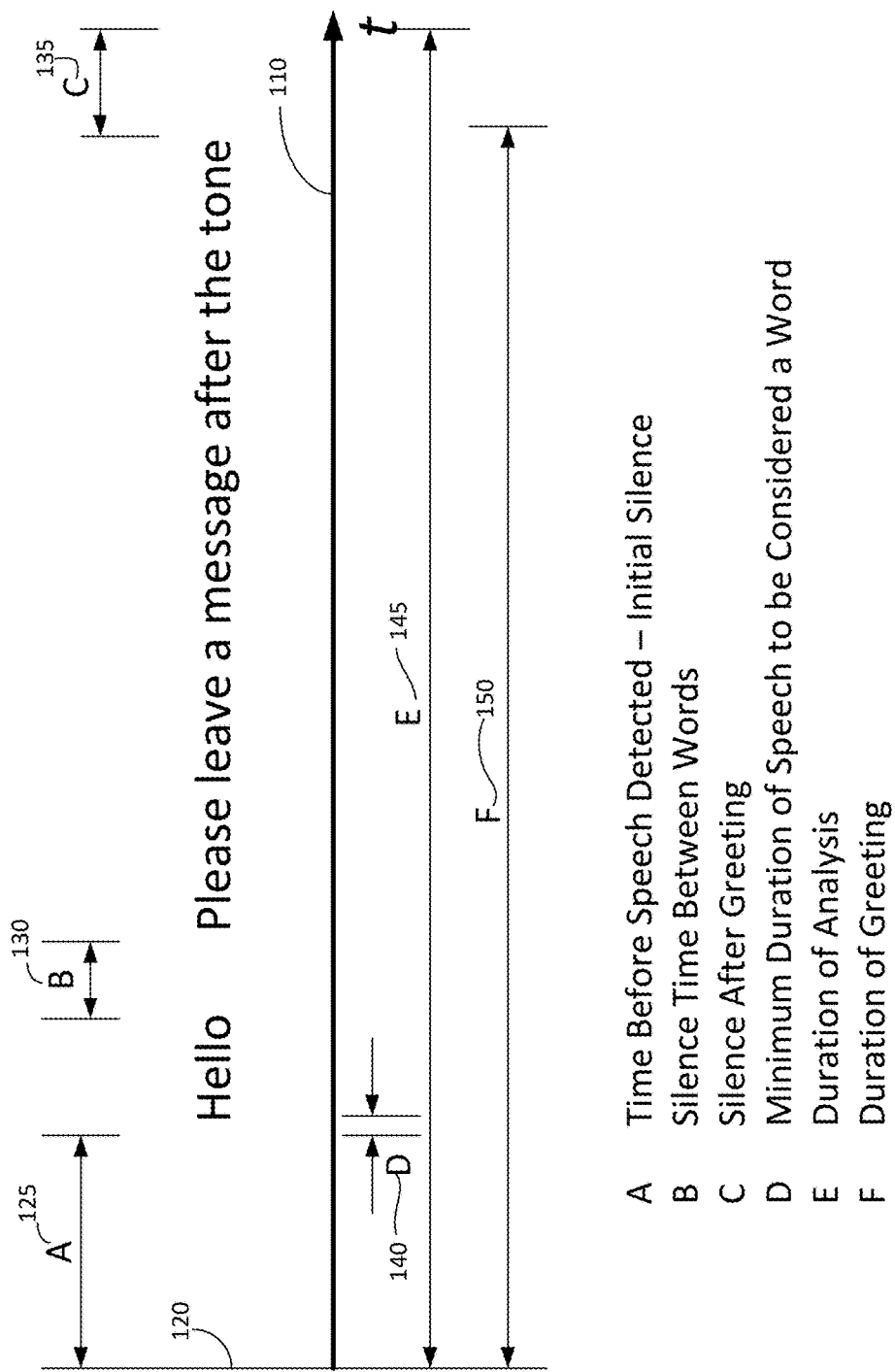
FIG. 1 illustrates some concepts involving timers used in the analysis of a greeting for purposes of ascertaining whether the greeting originated from a live person or a machine.

Contact centers originating outbound voice telephone calls frequently attempt to maximize agent utilization by only connecting the agent the when a live person (or simply "person") answers the call. The outbound call will normally encounter a limited number of outcomes after it is originated. At a high level, assuming the network successfully routes the call to the remote interface, the outbound call may be offered to the called party (i.e., causing the phone to ring) but without being answered. Another outcome is that the call could be offered and answered.

If the call is answered, then there are typically two possibilities. First, the call may be answered by a live person (i.e., an actual human being). In this case, the equipment used by the contact center for originating the call will connect the agent to the call, so the agent can converse with the answering party. In another alternative, the call may be answered by an automated system of some form. The automated system could be an answering machine or a voice mail system. The main distinction herein between these two options is largely that of ownership and control. If the equipment is owned and operated on the premises of the called party (as is the case with a conventional electronic answering machine connected to a home phone), it is referred to as an "answering machine" herein. In other cases, the called party has a service whereby unanswered calls are forwarded to network owned equipment that answers the call and takes a message. In such cases, the service is commonly referred to as "voice mail service." In this case, the subscriber does not own or maintain the equipment, but typically pays a service fee to the carrier. However, as commonly known, both answering machines and voice mail systems will "pick up" an unanswered telephone call, play a welcome greeting to the caller, and record a message from the caller. There is a technical distinction in that a call answered by a voice mail system must be forwarded when the call interface is busy or does not answer the original call. In the case of an answering machine, the call is not forwarded. Thus, an answering machine typically cannot be used for answering a second current call. As will be seen, the forwarding of a call to a voice mail system may be detected by the originating call handler.

Both options of a voice mail system and an answering machine play a greeting to the caller, allow a caller to leave a message, then, at a later time, the called party can retrieve their messages at their convenience. For purposes of simplicity, the terms "automated voice messaging capability" ("AVMC"), "answering device", "automated device", or simply "machine" are used herein and intended to encompass either a premise-based answering machine or a service provider's voice mail system.

When the contact center encounters an AVMC answering the call, the agent is frequently not connected to the call, since there is no person to speak with. The contact center may, instead, terminate the call or play a message to the answering device. Thus, it becomes evident that properly distinguishing between a person answering the call versus a machine (i.e., AVMC) is important to the contact center operator. Connecting the agent to an AVMC, when it is not desired to do so or when a live person is thought to have answered the call, wastes the agent's time and increases costs. The determination of whether the call has been answered by a person or an automated device is commonly referred to in the contact center industry as the process of "answering machine detection" or "AMD." Referring to this as "answering machine detection" is somewhat of a misnomer, as it is intended to also include detection of voice mail systems as well. To avoid confusion, the term "AMD" is used herein to refer to the detection of any automated machine detection or AVMC, and is not limited to detecting only answering machines per se. Reference to an answering machine per se is reflected by using the term "answering machine."

If the called party is a wireless subscriber, it is common that the wireless carrier will provide voice mail service to their subscriber. Thus, if the wireless phone is not answered, cannot be located, or is turned off, the call will be forwarded to a carrier operated AVMC system that will answer the call, play a welcome greeting, and store a message. If the called party is a wireline subscriber, then an answering machine may be encountered, which will answer the call after a set number of rings, play a greeting, and record the caller's message. In other cases, the wireline subscriber may subscribe to a service provider's voice mail service, which will forward the call to a voice mail system. While it is common to encounter both answering machines and voice mail services when calling wireline numbers, only voice mail services are typically encountered when calling a wireless number.

The Welcome Greeting

The welcome greeting of an AVMC may be recorded by the subscriber in whole or in part, or it may be a default greeting. Frequently, individuals may record their own greeting as a way to customize the message that a caller will hear. This is often required when a user first "sets up" a voice mail account or an answering machine. There are a wide variety of messages that individual may record for a caller to hear. Some may be humorous, short, lengthy, or generic. Some common generic messages formats include (where the customer's name or number of the called party is shown in brackets "[ ]"):

"You have reached the [Smith] residence. No one is here to take your call. Please leave a message after the tone, and we will call you back."

"Hello, this is [Sam]. I can't get to the phone now—leave a message after the beep."

"You have reached [404 881-1331]. Please leave your message."

In other cases, an AVMC system may have a default greeting that is used if the person has not recorded a custom announcement. Such an announcement may take the form of:

"The person you have dialed is not available. Please leave a message after the tone. After you are done, please hang up."

Still other AVMC systems may offer a limited custom greeting, where the subscriber is prompted to say their name, and it is inserted into a greeting, such as:

[John Doe] is unavailable. Please leave your message after the tone. After you are done, you may hang up or press 1 for more options."

Such greeting formats are commonly known, and no doubt other variations are possible. Some greetings may even include sounds, music, or other special effects. However, in most instances, they are characterized as being different from the response a live person typically provides when answering a call. A common answer provided by a person answering a phone is simply "hello." Thus, a simple basis for distinguishing between a live person's greeting and an AVMC's greeting is the length of the greeting. For simplicity, the distinction is frequently simply referred to herein as determining whether the greeting is provided by a "person" or "machine."

Obviously, there are situations where an answering party may answer by stating something more than merely "hello." For example, many people may answer by stating: "hello, this is [Sam] speaking." Thus, the greeting may be longer than a simple "hello," and it may require more sophistication in the technology used to discriminate whether the greeting is provided by a live person or an AVMC. Many conventional AMD mechanisms rely on detection of energy levels of the audio and their timing in order to determine whether the speech of the greeting of a machine or a live person.

Deconstructing the Greeting

Turning to FIG. 1, some basic timing parameters are shown that may be used to delimit and characterize a greeting. In this embodiment, the greeting is a simple "Hello" followed by a brief pause, and then the instruction "Please leave a message after the tone." This represents a typical greeting that a caller would hear when encountering an AVMC. However, the principles of delimiting the speech apply to a greeting providing by a live person. In FIG. 1, a timeline 100 is shown that represents the passage of time. The beginning of the timeline 120 begins when the call is connected with the called party, i.e., when the AVMC answers the call. This results in a backwards signaling message that is conveyed to the originating contact center, which informs the contact center that the call has been answered. Thus, although a caller (i.e., the person) may recognize this by hearing a "click" or other sound, a dialer (i.e., equipment) in a contact center will know this from the signaling message conveyed by the communications carrier. Various signaling protocols based on telephony signaling, Voice over IP ("VoIP") signaling, Session Initiation Protocol ("SIP"), Integrated Services Digital Network ("ISDN") may be used, which are well known to those skilled in the art of communication signaling. These messages convey information to processing equipment informing it that the call has been answered.

In one embodiment, the basic parameters are based on analyzing the presence of audio energy in some form. The presence of audio energy is a proxy for voice. In other words, it is assumed that the presence of audio energy reflects the presence of voice. Thus, the comparison involves determining, at a high level, whether voice or the absence of voice (silence) is present. This can also be referred to as analyzing silence and non-silence. For this reason, this approach is referred to herein as a "timer-based" approach, since it relies on defining various timer values representing different situations of when voice or silence is detected.

Frequently there is some background sound (noise) that may be captured, so some means are necessary to distinguish between what is likely background noise versus voice. This can be done by a signal-to-noise ratio for analog signals, determining if the audio is above a certain threshold for digital signals, or some other means. Those skilled in the art can identify other ways in which the presence of voice and relative silence can be detected and distinguished. For purposes herein, this type of analysis can be considered as a form of "non-linguistic" AMD. It is referred to as "non-linguistic" because it is fundamentally not concerned (in most cases) with the words, the meaning of the words, or the phonetics of the words. Rather, it is predicated on detecting silence versus speech for various time periods. It may also involve analyzing frequency ranges of the audio received. Further, the detection of speech may be based on the presence of audio data above a certain volume level and longer than a minimum duration.

Typically, there is a pause, or time period of initial silence before speech is provided by the AVMC. This is shown as Time Period A 125. The time between words is shown as a silence time in Time Period B 130. This is the inter-word silence (or silence between words) and may be used to detect the end of one word and the beginning of another.

The total time that the system may allocate to analysis of the greeting is defined by Time Period E 145, and this is required to be known in order to determine whether there is any silence after the greeting, as shown by Time Period C 135. In this example, the greeting ends before the maximum allocated analysis time 145, so there is silence time after the greeting 135. (This is not always the case.) The end time of the greeting is indication by Time Period F 150. In many instances, the full maximum allocated analysis time is not required to make a determination.

Time Period D 140 reflects the minimum duration of voice (i.e., speech energy) that is required to be considered as speech. Frequently, there may be spurious background noises when a greeting is recorded or a live person picks up a phone. These could be so short, i.e., shorter than Time Period D, so as to not be considered speech. Although not shown, the speech energy has to have a minimum level of energy (i.e., volume) in order to be considered speech. If the volume is below a certain level, it is presumed to be background noise. Similarly, if it is above the minimum level, but too short in duration, it is presumed to be background noise.

Not shown in FIG. 1 is the point when a determination may be made when that the greeting is from a machine or a person. This may occur prior to the maximum amount of time for analyzing the greeting, because in many instances a sufficiently confident determination can be made prior to the maximum amount of time. Generally, if a determination can be made sooner, with the same level of confidence, that is preferable than taking a longer time. If the determination is made sooner, but with a lower level of confidence, that is not necessarily preferable.

It should be appreciated that the terms described above can be equally described in various ways. The period of initial silence of Time Period A 125 represents silence until the first word is detected, which could be described as "initial silence", "initial silence duration", "time before first speech is detected," "pre-speech silence", etc. It should be apparent from the context and description as to the purpose of the various time periods regardless of how each are worded, and a different descriptor could be used in many instances without changing the principles disclosed herein.

Without knowing the semantics of the spoken words in the greeting, it becomes evident that distinctions can be made between speech of the greeting provided by a live person answering a call and speech of an AVMC. The difference may be based on the relative time periods of when silence and non-silence (speech) are detected. The detection of speech is somewhat of a misnomer, since in many systems the detection of speech is actually based on detecting audio signals or the presence/absence of audio energy in some form. In many instances, conventional AMD systems do not ascertain whether the audio is actually intelligible speech, as opposed to some other audible sound. Thus, in some systems, the presence of music could be confused for speech. As indicated earlier, there are threshold limits as to how "loud" the sound has to be in order to be considered as "voice" or "speech." In some embodiments, a "silence threshold" is defined as a numerical value, which distinguishes between silence and speech. This could be a value selected between e.g., 1 and 1000. Other embodiments may have a range from 0 to 32,767. A typical threshold value in this latter range may be e.g., 256 or 384.

Consider first the initial silence period shown in FIG. 1, Time Period A. In some systems, this is set at a value of 2500 milliseconds ("ms"). This value can also be referred to as a timer value. In other words, if the initial speech is detected below this timer value or threshold, the speech is assumed to be generated by a live person. If the initial speech is detected above this threshold, it is presumed to be an AVMC. Thus, the expiry of this timer value may be use to indicate the type of greeting (i.e., person or machine). Typically, a person picking up a telephone will bring the receiver to their mouth and utter the word "Hello" with minimal delay. Thus, the time between answering the call and speaking is relatively short. On the other hand, when recording a greeting on an AVMC, the user is prompted to state a greeting after a beep, and may hesitate for a moment. Thus, when the AVMC answers a call, it will play the greeting with the embedded initial silence period. Consequently, a longer initial silence period may suggest an AVMC has answered the call.

However, for every generality, there are exceptions. A busy person may pick up a phone, and be distracted for a moment before stating "hello." This would contribute to a longer initial silence period. Thus, it cannot be presumed that in every case that the expiry of this timer accurately indicates an AVMC system answering the call. Typically, the timer values are set to be optimized for the general case.

As can be expected, a confidence value may be associated with each determination. Using the above example, if the Time Period A is set to 2500 ms, and audio is detected at 2501 ms, that would suggest an AMVS, but likely with a low confidence level. Similarly, detection of audio at 2499 ms suggests the audio is from a person, but this again has a low confidence level. A determination of the confidence level is possible, based on the actual value encountered relative to the time. Thus, rather than simply providing a determination, the determination along with a confidence value may be provided. In such cases, it may be wise to consider other parameters and characteristics to bolster or refute an initial determination having a low confidence level.

Time Period B may be used to delimit words. It is quite often that when recording a greeting, the user will clearly and slowly enunciate the words of the greeting. Thus, detection of the inter-word silence period allows determination of the number of words spoken. In many cases, there are more words spoken in a greeting by an AVMC as opposed to the greeting of a live person. Frequently, a person will simply state "hello" when answering the phone whereas the AMVS provides further instructions. Although detection of words is possible by detecting speech/silence, typically there is no comprehension of the words themselves in the timer-based AMD algorithm.

The after-greeting silence, Time Period C 135 also reflects this distinction between a short versus long greeting. At noted earlier, Time Period C 135 is defined in relation to the overall time allocated for analysis, Time Period E. Thus, Time Period C will have a longer value if the speech is shorter, such as if a live person merely answers with "hello" as opposed to an AVMC providing a longer greeting. In some embodiments, a value of 500 ms is used, wherein a value of a greeting exceeding this are deemed an AVMC and lower than 500 ms is deemed a live person.

The ability to measure silence between words requires a number of parameters. This includes Time Period B, coupled with a minimum level for determining a sound is a word, along with the minimum duration of a word, allows determination of the number of words during the analysis period, Time Period E 145. Typically, an AVMC greeting will have more words than a live person's greeting. Thus, a threshold value of four words may be defined as a delimiter, wherein four or more words are determined to be an AVMC and three or fewer words are presumed to indicate a live person.

A maximum allowable duration of the greeting, Time Period F 150, may be defined. A person answering the phone will typically enter a shorter greeting than would be found on an AVMC. A live person may also speak faster, as the purpose may be merely to inform the calling party that they have answered. Thus, a live person may simply say, e.g., "yes", "hello", or [Smith] speaking", which may be a duration of under a second or two. However, an AVMC will have a greeting that is longer, typically longer than a second or two. In some embodiments, a default value of 1500 or 5000 ms is defined, such that when a longer greeting is detected, it is presumed more likely to be an AVMC and when a shorter greeting is detected, a live person is more likely to be presumed. It can be appreciated that if the greeting continues beyond this time period of when the analysis occurs, it is likely that there will be no silence after the greeting, since the greeting exceeds the analysis time. This further suggest that an AVMC is providing the greeting.

Another method of determining whether the speech is a live person of an AVMC involves measuring a duration of silence after the initial word. This involves monitoring the first instance of Time Period B 130. This reflects that a person answering a phone will likely offer a single, initial word greeting, such as "hello." In other embodiments, they may offer a rapidly spoken phrase, such as "[Smith] Residence" or "[Smith] speaking" such that it may be interpreted as a single word. In some embodiments, the Time Period B is set to a default value of 250 ms wherein a shorter value means separate words have not been detected and a longer time means separate words are presumed. A word typically is presumed to have a 300 ms duration. Thus, stating "[Smith] speaking" very rapidly may be interpreted as a single word. Frequently, if there is no immediate response, the called party (i.e., a live person) will wait a moment, and then restate their greeting or utter a follow up word ("hello?"). This would give rise to a value of Time Period B, inter-word silence, that will exceed a threshold and would be greater than if the second word was intended to be spoken in a fluid manner. For example, an AVMC greeting stating "Hello [pause] Leave a message" will have a slight pause between the "hello" and "leave." However, a live person upon stating their initial greeting and hearing silence would likely wait a longer period prior to restating their greeting. Thus, measuring the relative duration of Time Period B can further distinguish between a live person and an AVMC.

It should be apparent that are a number of timer values can be defined which would indicate or suggest a determination of whether the audio greeting originates from a person or AVMC. Further, it is apparent that a variety of algorithms and values could be defined to process the timers in order to generate such a determination of whether the greeting is from a machine or live person. While in some instances a single variable may be highly dispositive of the outcome, in other cases, a number of variables may be considered and may provide a more accurate outcome.

For purposes of reference, a variable or variables that cause such a determination of whether the greeting originated from a live person or AVMC is referred as a "trigger." Thus, in one call, the algorithm may recognize a single timer to make a determination, whereas in another call, the algorithm may use multiple variables or timers. The determination of the originator of the greeting may be manifested in a signal called herein as the Greeting Type Indicator ("GTI") which provides a greeting type indication of whether the greeting was provided by a live person or an AVMC. (The concepts of the indicator/indication are somewhat interchangeable, i.e., the GTI signal indicates information which itself is an indication). The GTI could be triggered using one, two, or more timers. As noted earlier, detecting whether the greeting was provided by a live person or AVMC is a proxy for determining whether the call was answered by a live person or an AVMC.

A very short initial greeting word ("hello") followed by nothing else, could be characterized by a short duration (e.g., less than 600 ms). If the audio greeting comprises a single speech utterance of less than 600 ms it may be deemed a live person and a single timer may be used to trigger the determination of the originator of the greeting. In some embodiments, once this is determined using this timer, the maximum time of analysis may be shortened or terminated since it is relatively likely the audio is from a live person. However, an audio greeting comprising an utterance of 641 ms does not mean the greeting is necessarily from a machine. In this case, the maximum time of analysis may be performed and other indicators are considered before generating the GTI. For example, if "hello" is the only utterance during the entire analysis, as reflected by a long Time Period C of silence after the greeting, then, this condition may be reported as a live person having answered the call. The number of timers and their values used to trigger the GTI is dependent on the algorithm implemented for making the determination.

It can be appreciated that the timers shown in FIG. 1 are not exhaustive. Further, great flexibility is afforded for how the algorithms may process the values. It could that, e.g., when a single particular timer threshold is exceeded, a determination is made and the GTI is triggered. In other embodiments, the value of the particular variable is compared to the threshold, to ascertain a confidence level, and based on the confidence level, other timer values are used to make a determination of the type of greeting is encountered. Only then is GTI triggered.

Furthermore, it can be appreciated that the modification of particular value of the default timers may depend on various factors. For example, the set of default timer values may be optimized for a certain part of the country where the called person resides. It is recognized that in certain parts of the country, people may speak faster or slower relative to other individuals in other parts of the country. Thus, in a region where called parties may speak faster, shorter default values may be used. Whereas in other areas, longer timer values may be used. It can be appreciated that this may even vary based on the age of the called person. For example, elderly persons may speak slower than, e.g., middle age or younger persons. Thus, it may be possible to adapt by using different timer values based on the characteristics of the region being called or the person expected to answer the call.

As can be appreciated, there are various options for setting the timer values and defining an algorithm for processing the results in order to provide the GTI signal. A collection of various timer-based values for a particular AMD algorithm is referred herein as an "AMD parameter set." Regardless of how a particular the set of AMD values is defined, and however the algorithm is defined, a given set of parameters used for a particular algorithm can be expected to provide a measurable overall accuracy.

In one embodiment, the accuracy can be measured as a percentage of audio greetings known to be from a live person, that when processed, are properly determined to be audio of a live person. Similarly, for audio greetings known to be from an AVMC, the accuracy could be expressed as the percentage of such greetings determined to be from an AVMC. It may be somewhat inaccurate to indicate a single number as a percentage of the overall accuracy without further qualification since properly determining whether a recording is from a human or machine involves analyzing error rates in both cases. Further, a high accuracy rate in detecting a live person may be unacceptable because of a low accuracy rate in detecting an AVMC, or vice versa.

Nevertheless, it is reported by some vendors that it is possible to properly ascertain that the recording of an audio greeting or portion thereof (referred to as an "audio snippet" herein) is from an AVMC better than 90% of the time. While this may appear to be a high accuracy rate, whenever a mistake does occur, it may adversely impact a contact center. Recall that contact centers often connect an agent when a live person is encountered and terminate the call if an AVMC is encountered. If an AVMC is mistakenly determined, when in fact, the audio is from a live person, then the contact center may be configured to terminate the call (because, the audio was incorrectly deemed from an AVMC). The called person will answer the call, provide an initial greeting, which if mistaken as an AVMC will result in the call being terminated. The called party then experiences that the call is terminated. This results in poor customer service, frustrated individuals, and may violate various state or federal regulations. To avoid this problem, contact centers may configure the equipment to err on presuming the greeting is from a person. However, if an AVMC answers the call, and the contact center mistakenly determines it to be a live person, the contact center will connect the call to an agent, who is then interacting with an AVMC. This is generally viewed as undesirable and potentially a waste of the agent's time.

As will be seen, various techniques and methods are provided for improving the overall accuracy of the AMD processing. However, first it is useful to review the context in which the principles and technologies herein operate.

Figure 2:
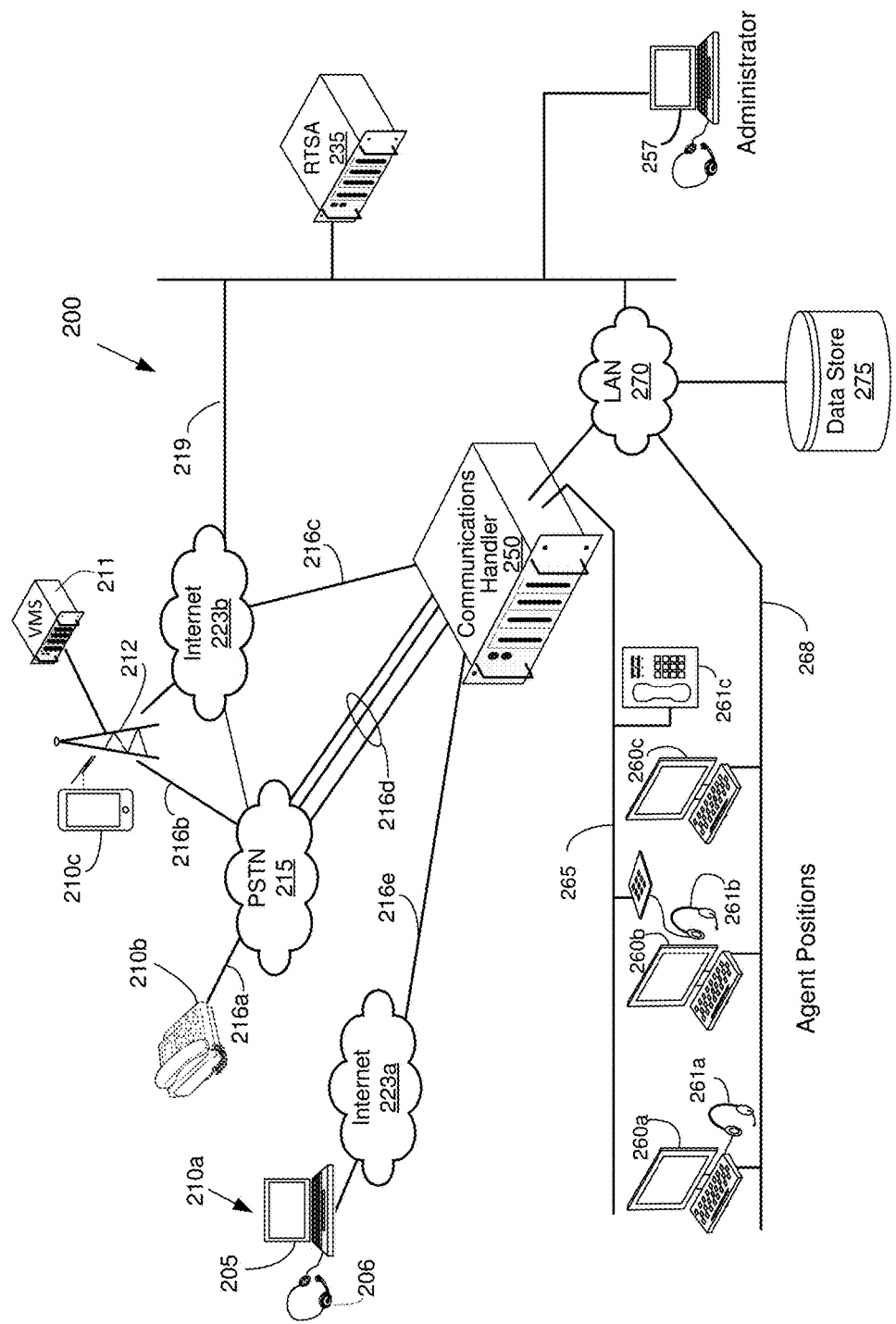
FIG. 2 illustrates one embodiment of a call center architecture for originating a call to a remote party and determining whether the greeting provided by the answering entity originated from a live person or a machine.

Exemplary Contact Center Architecture—FIG. 2

FIG. 2 illustrates one embodiment of a contact center architecture 100 that may be used in accordance with the various technologies and concepts disclosed herein. The contact center shown in FIG. 2 may process voice calls and non-voice communications that are inbound-only, outbound-only, or a combination of both (sometimes referred to as a "blended" contact center). For purposes of illustrating concepts associated with AMD processing, the illustration will focus on outgoing telephone calls.

The term "telephone call" as used herein is generally synonymous with a "voice call" unless indicated otherwise. Further, the term "telephone call" may encompass a voice call using any form of currently available technology and directed to any type of telephone device, such as a soft phone 210a, a conventional telephone 210b, a mobile phone 210c, or other device known in the art. This also encompasses various telephony oriented protocols and signaling mechanisms. The term "call" as used herein may encompass an active instance of two-way communication, an attempt to establish two-way communication, or a portion of the two-way communication.

In various embodiments, the communications handler 250 may originate a call. Specifically, the communications handler may be a dialer, such as a predictive dialer, which originates calls and connects an available agent to the call. Depending on the embodiment, outbound voice calls may originate to called parties using a variety of different phone types. For instance, a called party may receive a call at a conventional analog telephone 210b connected to a public switched telephone network ("PSTN") 215 using an analog plain old telephone service ("POTS") line 216a. The calls may be routed by the PSTN 215 and may comprise various types of facilities 216d protocols, and technologies, including, but not limited to: T1 trunks, SONET based fiber optic networks, ATM networks, etc. Various types of routers, switches, bridges, gateways, and other types of equipment may be involved in the processing of the calls.

Outbound voice calls may also originate to a mobile phone device 210c, such as a smart phone, tablet, or other mobile device, which wirelessly communicates with a mobile service provider ("MSP") 212. The voice calls may be routed to the PSTN 215 by the communications handler 250 using an ISDN interface 216b or other types of interfaces that are well known to those skilled in the art. In particular embodiments, the MSP 212 may also route calls as packetized voice, referred to herein as voice-over-IP ("VoIP") to an Internet provider 223b using Internet-based protocols, such as session Internet Protocol ("SIP") or H.323 protocols. For convenience, unless indicated otherwise, the term "trunk" refers to any type of facility 216c, 216d, or 216e providing voice calls to, or from, the contact center, regardless of the type of protocol or technology used. Specifically, a "trunk" is not limited to time-division multiplexing ("TDM") technology, but could refer various VoIP communication channels.

Outbound calls to a called party may encounter various forms of AVMC. For example, a called party may have a telephone 210b that is a combination telephone and answering machine. The call, if not answered by the person using the handset, will be answered by the answering machine automatically after set number of rings. Then, a greeting may be played and the caller's message may be recorded. Similarly, a computer 210a functioning as a phone device may also incorporate software to perform answering machine functions. In other embodiments, a service provider, such as a mobile wireless service provider 212 may employ a voice mail system 211 in their infrastructure for forwarding unanswered calls. There, the voice mail system will play a greeting and store a message. These are all considered examples of an AVMC.

Outbound voice calls may also originate to a calling party employing a so-called "IP phone," "VoIP phone," or "soft phone" 210a. In one embodiment, this device may comprise a computing device 205, such as a laptop, computing tablet, or other electronic device, which interfaces with a headphone/microphone combination, also referred to as a "headset" 206. An IP phone may use a digital voice control protocol and may process packetized voice data according to various Internet based voice protocols, such SIP. The call may be conveyed by other types of Internet providers 223a, such as a cable company providing Internet access services over a coaxial cable facility 216e. Those skilled in the art will recognize that a variety of Internet Protocols ("IP") and facilities may be used to convey voice calls.

In various embodiments, outbound calls from calling parties to the contact center may originate from the communications handler 250, which could be, in one embodiment, a predictive dialer or other form of a call handler. The communications handler 250 may connect an outgoing call (or more specifically, a call leg) over contact center facilities 265 to a phone device used by an available agent. Depending on the embodiment, the facilities 265 may be any suitable technology for conveying the call, including but not limited to a local area network ("LAN") 270, wide area network ("WAN"), ISDN, or conventional TDM circuits. In addition, the facilities 265 may be the same or different from the facilities used to transport the call to the communications handler 250.

A portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. Thus, the predictive dialer may originate a call leg to a called party and join that call leg to one established with an agent's telephone, thereby forming the overall call. For example, the dialer may connect the call to another component (such as the RTSA 235) using a unidirectional call leg. This is because no audio is expected to be provided by the RTSA 235.

In various embodiments, a call leg may be routed over facilities 265 to an agent for speaking with the called party. The physical area at which the agent sits is often referred to as an agent "position" and these positions are often grouped into clusters managed by a supervisor, who may monitor calls and the agents' productivity. An agent typically uses a specially configured computing device 260a-260c, such as a computer with a display, and a voice device 261a-261c that is adapted for various contact center functions associated with processing communications. The combination of computing device 260a-260c and voice device 261a-261c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 261a-261c at the agent's position. Similarly, "routing the call to the agent" means routing a call to the appropriate equipment at an agent's position. The workstation typically has a display, typically provided via a computer monitor. This is used to convey information to the agent about the calls, and where the agent can enter information, such as disposition information. The agent may interact with the communications handler using a mouse or other pointing device in conjunction with their computer display. Disposition information may comprise entering a code or other information indicating the outcome of a call.

In particular embodiments, the voice device 261a-261c used by an agent may be a soft phone device exemplified by a headset 261a connected to the computer 260a. The soft phone device may be a virtual telephone implemented in part by an application program executing on the computer 260a. Further, the phone may also comprise an Internet Protocol ("IP") based headset 261b or a conventional phone 261c. Use of the term "phone" is intended to encompass all these types of voice devices used by an agent, unless indicated otherwise.

Agents typically log onto their workstations 260a prior to handling calls. The workstation may also communicate this login information to the communications handler. This allows the contact center (including the communications handler) to know which agents are available for handling calls. Thus, after originating a first outbound call leg for a call, the communications handler will ascertain which of the agent is available to handle the call, and may create a second call leg to the available agent and then join the two call legs, thereby forming the call. In some embodiments where the communications handler is a predictive dialer, the predictive dialer will wait until the first outbound call leg is answered or answered by a live person, and then will immediately join the call leg to the selected agent with the call.

Depending on the embodiment, the interaction between the various components shown may involve using a local area network ("LAN") 270. However, other configurations are possible, such as, but not limited to, using a wide area network, wireless network, router, bridge, direct point-to-point links, etc. Thus, in lieu of facility 265 for conveying audio to the agents, the facilities associated with the LAN 270 may be used.

In various embodiments, the communications handler 250 is typically configured to dial a list comprising call records (and further comprising telephone numbers) to initiate outbound calls. This list, and other related information, may be maintained in the data store 275. In some embodiments, the communications handler 250 may be embodied as a modified private automatic branch exchange ("PBX" or "PABX"). Further, in other embodiments, the communications handler 250 may directly interface with voice trunks using facilities 216c, 216d, and 216e to the PSTN 215 and/or Internet providers 223a, 223b for originating calls. After the calls are originated, a transfer operation by the communications handler 250 may connect the call with an agent or place the call in a queue. In various embodiments, the communications handler 250 may make use of one or more algorithms to determine how and when to dial a list of numbers so as to minimize the likelihood of a called party being placed in a queue while maintaining target agent utilization.

The contact center may also incorporate a real-time speech analytics ("RTSA") system or component 235. This may connect to the communications handler 250 via LAN 270 or other communication means. The RTSA component 235 may be bridged onto a call by the communications handler by establishing a call leg from the communications handler to the RTSA component at any time. This allows the RTSA component to receive the audio signals of a call, and to provide analysis on the audio. This may be a unidirectional call leg, as no audio is expected from the RTSA. As will be seen, the communications handler in the form of a predictive dialer (or simply "dialer"), may originate a first call leg to the called party and simultaneously, or nearly so, originate a second call leg to the RTSA component, and joint the two. In various embodiments, the second call leg may be established when the first call leg is originated, when ringing occurs, when the call is answered, or when the call is answered by a live person. Depending on when the RTSA is joined to the call, the RTSA may receive audio signals comprising the ringing, call progress tones, or a greeting from the answering party. This is one approach for facilitating the RTSA component to aid in analyzing the greeting upon the call being answered to determine whether it originated from a live person or AVMC. Thus, the RTSA component (or other component operating in conjunction with the RTSA component) may provide an indication or other data to the dialer indicating whether the greeting was provided by a person or a machine.

An administrator computer 257 may be used by the administrator to perform the configuration and administration of the RTSA component, the communications handler, the LAN, and other components in the contact center. The administrator may have access to various data structures (as discussed herein) and can configure the RTSA and communications handler to perform various types of greeting processing to ascertain whether the greeting originated from a live person or a machine.

Although a number of the above components may be referred to as a "component," each may be also referred to in the art as a "computing device", "processing system", "unit", "server", or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 250 or other component may be combined into a single hardware platform executing one or more software modules. In addition, the contact center architecture 200 may be provided as a hosted solution, where the call processing functionality is provided as a communication service (a so-called "communication-as-a-service" or "CaaS") to a contact center operator. Thus, there is no requirement that the servers identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Those skilled in art will recognize FIG. 2 represents one possible configuration of a contact center architecture 200, and that variations are possible with respect to the protocols, facilities, components, technologies, interconnections, and equipment used. For example, various algorithms and queuing arrangements may be defined to efficiently process and/or place calls.

DESCRIPTION OF EMBODIMENTS

As will become evident, there are various approaches for increasing the accuracy of AMD detection. These approaches may involve developing a more accurate set of AMD parameters that are used generally for all calls. Other approaches involve develop multiple sets of AMD parameters that are used for certain types of calls. A still more granular approach is to develop a set of AMD parameters for a call to a specific telephone number. Another approach is to replace or supplement the use of timer-based AMD detection (such as the aforementioned approaches) by using a linguistic approach of AMD detection. The linguistic approach of AMD detection may be accomplished by using a RTSA component. Hence, the timer-based approaches may be augmented (or replaced) by using a RTSA component to analyze the greeting. These approaches will become evident as explained below.

The methods described above pertain to post-call-answering analysis. That is, after the call is answered, the greeting is analyzed. The accuracy of AMD detected may be augmented by using pre-call answering analysis. That is, information about call-events before the call is answered may be relevant to the AMD analysis. This may involve analyzing the call pickup time and/or the call answer time to develop certain factors that may be applied to further the accuracy or confidence of whether an AVMC or live person answered the call. Similarly, approaches may involve developing general sets of data or specific sets of data pertaining to average call pickup times or call answering times and using that to analyze a particular call pickup time for a particular call. This may include maintaining prior call history data, including prior call pickup times for prior calls to that number, along with their prior outcome, to analyze a prior call. For example, prior calls to a telephone number may indicate that when an AVMC answers, the average call pickup time was 24 seconds, with a standard deviation of 1 second. On the other hand, prior data indicates when a live person answered, the average call pickup time was 12 seconds with a standard deviation of 8 seconds. Thus, a current call with a call pickup time of 23 seconds may be deemed more likely to be answered by an AVMC based on prior call pickup history, as opposed to being answered by a live person.

Optimization of a General Timer-Based AMD Parameter Set

Figure 3:
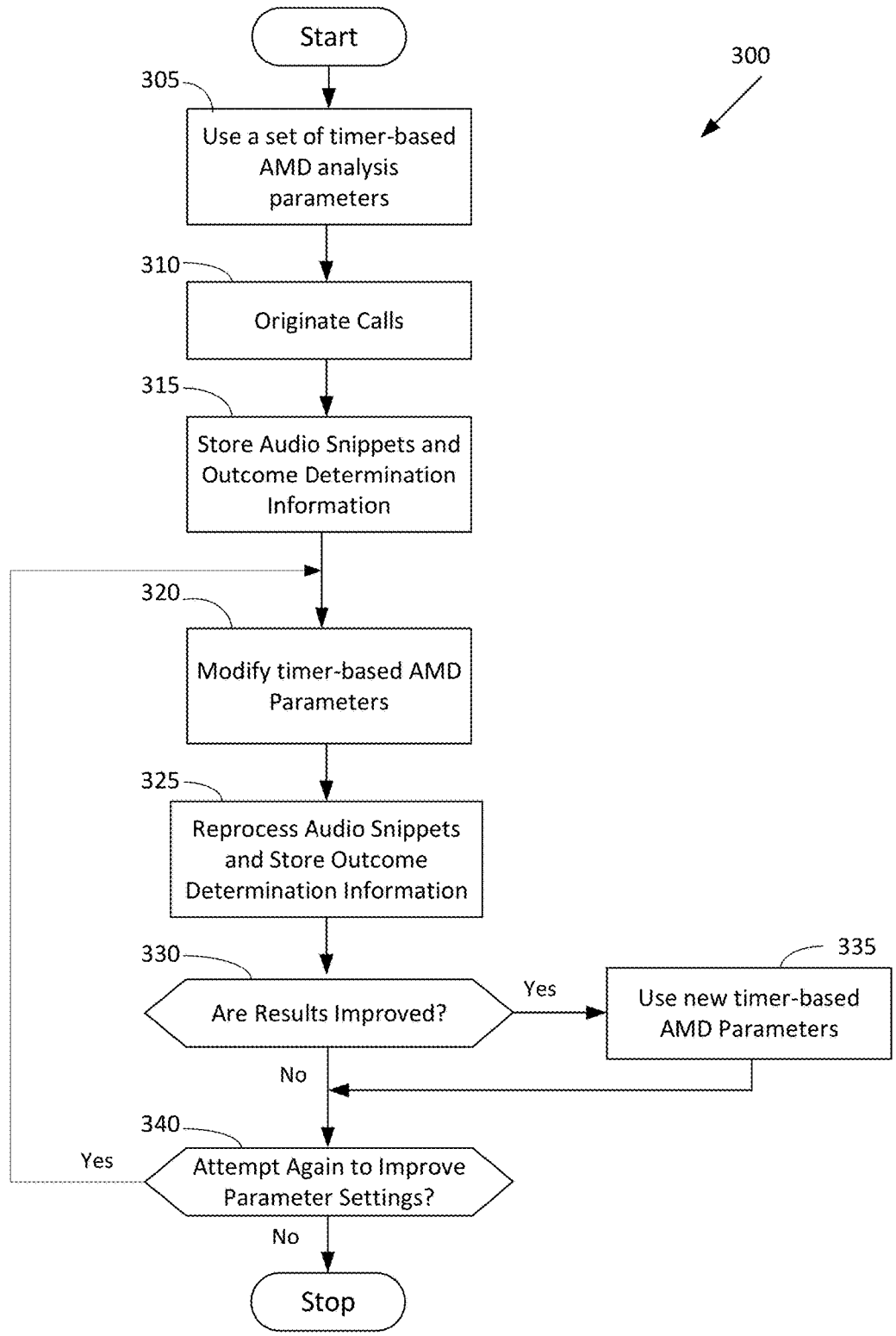
FIG. 3 illustrates one embodiment of a process flow for using a predictive model for determining various parameters to ascertain whether a greeting originated from a live person or a machine.

A first embodiment for improving the accuracy of an AMD process is shown in the process 300 illustrated in FIG. 3. This embodiment relies on using a set of AMD parameters for an existing timer-based (non-linguistic) AMD algorithm. This involves retaining a portion of the audio recordings of the call sufficient to perform the AMD analysis. (This portion comprising the greeting or a portion of the greeting is called herein an "audio snippet" or the "greeting audio snippet"). The greeting audio snippets for a number of calls are collected and stored, along with information as to whether an agent disposition indicated the AMD analysis was correct or not. Alternatively, the set of greeting audio snippets can be manually reviewed by a supervisor or agent in the contact center and tagged with an indication as to whether the recording was from a live person or AVMC. Either way, a set of verified audio snippets are obtained, along with information as to the determination made by the AMD analysis, and an indication as to whether the determination made by the AMD analysis was correct or not. This allows identification of which instances the AMD analysis made a mistake classifying the audio snippet.

Next, one or more parameters of the AMD algorithm are altered, and the set of audio snippets is re-processed using the updated AMD parameter set of the AMD analysis algorithm. If the net results are deemed to be an improvement, then the new set of AMD parameters are used. This allows a sort-of "champion-challenger" test to occur where the same set of audio snippet data is analyzed using two sets of AMD parameters or algorithms, and the parameter set having the better results are retained and used going forward. This process may be repeated as necessary, until a better model of the AMD parameters is determined.

The number of audio snippets required to provide an accurate sampling may vary. However, several thousand samples representing a suitable cross section of calls made should be sufficient. Those skilled in the art of statistical analysis can readily determine a minimum number required, but there is little harm in using a too large sample size. Thus, a day's or week's duration of call recordings may be sufficient depending on the size of the set.

Turning to FIG. 3, addition details of this embodiment are illustrated. The process begins in operation 305 where a default or initial set of AMD parameters for the algorithm are used. This may involve the set of various AMD parameters discussed in regard to FIG. 1. The AMD parameter set may be loaded into a dialer or other sub-system that analyzes the greeting audio snippets in the normal course of operation. Next, the calls are originated as normal in operation 310. The number of calls necessary will vary, but can be readily determined by one skilled in the art. As part of the call origination process, the greetings will be analyzed using the AMD parameter set to determine whether the greetings originated from a live person or a machine.

What may be different from conventional operation of the contact center is that for each call, the analyzed audio recording, the classification by the AMD processing, and an indication of how the agent dispositioned the call is stored in operation 315. In situations where the AMD processing classifies the greeting as originating from a live person, then the agent will be typically connected to the call. If this is in error (i.e., an AVMC has actually answered the call), the agent will terminate the call and indicate the outcome via a disposition code. The code should reflect that the greeting was actually provided by an answering machine. Thus, each instance of an error where the AMD processing incorrectly ascertained a live person when an AVMC was encountered should be identified and retained. The correctly ascertained audio snippets may be retained as well. Although a number of sub-operations are represented by operations 310 and 315, those should be readily identifiable to one skilled in the art.

Next, the timer-based AMD parameters are modified in operation 320. The exact parameters and their values to be altered may occur in various ways. One method may be a form of trial and error. As will be seen, there may be a number of iterations where different parameters are tested. With these modified parameters, each of the audio snippets is reprocessed by the AMD processing module in operation 325. During this operation, information as to the classification produced by the AMD processing is recorded for each audio snippet analyzed.

Once this is completed for the set of audio snippets, it is readily possible to ascertain whether the processing of the AMD algorithm using the modified parameters results in an improvement in operation 330. This can be done by tallying the number of mistakes made by the AMD processing using the new parameters and comparing it to the prior results. The AMD processing of the audio snippets with the new parameter values is likely to generate fewer or greater number of mistakes than using the old parameter values. In rare instances, the number of mistakes may be the same. Thus, the new AMD parameter set can be readily deemed to improve or worsen the results.

If the results are improved, e.g., the percentage of mistakenly attributed greeting to live person is reduced, then the set of timer-based AMD parameters used may be stored and replace the old set of timer-based AMD parameters in operation 335. To ascertain whether the results are improved, it may be necessary to also examine the number of mistakes with respect to classifying a known live person's greeting as originating from an AVMC. The new AMD parameter set may not be deemed an improvement if it reduces the errors of misclassifying audio from an AVMC, but increases the misclassifying of audio from a live person. Regardless of how the criteria is define as an improvement in accuracy, the results can be compared between processing the audio with a new set of AMD parameter values and the old set.

Next, a determination is made whether another modification to the parameter settings will be attempted in operation 340. A parameter, such as a timer value may be altered by e.g., incrementing it 5 ms initially. Thus, the change in operation 340 may attempt to alter it again, incrementing it by e.g., another 5 ms. The process then loops back to operation 320 where the modification is made to the AMD process and the cycle repeats. This may be repeated many times, each improving the results incrementally, until no further significant improvement results are observed, or the results are worsened. Then it can be determined which value of the AMD parameter provides the optimal results.

The modification and reprocessing of the AMD parameters may not be a linear process. There are a number of variables that can modified and the amount of modification for each variable can vary. Thus, there are a large number of combinations that may be tested. However, each time the results are changed and the audio greetings are reprocessed, a quantitative measurement can be obtained as to the number of AVMC greetings that are incorrectly classifying as a live person. By performing this comparative analysis periodically, perhaps weekly, monthly, or quarterly, the contact center operator can periodically adjust their AMD parameters and be fairly confident that the AMD algorithm is operating an optimal performance or near optimal performance for most of the calls encountered.

In other embodiments, a heuristic analysis may be used to select and alter a particular AMD parameter value. This allows those skilled in the art to select parameters which they suspect are most relevant, and have the greatest potential for reducing the misclassification errors. Other algorithms can be developed based on the set of audio snippets to optimize the values in an automated manner.

Multiple AMD Parameter Sets

The prior approach defines a single AMD parameter set that is used for all calls. That is, the AMD parameter set is optimized generally for all calls. In this approach, a particular AMD parameter set is used for a subset of calls. That is, the AMD parameter set is optimized for a group of calls made, recognizing that there may be different AMD parameter sets optimized for different groups of calls. In one embodiment, there may be a single AMD module in a dialer that is loaded with a particular AMD parameter set and used processing all outbound calls of that group. Then, another AMD parameter set may be loaded when dialing another group of numbers. In other embodiments, there may be multiple dialers used, and each can have a slightly different set of AMD parameters in the AMD processing module and each dialer is dialing a separate group of calls. This approach is based on knowing, a priori, that calls to certain sub-sets of calling records in a calling list will have different characteristics.

For example, a calling list of telephone numbers may be sorted into two groups of records. Those records of telephone numbers associated with a certain geography may be in a first group whereas records associated with another geography may be in a second group. One basis may be to segregate the records based on whether the called party is in an urban or rural area. Another basis may be to segregate the records based on region of the country (e.g., states north of the Mason-Dixon line or states south of the Mason-Dixon line). The reasoning is that individuals in these regions may speak at a different speed, accent or have a different cadence, and this may also be reflected in their AVMC greeting. Then, each calling list is loaded onto a corresponding dialer, which originates calls to that particular region, and each dialer incorporates the AMD module with an optimized AMD parameter set.

Figure 4:
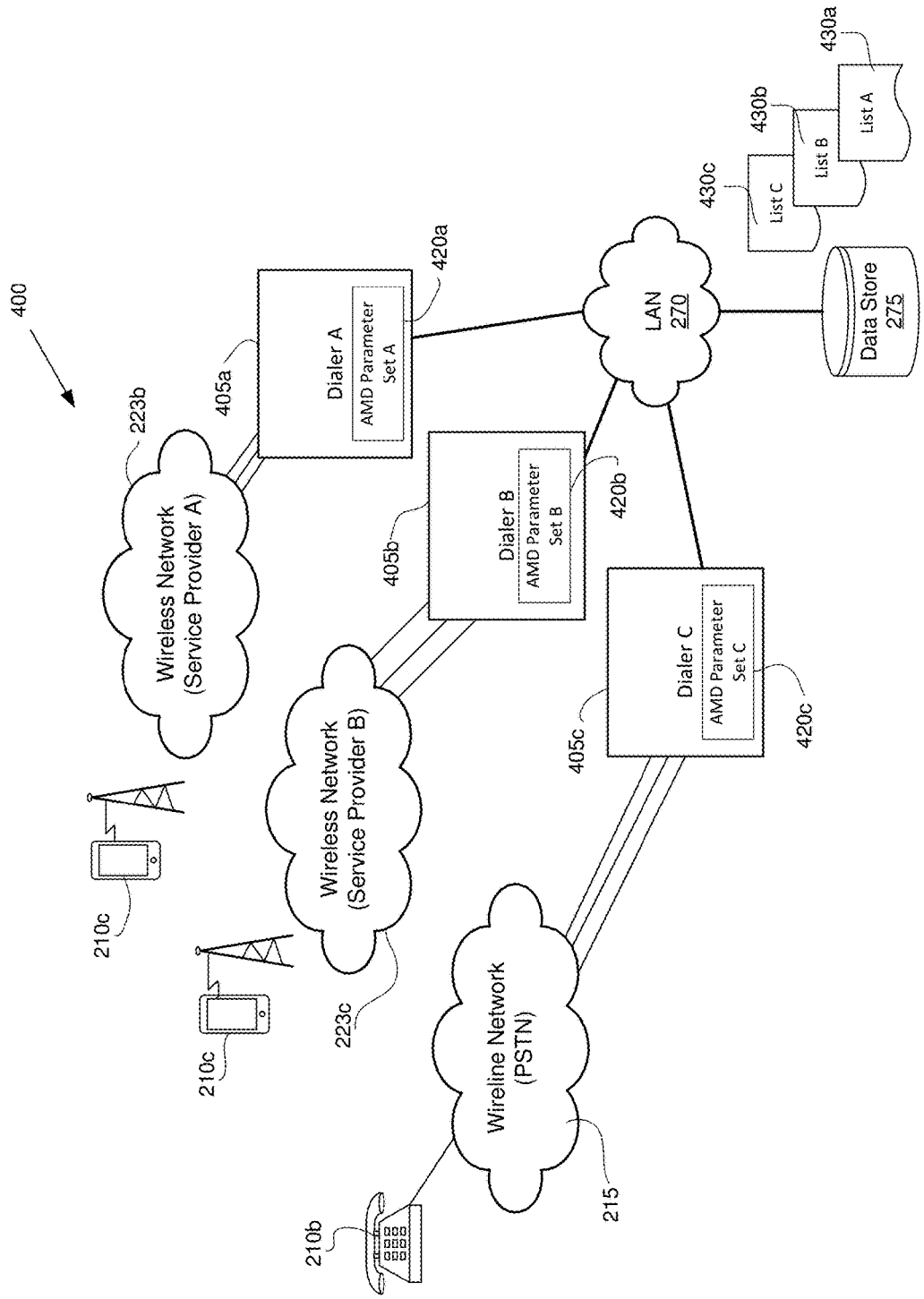
FIG. 4 illustrates one embodiment of an architecture for using various AMD parameters sets optimized for certain situations to ascertain whether a greeting originated from a live person or a machine.

Another example is shown in FIG. 4. In this figure, which is based in part on FIG. 2, the data store 275 stores three calling lists, List A 430a, List B 430b, and List C 430c. In this embodiment, List A wireless numbers associated with Service Provider A 223b. List B comprises wireless (cellular) numbers associated with Service Provider B 223b. List C comprises wireline numbers associated with the wireline network 215. The particular wireless carrier may be readily determined from available service providers that will "scrub" a list of calling numbers and identify which are wireless numbers. These services will also indicate which wireless carrier the number is associated with. Since most wireless subscribers are associated with one of the main four wireless carriers, the number of carriers indicated is limited. Such number scrubbing services are readily available to contact center operations in order facilitate compliance with Telephone Consumer Protection Act ("TCPA") regulations.

Each list is provided to a corresponding dialer 405a, 405b, and 405c via LAN 270. Furthermore, each dialer has a corresponding unique set of AMD parameters. Consequently, dialer A 405a will have its unique AMD parameter Set A 420a, and so forth for dialer B and dialer C. Thus, when each call is originated by the dialer, it will use an optimized set of AMD parameters to ascertain whether the greeting encountered is from a live person or an AVMC.

The reason this may work for wireless carriers (either individually or collectively) is that each wireless carrier provides voice mail service to its subscribers (typically, there is no answering machine equipment owned and operated by the wireless subscriber, as may be the case for wireline service). Each wireless carrier typically may have a slightly different, but typically uniform, default greeting on their respective AVMC. If the subscriber has not created a customer greeting, or is not allowed to do so, then a default or semi-custom greeting is provided, which will have a certain syntax and cadence. In some instances, the wireless carrier may incorporate unique tones or sounds.

For example, some wireless carriers may provide a voice mail greeting as follows: "Your call to number "4-0-4-5-5-5-1-2-1-2" has been forwarded to a voice mail service. Please record your message after the tone." This has a common cadence and structure, although the particular announced called number is different from subscriber to subscriber. It may be possible to optimize the AMD parameter values to detect a default or semi-custom greeting for those carriers. If so, the accuracy may be increased compared to using the same AMD parameter set for all carriers. Typically, the identification of a series of numbers (characterized by pauses) is strongly suggestive of a machine provided greeting. This can be readily accomplished by using a real-time speech analytics system to analyze the greeting.

The determination of the set of AMD parameter values for a particular carrier may be obtained as was discussed previously for FIG. 3, except that the audio greeting that are recorded and analyzed are from a single carrier. Thus, it is possible to develop an AMD parameter set optimized for a particular wireless carrier.

Figure 5:
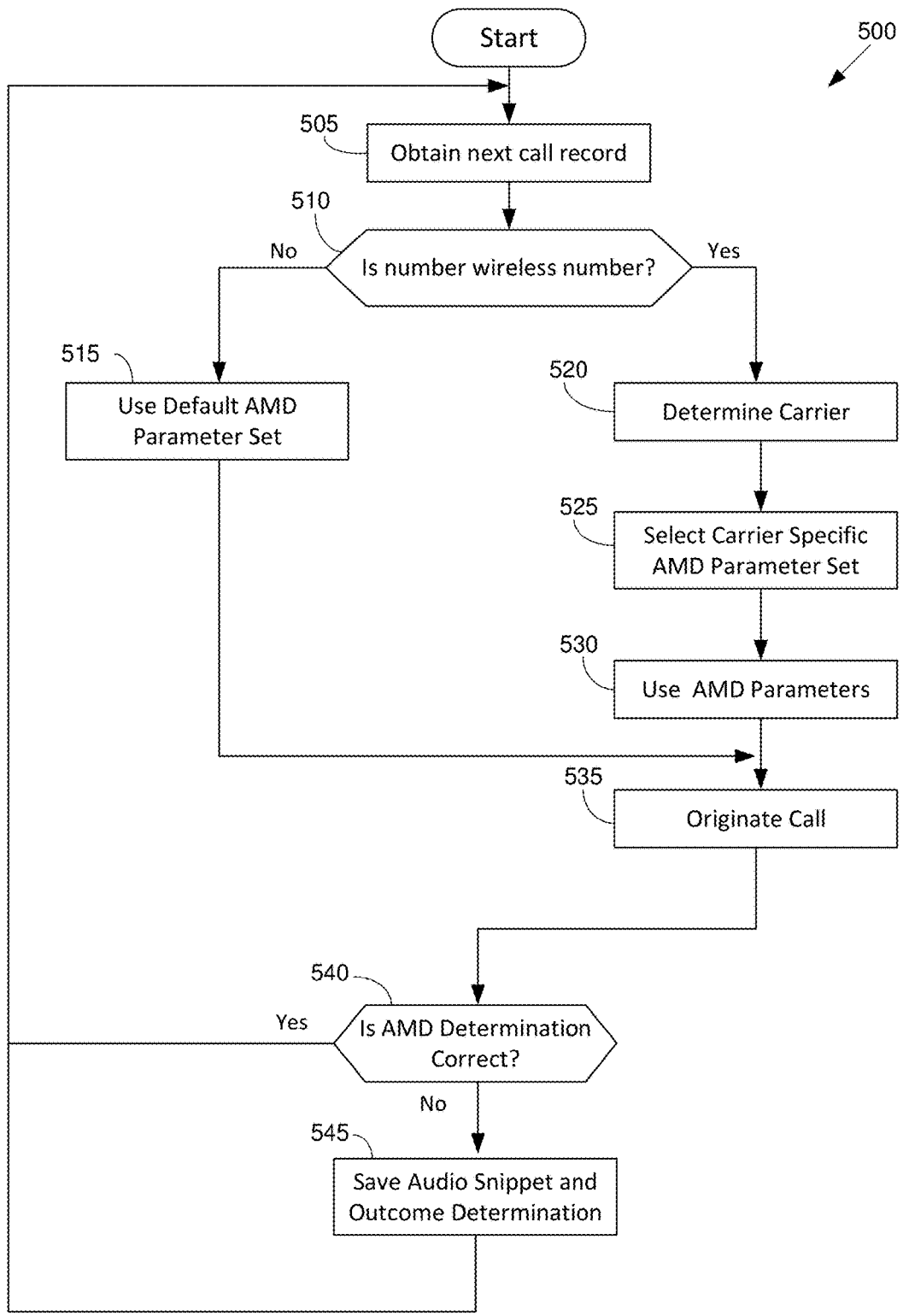
FIG. 5 illustrates one embodiment of a process flow for using various AMD parameters sets optimized for certain situations to ascertain whether a greeting originated from a live person or a machine.

An embodiment of a process flow that utilizes different AMD parameter sets for wireless carriers is shown in FIG. 5. Turning to FIG. 5, the process 500 begins with retrieving the next call record in operation 505. A determination is made whether the number is a wireless number in operation 510. If it is not, then a default AMD parameter set may be used in operation 515. The call is then originated in operation 535. Based on the agent's disposition of the call, a determination can be made in operation 540 as to whether the AMD determination was correct or not. If it is not correct, then the audio snippet is stored along with the outcome (and other information) in operation 545. The purpose is to retain the necessary information about the errors to potentially improve the AMD parameter set values.

If the number is a wireless number in operation 510, the wireless carrier is determined in operation 520 and the corresponding AMD parameter set developed for that wireless carrier is selected in operation 525. That particular AMD parameter set is then selected and used by the AMD processing module in operation 530 and the call is originated in operation 535. Again, if the AMD determination is incorrect in operation 540, the information is retained for subsequent analysis in operation 545. This allows the AMD parameter set for each carrier to be maintained with optimized values.

AMD Parameter Optimization for a Specific Telephone Number

The above discussion illustrates how an optimized AMD parameter set can be determined for a particular type or group of calls. By limiting the population to, e.g., calls to a certain carrier or demographic region, a more accurate customized AMD parameter set can be created to optimize the AMD determination for a subset of the calls. Taken to its extreme, the AMD parameter set can be optimized for a particular telephone number. In essence, the AMD parameter set is optimized or tuned to a particular greeting of an AVMC from a particular telephone number. The AMD parameter set can be generated in response to encountering a mistake in classifying a particular greeting from an AVMC, and applied when calling that telephone number at a subsequent time.

Since contact centers are motivated to properly classify a greeting, and contact centers maintain various information on each account they are attempting to contact, the AMD parameter set for a telephone number can be stored in that account's profile in the calling list or another file. The account profile contains information unique to that account, including various telephone numbers used to reach that account. The call record may include other information as to whether each number in the account is a wireless or wireline number, etc. So, it would not be unusual to store further information (or provide a link to) about a particular set of AMD parameters that should be used when calling a particular telephone number.

This requires that the dialer allow dynamic reconfiguration of the AMD parameter values on a per-call basis. Specifically, the AMD parameter values are configurable on a call-by-call basis. As each call record is retrieved and read, the associated AMD parameter set is read and provided to the dialer (or other entity performing the AMD analysis) to configure the AMD processing accordingly. This allows the AMD parameter set to be customized, indeed optimized, for each particular AVMC greeting that may be encountered.

Figure 6:
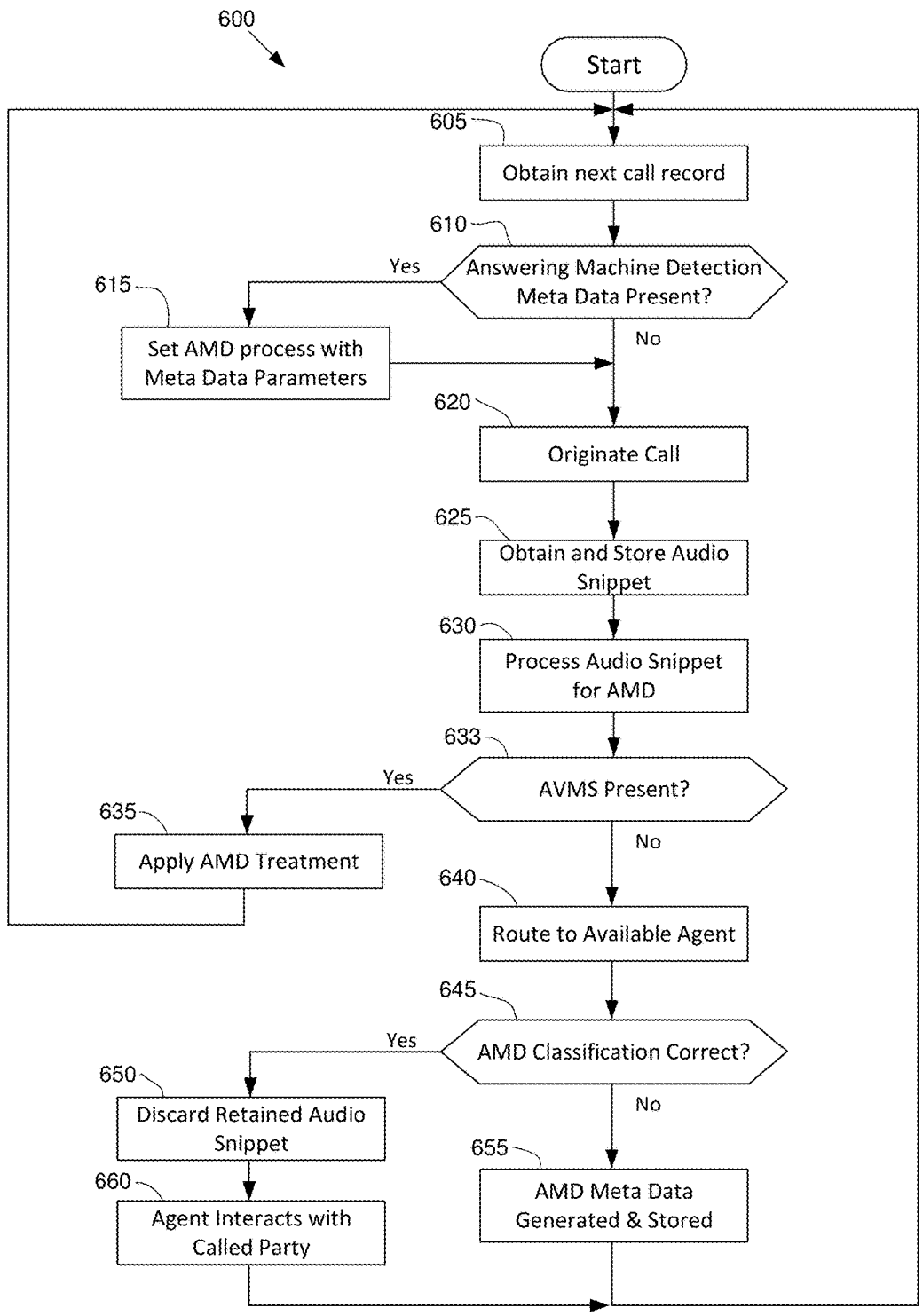
FIG. 6 illustrates one embodiment of a process flow for using and determining AMD parameters for a particular outbound call to ascertain whether a greeting originated from a live person or a machine.

An overview of the process is illustrated in FIG. 6. Turning to FIG. 6, the process 600 involves the dialer obtaining a next (or first call record, if it is the first pass through the process 600) in operation 605. This information will comprise the telephone number to dial and it may also comprise information about the relevant AMD parameters set for that telephone number. If it is determined that AMD parameters are present in operation 610, then those parameters are used to configure or set the values in the AMD process in operation 615. If the AMD parameters are not present in operation 610, then the existing AMD parameter set values may be used.

In either case, the process proceeds to originate the call to the number indicated in the call record in operation 620. Assuming the call is answered, the audio greeting is then received and stored in cache in operation 625. The audio greeting or audio snippet is processed using the AMD parameter set presently loaded (whether the default or custom version) to determine whether the greeting is a live person or machine in operation 630. Next, a decision branch occurs in operation 633 based on whether an AVMC is present or not. If an AVMC (i.e., machine) is determined to be present, then the configured AMD treatment is provided in operation 635. This may include terminating the call or playing an announcement after the greeting is completed. The process then loops to process the next call record in operation 605. If an AVMC is not present in operation 633, then this indicates that a live person is detected. The call is routed (or connected) to an agent in operation 640.

At this point the agent is connected to the call, and the agent will ascertain whether the speech they are hearing is, in fact, from a live person or not. If the agent determines the AMD classification is correct (e.g., it is a live person) in operation 645, then the audio snippet that was retained in cache can discarded in operation 650. The agent may then normally converse with the live person in operation 660. Once the call is completed (not shown), the process loops back to operation 605 to process the next call record.

However, if the agent determines that a misclassification occurred in operation 645, namely that the agent is hearing a greeting form an AVMC, then the agent will disposition the call (not shown). This indicates to the dialer that the call was incorrectly classified as a live person, as opposed to an AVMC. The dialer will then use the stored audio snippet and process it in operation 655 to generate custom AMD parameters. The AMD parameters are then stored with the account information in the call record or other system, so that it can be used on a subsequent call to that number.

Figure 7:
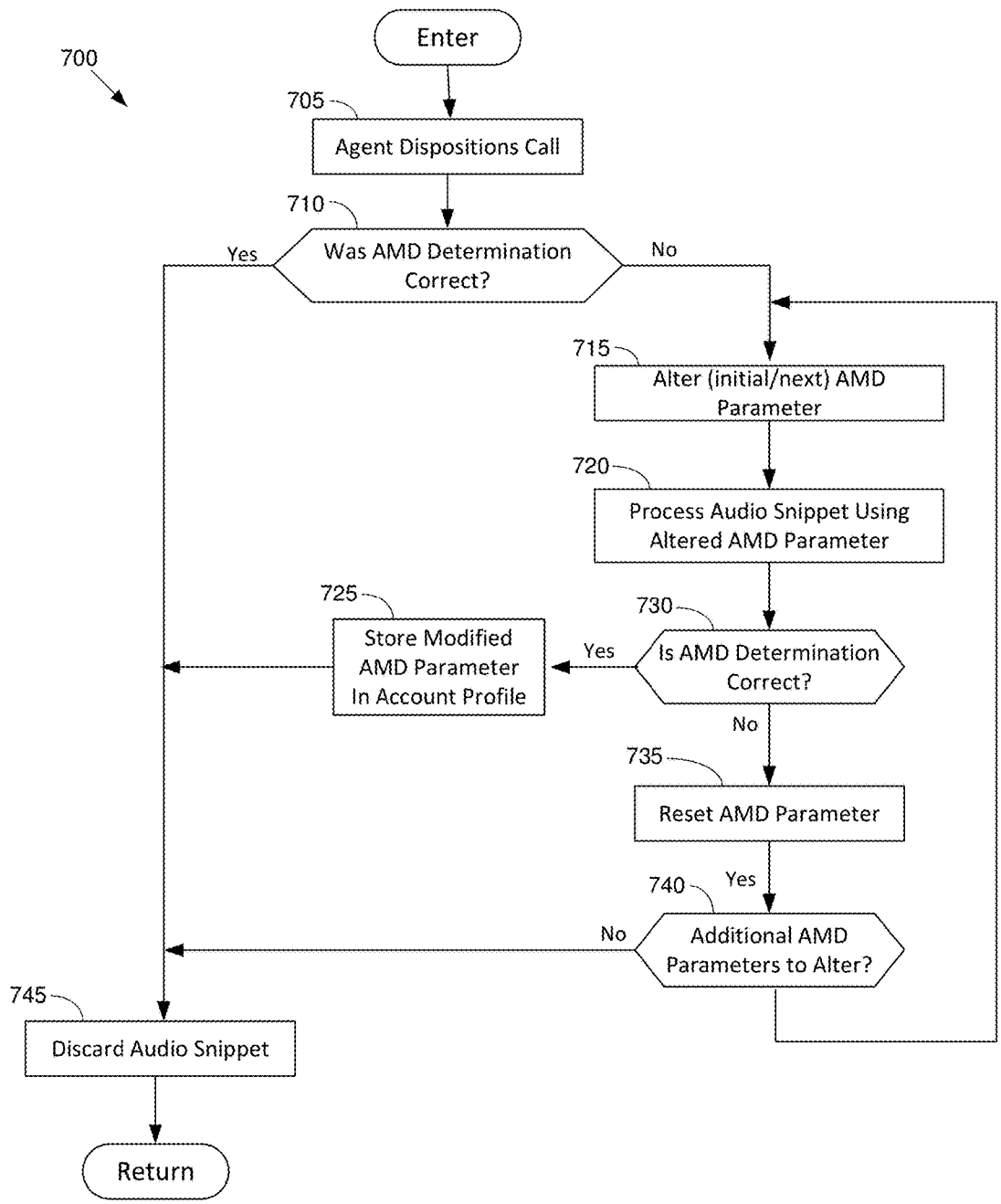
FIG. 7 illustrates one embodiment of a process flow modifying an AMD parameter to improve the determination of whether a greeting originated from a live person or a machine for subsequent calls to a particular telephone number.

The operations that occur in conjunction with operation 655 of FIG. 6 are shown in greater detail in FIG. 7. The process 700 in FIG. 7 begins with the agent dispositioning the call in operation 705. Recall that the agent was connected to the call because the dialer received an indication from the AMD processing module that the audio greeting was from a live person. If the disposition code indicates that this determination was correct in operation 710, then the audio snippet can be discarded in operation 745 and the call completes as normal.

However, if the disposition code indicates the AMD determination was incorrect in operation 710, then in this embodiment, the process continues by altering one of the AMD parameter values in operation 715. This may involve increasing or decreasing one of the timer values of a particular AMD parameter. Next, the audio snippet, which has been cached, is reprocessed using the updated AMD parameter value in operation 720. If this results in providing a correct greeting type indication, namely that the audio snippet is from an AVMC, then the process continues to operation 725 where that updated AMD parameter is stored as AMD meta-data in the account profile.

If, however, the AMD reprocessing of the audio snippet still results in an error, namely that a live person is determined, then that AMD parameter is reset to its original value in operation 735, and a determination is made whether to modify another parameter is operation 740. If so, then the process loops back to operation 715 where either that same parameter is varied again, or another parameter is selected, and the audio snippet is reprocessed again using the new values. The process may loop any number of times to keep changing parameter values to see if the correct outcome can be generated. If the correct outcome is generated in operation 730, that updated AMD value will be stored in operation 725 and used on subsequent calls to that number. Thus, when that greeting in encountered subsequently, it should be processed correctly. The test in operation 740 ensures that a limited number of attempts are made.

The process shown operation 715-740 loops to determine an AMD parameter value that produces a correct outcome. This process may occur "off-line." That is, the dialer may retrieve a record, place the call, ascertain from the disposition code that the AMD determination was incorrect, and simply store the audio snippet in a file for later processing. This later processing could be after the calling list is completed. Thus, the processing of the greeting may occur at "off hours." If so, then the process shown in operations 715-740 could retrieve each audio snippet, alter the AMD parameters, and test to see if it produces a correct result. In this manner, the processing would not consume computing cycles which may be required during the call origination processing.

In addition, the determination of which AMD parameter to alter in 715 may occur in various ways. One way, based on experience, may be to define a particular list of parameters to modify in the order specified. The list may also indicate how much to alter each parameter. For example, some parameters may have a timer value incremented, while others may be decremented. Some may be incremented in discrete units (e.g., 1 ms at a time). Others may increment in other units, e.g., in steps of 25 ms. For example, the first AMD parameter to be modified could increment the initial silence detection period by 5 ms. The second AMD parameter to be modified could increment the minimum audio level for a message by 50 units. The third AMD parameter to be modified may decrement the minimum word duration by 3 ms. In other embodiments, only a single parameter may be modified, such as the duration of the audio analyzed. If the various desired parameter modification does not produce the correct result, then the process may stop and not attempt any other modifications. Of course, multiple parameters could also be modified at the same time. If a correct classification cannot be obtained in the desired time, such a situation may require further manual investigation. Thus, there is great flexibility as to how and which parameters are modified.

Figure 8:
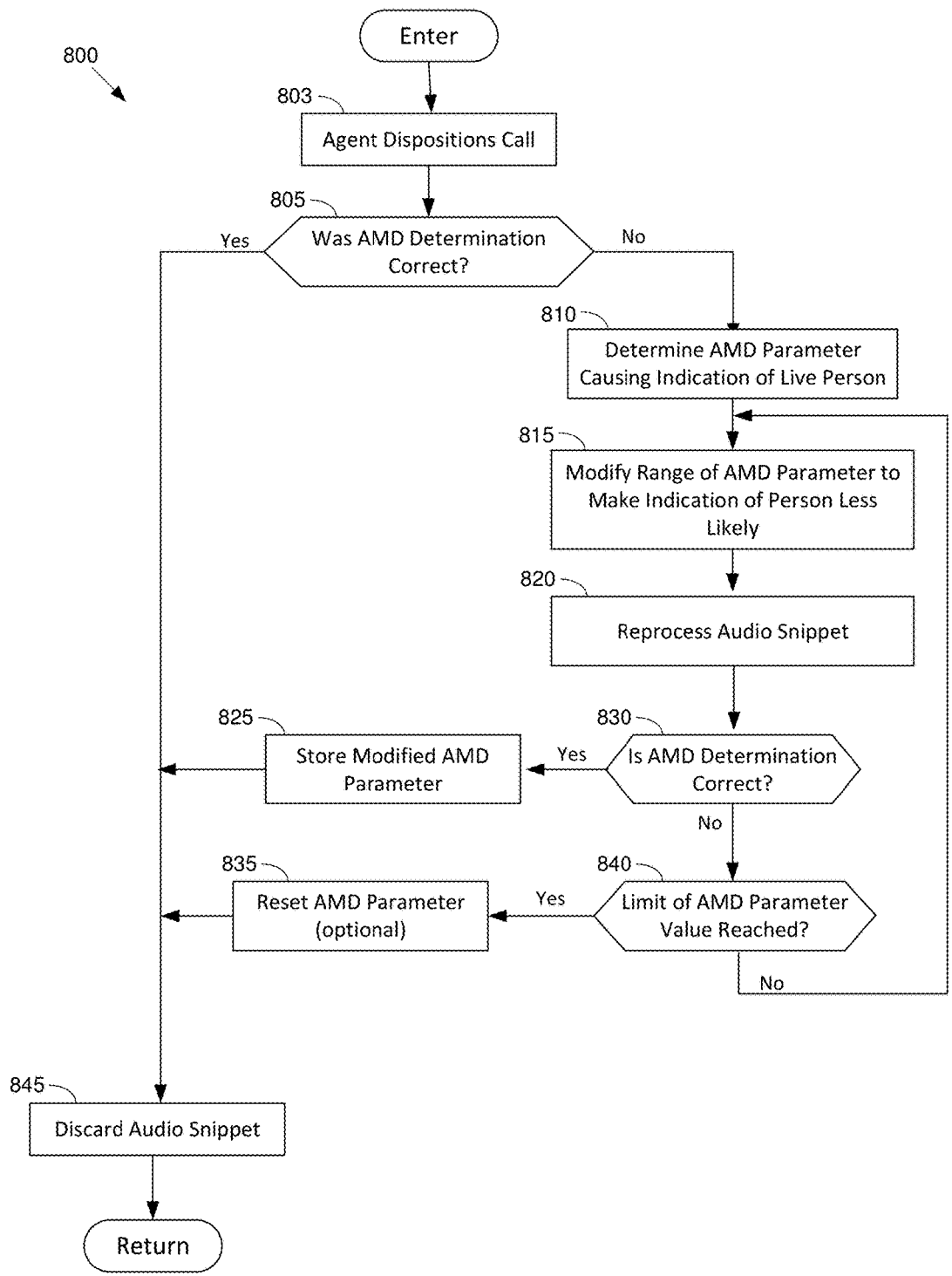
FIG. 8 illustrates another embodiment of a process flow modifying an AMD parameter to improve the determination of whether a greeting originated from a live person or a machine for subsequent calls to a particular telephone number.

Another approach for modifying the AMD parameters is shown in FIG. 8. Turning to FIG. 8, the process 800 is similar in some respect to FIG. 7. The process 800 begins with the agent dispositioning the call in operation 803. If the disposition code reflects a correct AMD determination, then the process continues to operation 845 where the audio snippet can be discarded.

If, however, the disposition code is determined in operation 805 to reflect an incorrect AMD determination, then the process determines which of the AMD parameters triggered the determination that the greeting was a live person in operation 810. It is this particular parameter(s) which is then modified in operation 815 to make the indication of a live person less likely. That modified value is then used to re-process the audio snippet in operation 820. If the AMD determination is correct in operation 830, then the modified parameter is stored in the account profile as AMD meta-data in operation 825. If the modification does not result in a correct determination in operation 830, then a test is made to see whether the modification of that particular AMD parameter has reached a limit in operation 840. If so, then the AMD parameter is reset in operation 835. Thus, no changes to the AMD parameters are made if a correct result cannot be obtained. If, however, additional modifications to that parameter range can occur in operation 840, then the process loops back to operation 815 where another change is made and the process repeats.

This embodiment reflects that sometimes a single parameter may be causing the incorrect determination of a live person in the greeting, and that gradual incremental or decremental changes to a single parameter timer value are required. This process may be faster and/or may allow better "fine tuning" as opposed to merely setting that parameter to its maximum or minimum value. For example, in some embodiments, the detection of four or more words indicates that the greeting is likely to be an answering machine. In most cases, individuals leaving a greeting on an AVMC use more than four words. However, some individuals may leave a very short greeting, such as "Leave a Message" or "Not here" (meaning "I am not here"). In these cases, the presence of less than four words may be encountered and is indicative of a machine providing the greeting. Thus, this embodiment allows tailoring of the default AMD parameters that may then be used when calling a particular telephone number to obtain a more accurate greeting type determination.

Use of an RTSA Component

The above describes AMD applications based on technology that distinguishes between the detection of audio and silence as defined by a set of AMD parameters (i.e., timer-based parameter values). This technology is based on the detection of audio signals, which is presumed to be a surrogate of the presence of voice. Typically, audio signals above a threshold and longer than a minimum duration are detected and are presumed to be voice, as opposed to noise. Such an approach can be readily accomplished on analog or digital signals. However, when noise is above a certain level and longer than a minimum duration, it will be interpreted as voice and can lead to an error in classification. Thus, the mechanisms for distinguishing between voice and background noise based on exceeding a threshold or duration are not always effective.

Another approach involves a more sophisticated analysis, namely the use of a real-time speech analytics ("RTSA") component or system. A RTSA system has the ability to perform a more nuanced approach, which is based on more sophisticated analysis algorithms. This is not merely based on a volume and timing level, but which may be on a speech or linguistic level. The RTSA is able to analyze the greeting to develop a set of data characterizing that greeting. This set of data is referred to herein as "AMD meta-data." The AMD meta-data is ideally unique to a particular instance of a greeting, such that it can be used to ascertain whether a subsequent instance of that greeting is the same a first instance or is a different greeting. It is not the same as the AMD parameter set previously identified, which is a set of timer parameters for an algorithm used to detect whether a greeting is provided from a machine. Although AMD meta-data may be time based, it is not a set of timers as is the AMD parameter set.

Figure 9:
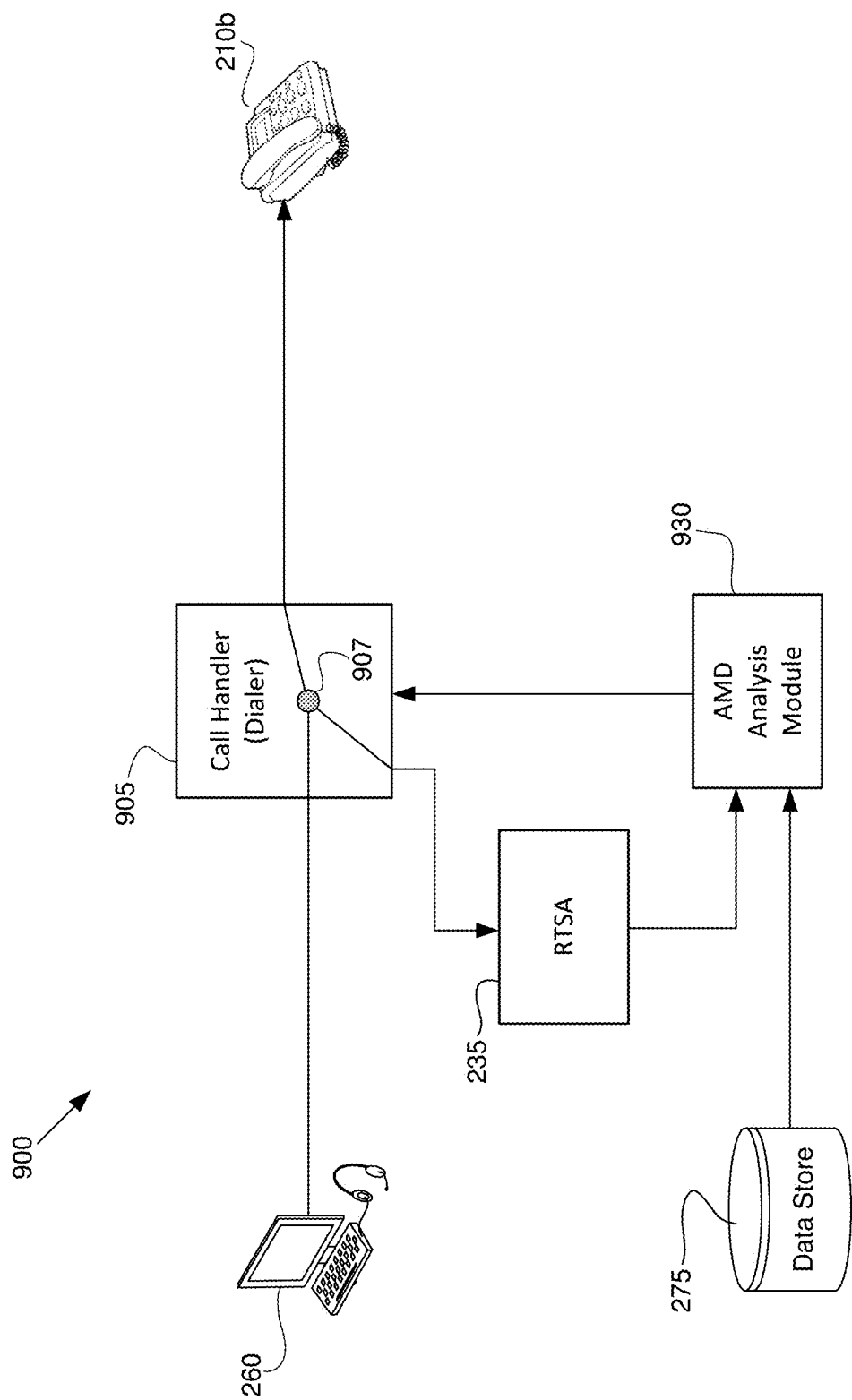
FIG. 9 illustrates one embodiment of an architecture for using a Real Time Speech Analytics ("RTSA") component to improve the determination of whether a greeting originated from a live person or a machine.

One embodiment of such a system that may be used in a contact center is shown in FIG. 9. Turning to FIG. 9, the system 900 includes some of the elements shown in FIG. 2, but emphasizing only the more relevant components for this approach. Starting with the call handler 905 first, this component is a type of communications handler that handles voice calls, and more specifically, may be a dialer of some form that originates calls. The calls are originated using various telephony technologies (not shown) to a called party, represented by the telephone 210b. In various cases, the answering entity may be a person or a machine which in the latter case may be in the form of an answering machine or a voice mail service. Thus, outbound call leg from the dialer to the called party is conceptually illustrated as being attached to a conference bridge 907. This allows copies of the audio signals from the answering entity to be provided to other components, such as the RTSA component.

In FIG. 9, the audio from the answering entity is provided to an RTSA component 235. The RTSA 235 may be referred to herein as a standalone system or a component but in either case, it operates in conjunction with the other components. The functionality of the RTSA 235 may be integrated into the call handler 905 or may be deployed as a separate component, interfacing via a LAN in close cooperation and communication as needed. In one embodiment, the RTSA component 235 will receive from the call handler 905 the audio greeting from the answering entity and perform analysis that is used to determine if the audio is voice, and whether it originated from a live person or a machine.

The RTSA component 235 provides data regarding the analysis to the AMD analysis module 930. In various embodiments, the AMD analysis module 930 takes data from the RTSA and may supplement this with data from a data store 275 to make the determination of whether the audio is speech, and if so, whether it is from a live person or a machine. In various embodiments, the functionality of the AMD analysis module may be incorporated into the RTSA component 235 or the call handler 907. In other cases, the AMD analysis module is executing in a separate processing system that interfaces with the RTSA component 235. In some embodiments, the RTSA component 235 may provide data and/or a preliminary determination which the AMD analysis module uses to generate a greeting type indication signal back to the call handler 907, which then takes appropriate action. Specifically, if the audio is determined to be from a live person, then a call leg to the agent, represented by the line to the agent's computer 260, is established by the call handler. If the audio is determined to be from a machine, then the call leg to the agent is not established, and the call leg to the called party may be terminated by the call handler.

In various embodiments, the RTSA component can be used to further "learn" about instances where the audio is incorrectly determined as being provided by a live person. Recall that in such cases where a live person is thought to be present that the call leg to the agent will be established. In one embodiment, if the audio is determined to be from a machine based on agent input, the call handler can instruct the RTSA component and/or the AMD analysis module to "learn" from this mistake. In other embodiments, the update information specific to this audio greeting may be stored in the data store 275 (either by the RTSA component or the AMD analysis module), This can be used in analyzing audio when a subsequent call is made to the telephone number of the called party. In that way, the likelihood of future errors may be decreased.

Thus, on a subsequent call to that same telephone number, the RTSA component will again analyze the audio. The RTSA component may analyze the audio in a number of different ways and provide the analysis to the AMD analysis module. The AMD analysis module may further use information previously obtained and stored in the data store 275. The AMD analysis module can then more accurately confirm whether the greeting of the present call is from a machine or not. As will be seen, the analysis involves determining whether the audio received from a called party at a given telephone number is essentially the same audio from that same telephone number that is determined earlier to be from a machine. The analysis shares some common aspects of comparing two samples of audio to ascertain if they are the same.

Figure 10:
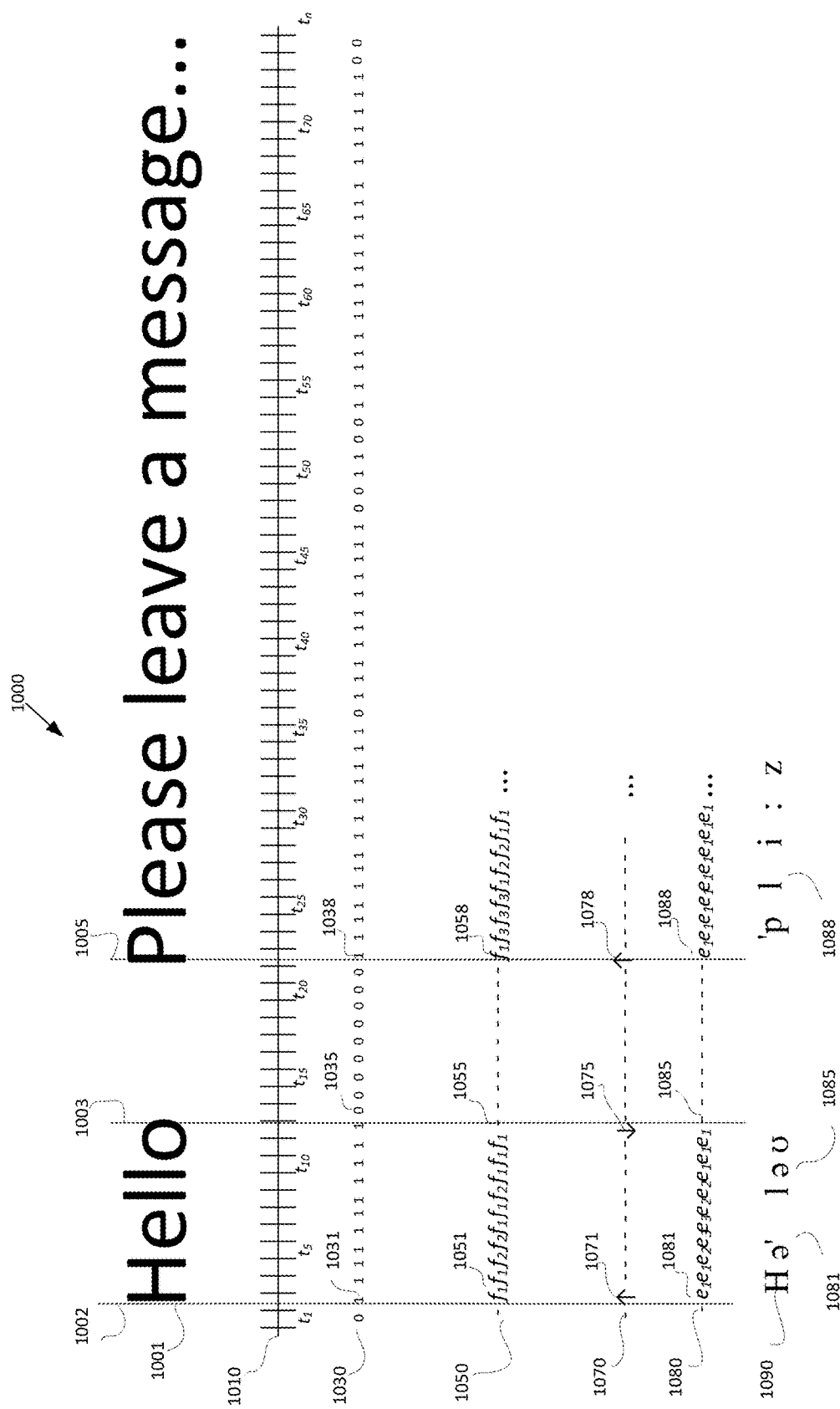
FIG. 10 illustrates various embodiments for obtaining AMD meta-data of a greeting determined to be from a machine.

The analysis by the RTSA component characterizing a greeting can be made in different ways and is referred to as "AMD meta-data". Various approaches are illustrated in FIG. 10. It should be evident that FIG. 10 represents only a subset of the various approaches that could be used in characterizing audio that has been determined to be a greeting from a machine. The process 1000 involves deriving AMD meta-data that characterizes the audio greeting in some way, which can be subsequent used to facilitate a comparison.

The approaches shown in FIG. 10 are based on performing a variety of audio analysis on the speech in a relative short time period. In the example of FIG. 10, a time line 1010 is shown which, for sake of illustration purposes, has time period defined e.g., 10 time periods per second, or a duration of 100 milliseconds ("ms"). In practice, this time period could be much shorter, such as 1 millisecond, or 5 ms. Generally speaking, the shorter the interval, the more accurate or descriptive the results will be, but more data and analysis is required. However, showing a 1 ms time period means that the scale of the drawing would have to be very large. For purposes of demonstrating the concepts and principles, this illustrative time scale is sufficient.

The phrase 1001 analyzed here is, e.g., "Hello. Please leave a message after the beep." (The phrase shown on FIG. 10, however, does not indicate the periods—e.g., punctuation marks—which are included here.) Other phrases could be used to illustrate the concepts. Because of size limitations on the drawing, only a portion of the phrase is shown. However, this scale is sufficient to illustrate the concepts of developing AMD meta-data of the audio greeting.

It should be noted that various vertical reference lines 1002, 1003, and 1005 are shown. These are provided as reference lines showing when the speech either begins or ends. Thus, the first line 1002 reflects the beginning of the word "hello" and the second line 1003 reflects the end of that word. Similarly, the third line 1005 reflects audio beginning with the word "please". Only three such lines are shown, which are sufficient to illustrate the concepts for characterizing the speech.

The time periods are marked as e.g. $t_5$ on the timeline 1010 for reference. Every fifth value is marked, such as $t_5$, $t_{10}$, etc. In this embodiment, it can be observed that the first reference line 1002 occurs during the second time period, $t_2$ (not labeled). This reflects that a slight delay was recorded on the greeting by the machine. Although FIG. 10 shows the delay as approximately 1.5 time periods, in practice the delay may be more or less. Further, the number of time periods depends on the level of resolution of each time period.

Binary AMD Meta-Data Mapping

In the first approach, represented by row 1030, a series of binary values, comprising either a "0" or a "1" are stored in a memory map as AMD meta-data representing the analysis of the greeting. The determination of a "0" represents audio below a threshold (e.g., essentially silence) and a value of "1" represents audio above a threshold (e.g., essentially speech). In the example shown, the first value is "0" for $t_1$ since this represents the initial silence. The next time period $t_2$ is a "1" 1031 which represents speech associated with the letter "h" from the word "hello." The values continue as "1" until $t_{12}$ which is then followed by a "0" 1035 at the end of the word "hello." The following values represent the silence between the words "hello" and "please." The remainder of the pattern of "0s" and "1s" can be seen as correlating to when voice is detected and when it is not.

The example shown is simplified, as there very well may be, in fact, periods of silence detected at later times, of a greater or lesser degree. This, again, depends on the scale of the time periods. Further, the threshold value at which a "1" is determined versus a "0" may alter the resulting pattern. What is evident is that a series of "1s" and "0s" are produced that are unique for this message. This set of binary numbers can be stored in a memory map as a numerical value. In this example, where there are 10 samples per second, data for say, e.g., 5 seconds, would require 50 samples. Since each sample is one bit, and there are 8 bits in a byte, the sample of 50 bits would only require slightly more than 6 bytes of memory.

Because each bit represents the presence of speech in the greeting at a particular time, it is quite unlikely that a person answering the call and providing a greeting would closely match the AMD meta-data determined for that machine provided greeting. In this manner, a simple binary comparison of a binary AMD meta-data of the speech could be used to determine if the greeting encountered is that previously determined to be from a machine. If not, then it is assumed to be from a live person. If the same greeting is encountered on a subsequent call, then a binary AMD meta-data mapping would produce very similar, if not the exact same results. Since many individuals do not frequently alter their AVMC greeting, it is quite likely that a close match of a subsequent greeting can be made with a previously analyzed greeting.

It could be argued that this type of analysis is actually not based on a linguistic analysis, but is more similar to mapping detected time periods of silence and non-silence. However, because this analysis is similar in structure as to the other methods discussed below, it is referred to herein as a linguistic-based analysis.

Frequency AMD Meta-Data Mapping

Another approach is represented in the second row 1050 shown in FIG. 10. This approach is based on performing a frequency analysis of the dominate, fundamental, or some other type of frequency present in the audio. This can be performed using various techniques known to those skilled in the art, from spectral analysis or various digital signal processing methods. In this approach, frequency information is stored for each time period of the duration of analysis of the audio greeting. Since the first time period $t_1$ is silence, the value is null, represented by a "-". The second time period shows that a frequency of $f_1$ 1051 was detected. This is followed by the same frequency until the fourth time period, where $f_2$ is detected and recorded. Then, it may return to $f_1$ 1055. The various frequency values represented by $f_1$ and $f_2$ are representative of an analysis, and other frequency values could be obtained. During the silence period between the second reference line 1003 and the second reference line 1005, the values are represented by a series of "-" until the next frequency 1058 is detected. In this way, the series of values recorded represent a map of the frequencies.

The value of each frequency may require a number of bits to represent. Assuming, for example, that one byte of memory is required to store a corresponding binary value, then 10 bytes are required per second of analysis. If a maximum time of analysis, e.g., 5 seconds, are analyzed and stored, then the total memory storage required would only be 50 bytes. Of course, the higher resolution required requires a greater the number of bytes to be stored. Further, the time period of the greeting to be analyzed may vary, but this example illustrates that mapping requires less data than would be required in storing the audio itself.

Although this is based on analyzing the speech to determine a predominate frequency, other forms of speech analysis can be performed and recorded for each of these time intervals. Although various forms of frequency analysis may be performed, it is still considered AMD meta-data as it is performed with respect to various time periods.

Word Timing AMD Meta-Data Mapping

Another approach is represented by the next row 1070 in FIG. 10. In this case, the up-arrow symbol 1071 and the down-arrow symbol 1075 are used to represent the transition of energy levels in the speech, or alternatively, the beginning and ending of a word. Specifically, a transition from relative silence to speech is represented by an up-arrow 1071. In this first instance, this represents the initial speech from the word "hello." The transition from speech to silence is represented by a down-arrow. Thus, when the word "hello" is completed, the down-arrow 1075 is recorded. When the next word "please" is initial spoken, the next up-arrow 1078 is detected and recorded. A null system "-" is shown between the two symbols. The process continues, although not shown in its entirety in FIG. 10.

The threshold of what constitutes silence and speech may be set at various levels. By adjusting the level up, the markers are not necessarily determined at the very beginning or ending of a word, but only when the energy level crosses a threshold when speaking or ending a word. Regardless of the actual threshold level, a mapping of the word timing or audio energy is produced. Again, this timing would be expected to match the word timing of the same greeting if subsequently encountered on a subsequent call to that telephone number. It is unlikely that the same mapping would be detected if a live person answered the call to that telephone number. Further, in this case, a relative small number of bits are required to indicate these two conditions, and furthermore, compression techniques can be used to compact the storage requirements even further. Although this also measures beginning and ending of speech, it is distinct from the time-based analysis described in FIG. 1, and this approach is another method for generating AMD meta-data.

Energy Distribution AMD Meta-Data Mapping

This approach is illustrated on the next row 1080. In this approach, a relative energy level of the speech is characterized in each time period. This is represented by the symbols $e_1$ 1081, etc. The absence of energy is shown by a null symbol "-" 1085. Thus, a mapping of the relative energy levels is developed. Although only three energy levels are shown, namely $e_1$, $e_2$ and $e_3$, there may be in fact, a greater number of energy levels reported, depending on how granular the measurement may be. Again, encountering the same greeting on a subsequent call would provide an AMD meta-data mapping that is likely to be comparable to one previously derived for that same greeting, but unlikely to match a greeting provided by a live person answering the call, which would likely result in a different AMD meta-data mapping.

This mapping, as with the prior mappings, provides a time-dependent mapping of an audio characteristic of the greeting audio snippet of some sort and as a function of time. This provides a time-dependent, characteristic dependent, mapping of the greeting, which facilitates comparison of the audio on a subsequent call to that number. In other embodiments, a number of parallel analysis can be done, which further provides characteristic data, to further increase the accuracy. Further, a number of other processing methods known to those skilled in the art could be done to derive a unique characteristics of the greeting that could be compared when the greeting is encountered on a subsequent call. In fact, a number of such analysis can be done, and the comparison may use various algorithms for "voting" in order to ascertain whether the detected audio greeting matches the AMD meta-data previously obtained for that telephone number. For example, if one set of AMD meta-data is similar, but slightly different, then one or two other sets of AMD meta-data can be used and compared. For example, the energy level AMD meta-data mapping 1080 may vary slightly based on network carrier characteristic, such that the detected energy levels of a greeting may be slightly different when calling the same number at a subsequent time, though the relative timings would likely be similar. In other words, the same greeting encountered at different times may have the same timing, but the energy levels may be slightly different because of the carrier infrastructure used on the different calls. However, these may be deemed "similar enough" so that it determined to be the same audio greeting previously analyzed.

Those skilled in the art can readily ascertain in light of the present disclosure, a number of such mappings could be quickly and easily obtained for a greeting and stored as AMD meta-data, and subsequently used for determining whether a subsequently encountered greeting has the same characteristics as the earlier greeting.

Semantic AMD Meta-Data Mapping

Another approach is to perform an analysis of the speech that is more linguistic focused. In this approach, the audio of the speech is analyzed on a linguistic level, specifically to identify phonemes that are present in the speech. Phonemes are basic, fundamental sounds used in a language. While linguistic experts have defined a set of 44 phonemes for the English language, the set used by a RTSA component may be greater. Regardless of the set used by the RTSA component, the RTSA is configured to ascertain a phoneme-by-phoneme mapping of audio. In this case, it can be applied to a greeting. This is represented by the last row 1090 in FIG. 10, which shows standardized phonemes 1081 and 1085 for the word "hello" and phonemes 1088 for the word "please." These are represented using one industry accepted format for phonemes for these words, but other formats and representations may be used. A RTSA component may have a greater number of phonemes, and their definition may be proprietary.

The phoneme based AMD meta-data mapping approach may capture a time aspect by capturing the phonemes with respect to the time periods. In other embodiments, the AMD meta-data mapping may simply capture be the sequence of the phonemes. By determining a phoneme mapping of audio encountered (however this is done), a comparison of current audio of a greeting can be compared with that of a prior determination of a known machine originated greeting. It is expected that a person answering a call would not use the same greeting as found on an AVMC, so that the phoneme sequence would not match. On the other hand, if the same machine greeting is encountered, the phoneme sequence would be expected to match.

The above approaches illustrate various ways that an RTSA system, or some other component, could be used to analyze the audio of a greeting in a more sophisticated manner. No doubt those skilled in the art of speech comparison techniques could readily develop alternative techniques that could be used, and such techniques could be used to practice the concepts and technologies herein as well. Thus, a variety of technologies could be used to obtain a unique "signature" of a known machine provided greeting that is stored and used when calling the same telephone number at a subsequent time to ascertain if the subsequently provided greeting is also provided by a machine.

Figure 11:
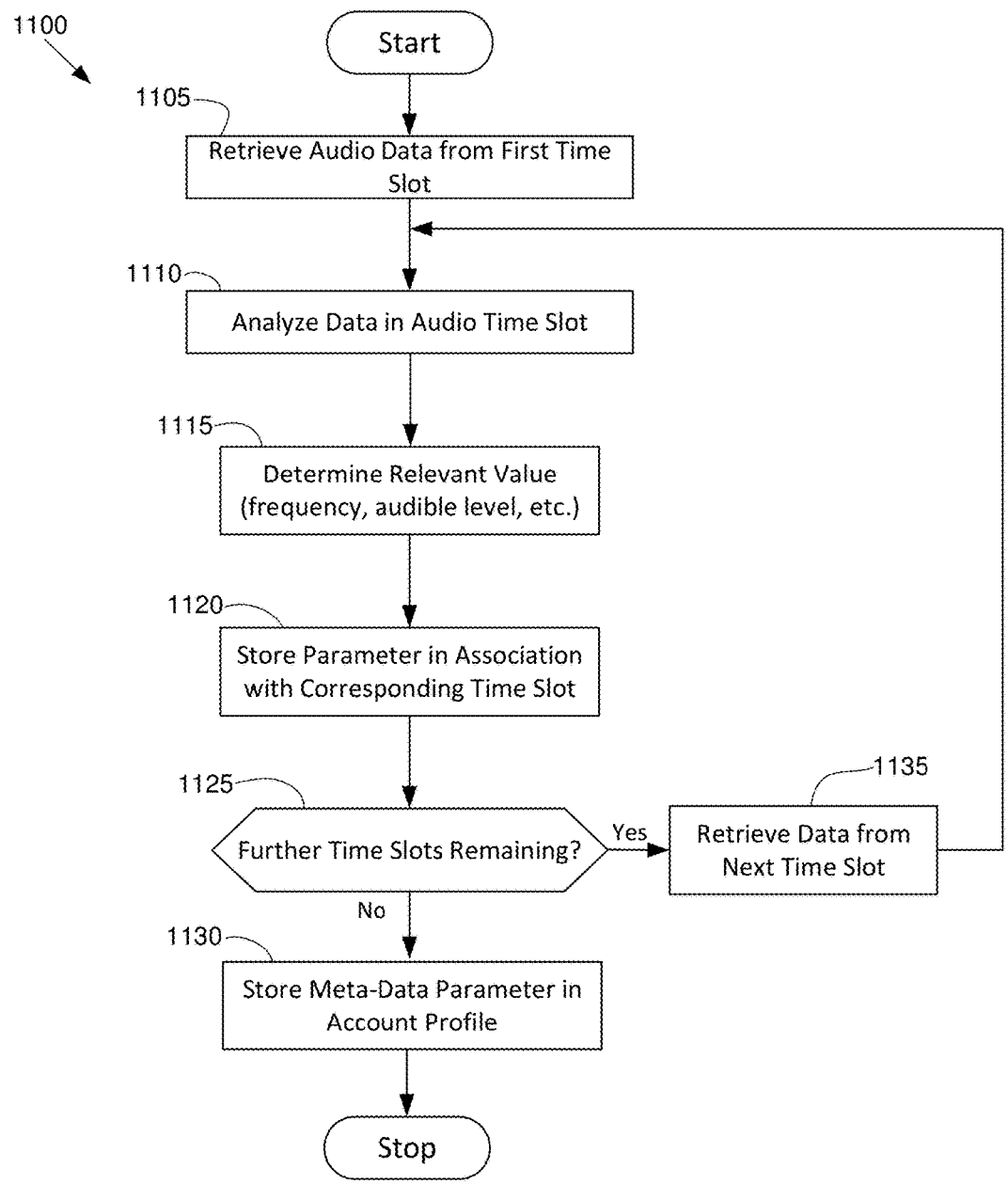
FIG. 11 illustrates one process flow for processing a greeting to determine AMD meta-data.

One embodiment for the process for obtaining the AMD meta-data mapping is shown at a high level in process 1100 of FIG. 11. The process assumes that the audio snippet of the greeting is stored in memory for processing. The process begins with retrieving the audio data of the first time slot of the greeting in operation 1105. That audio data is analyzed, according to which ever technique is selected in operation 1110. As discussed above, a variety of technologies, algorithms, and approaches may be used. The relevant data value is determined in operation 1115, and is stored as AMD meta-data for that time slot in operation 1120. Next, a decision is made as to whether additional time slots remain to be analyzed in operation 1125. If so, then audio data from the next time slot is retrieved in operation 1135 and the process loops back to operation 1110, where the process repeats. If there are no more time slots remaining, then the AMD meta-data is stored in conjunction with the account (i.e., the telephone number) in operation 1130. The process is then completed. This process creates the AMD meta-data that characterizes an audio greeting, which can be used on subsequent calls to ascertain if the greeting is from a machine.

Figure 12:
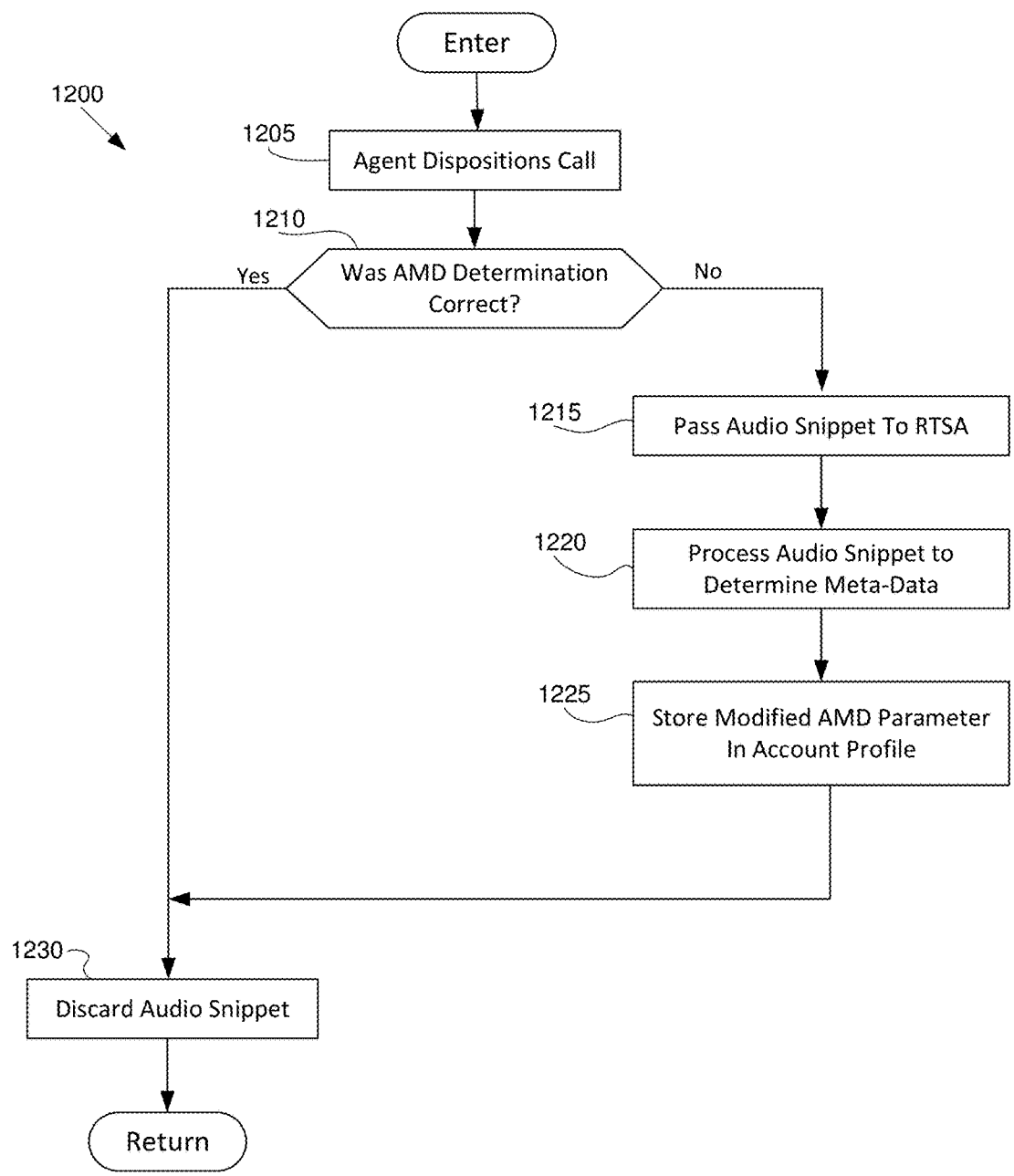
FIG. 12 illustrates one embodiment of a process flow for initiating and obtaining AMD meta-data using a RTSA component.

This process of analyzing the audio snippet may be initiated as shown in FIG. 12. Turning to FIG. 12, the process 1200 picks up during the point where a call that has been originated, determined to be a live person, and the agent is connected to the call. Further, the process presumes that that audio greeting is retained for potential analysis. At the end of the call, the agent will disposition the call. This involves the agent entering data to their computer workstation indicating aspects of the voice call they just handled. Typically, this happens immediately after the call is terminated, but may occur while the agent is still connected. The agent will indicate, in some manner, that the AMD determination was correct in operation 1210. For example, if the agent was actually speaking to a live person, then the AMD determination that the audio greeting was from a live person was correct. If so, then agent may disposition the call in various ways that indirectly indicates a live person was reached. The process then discards the audio snippet in operation 1230.

If the AMD determination is incorrect in operation 1210, which may be indicated directly or indirectly by the agent, then the process continues by providing the stored audio snippet to the RTSA component for analysis in operation

1215. Next, the audio snippet is processed to ascertain the AMD meta-data mapping in operation 1220. The AMD meta-data is then stored in the account profile in conjunction with the dialed telephone number in operation 1225. In various embodiments, the control and management of the RTSA system may involve the AMD analysis module. Thus, one skilled in the art would understand that passing the audio snippet to the RTSA component in operation 1215 may actually involve passing it to the AMD analysis module, which in turn provides it to the RTSA module.

The processing shown in operations 1215-1225 may occur in real-time, as described above. However, it may also occur in non-real time. In this case, the audio snippets are retained in temporary memory or in a file. A list of calls where the AMD determination was incorrect may be generated at the end of the day. For each instance, the corresponding audio snippet may be retrieved from memory, and processed to ascertain the AMD meta-data. This may shift some of the processing required by the RTSA during peak calling hours to non-peak hours. Once each set of AMD meta-data is determined, it is then stored in a profile associated with the telephone number of that account. Then, upon subsequent calls to that number, the AMD meta-data may be retrieved and used in analyzing the greeting.

Architecture for Using RTSA Components to Supplement AMD Analysis

Figure 13:
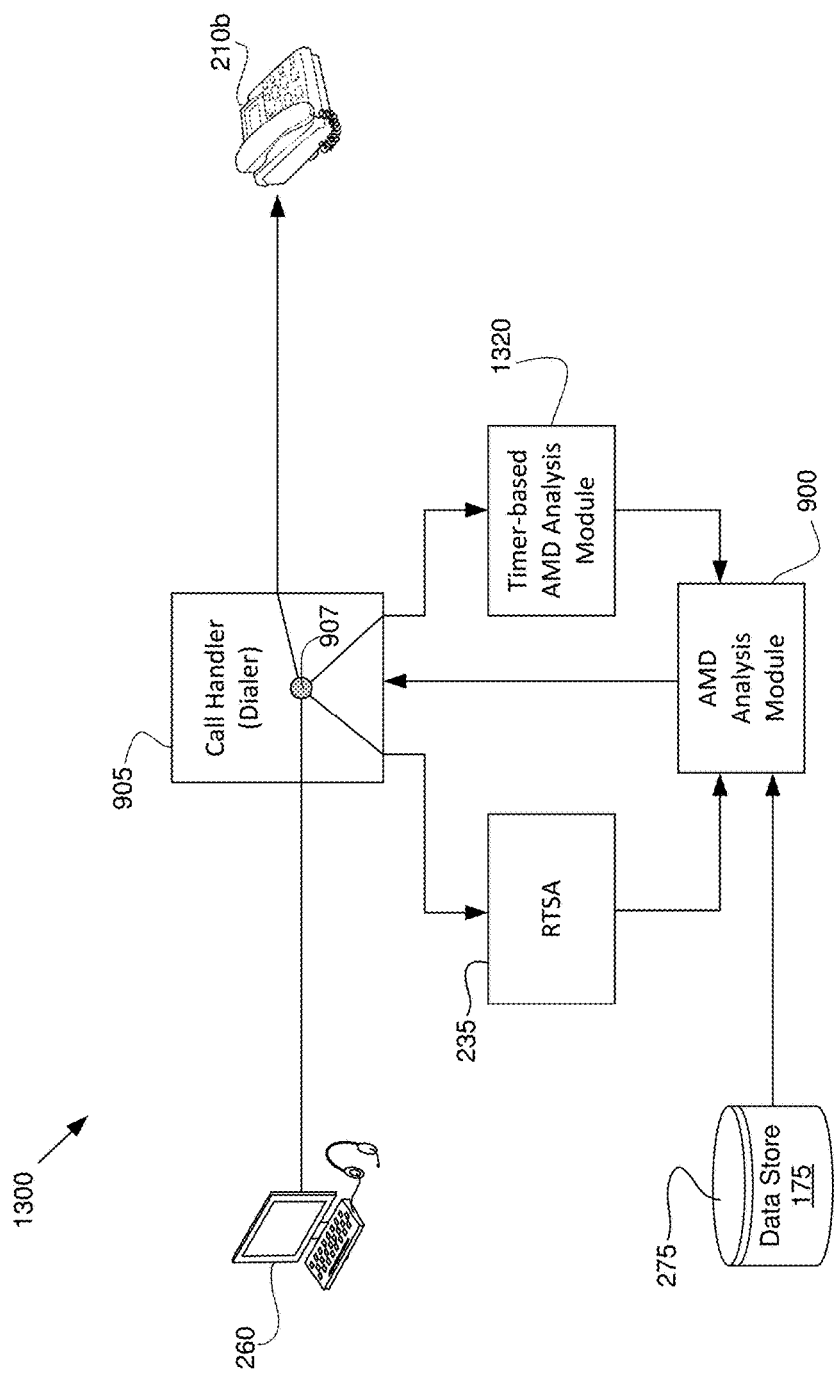
FIG. 13 illustrates one embodiment of an architecture for using a RTSA component along with a timer-based AMD analysis module to improve the determination of whether a greeting originated from a live person or a machine.

FIG. 13 shows another embodiment of using an RTSA component to perform AMD analysis. This is similar to FIG. 9, but represents using the RTSA to augment or supplement other forms of AMD analysis. It can also represent an evolution in AMD analysis, since many contact centers already have a non-speech form of AMD analysis of some form (e.g., typically a timer-based form of analysis).

The system 1300 of FIG. 13 comprises the call handler 905 that originates the call leg to the called party, represented by telephone 210b. This call leg is illustrated as connected to the conference bridge 907 in order to allow the audio signals of the answering entity to be provided to both the RTSA component 235 and a timer-based (i.e., non-linguistic) AMD analysis module 1320. In some embodiments, the timer-based AMD analysis module 1320 may be an existing or conventional AMD analysis function based on the relative silence/voice detected in an audio stream, previously discussed. The timer-based AMD analysis module 1320 may be integrated into the call handler in other embodiments. Such a timer-based AMD analysis module does not operate by analyzing the content or semantics of the speech, but does provide an input to the AMD analysis module 900 that is used in determining whether the audio is from a live person or machine. This may use the techniques discussed earlier in conjunction with FIG. 1. Similarly, the RTSA component 235 also provides data to the AMD analysis module 900 that is used in determining whether the audio is from a live person or a machine. This may include generated AMD meta-data of the current encountered greeting. The AMD analysis module may also retrieve AMD meta-data from a data store 175 that is used in evaluating and comparing the AMD meta-data generated by the RTSA component.

The system shown in FIG. 13 can be used in various ways. Not all embodiments or variations are explicitly detailed herein. One embodiment involves using either the RTSA system or the timer-based AMD analysis module. The choice depends on whether AMD meta-data for the telephone number has been previously obtained and is stored in the data store. One embodiment of this process is illustrated in FIG. 14.

Figure 14:
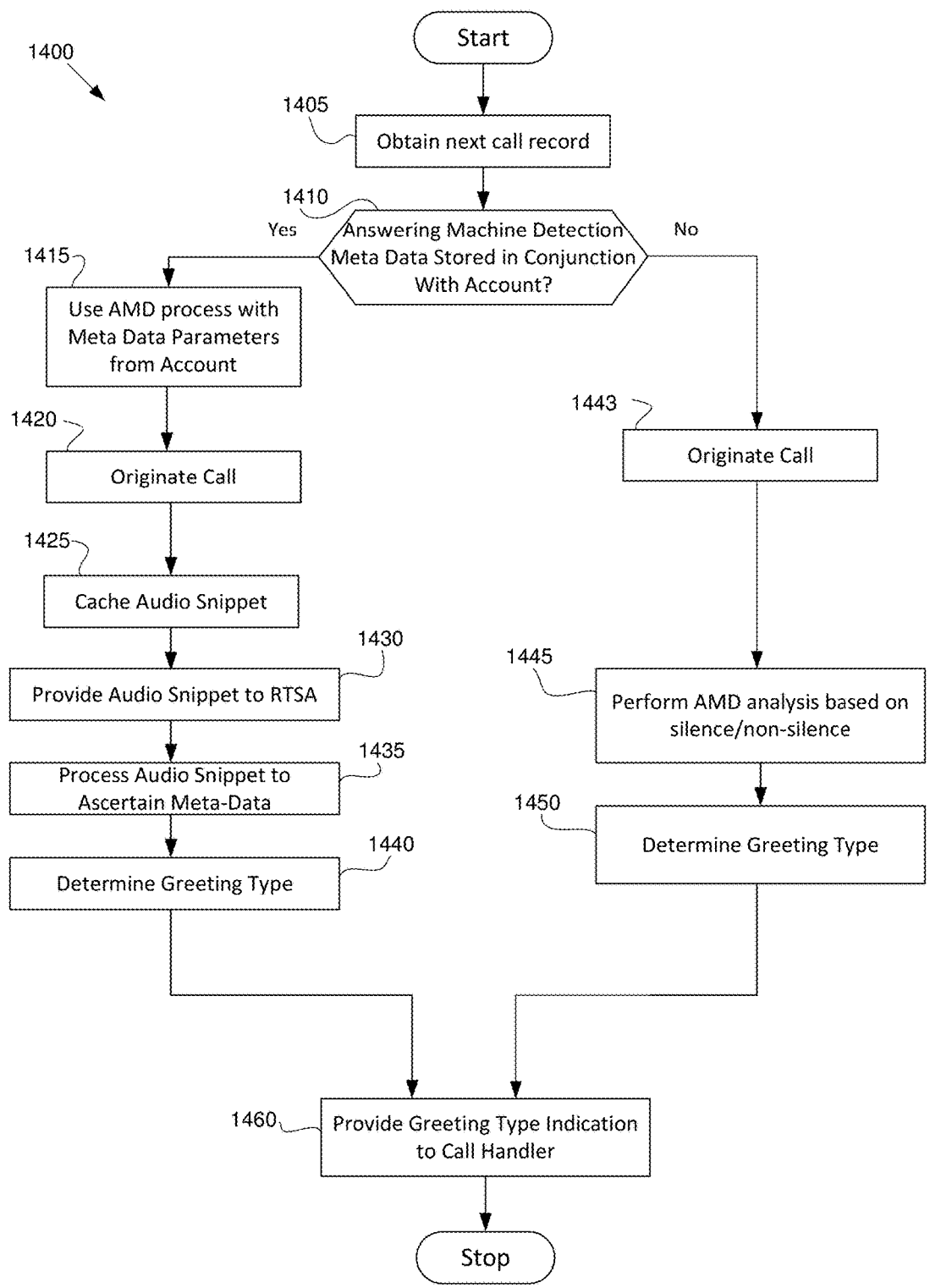
FIGS. 14-15 illustrates embodiments of a process flow involving use of a RTSA component along with a timer-based AMD analysis module to determine whether a greeting originated from a live person or a machine.

Turning to FIG. 14, the process begins with retrieving a call record from a calling list in operation 1405. The process determines whether that call record, telephone number, or account has, indicates in some manner, or is associated with, the existence of previously generated AMD meta-data for a greeting associated with that telephone number in operation 1410. If there is none, then the process continues by originating the call in operation 1443. This path represents the existing procedures for connecting the call and ascertaining whether the greeting is from a machine or a live person. Thus, the next operation shown is performing the AMD analysis using the audio data to analyze the relative time periods of silence and non-silence in operation 1445. From this a determination of a greeting type is made in operation 1450, and that indication is provided to the call handler in operation 1460. The call handler will connect the call to the agent if it is determined to be a live person, or terminate the call (or perform some other action) if it is a machine.

Although not shown, if a subsequent disposition of the call from the agent indicates an error occurred, i.e., the determination of a live person was incorrect, then the process shown in FIG. 12 be invoked. This would result in generating AMD meta-data for that telephone number. On the other hand, if the process outcome is correct, then the process terminates. (In other embodiments, the next record is obtained, and the process repeats until it terminates.)

If however, after retrieving the call record in operation 1405 it is determined there is AMD meta-data associated with the account, telephone number, call record, or called party in some manner, then that information is retrieved and provided to the RTSA component (or the AMD analysis module) in operation 1415. The AMD meta-data would be present if a prior determination using the existing AMD process resulted in an error. The call is then originated in operation 1420, and the audio greeting obtained (assuming of course, the call is answered). The audio snippet is provided by the call handler via the conference bridge to the RTSA component in operation 1430. Thus, the RTSA component will analyze the audio to determine the AMD meta-data in operation 1435. This may be any of the aforementioned techniques, described in FIG. 10, but must be the same technique used to generate the stored AMD meta-data that is retrieved for comparison. The AMD meta-data determined by the RTSA component may be passed to the AMD analysis module, which also has the previously stored AMD meta-data, and the two are compared in operation 1440 to determine the greeting type. Specifically, if the AMD meta-data generated by the RTSA component for the audio snippet of the current call matches the stored AMD meta-data, or is deemed similar enough to be considered a match, then the current audio snippet is presumed to be from a machine. This indication is then provided to the call handler in operation 1460.

In essence, the process 1400 determines whether there has been a prior analysis of an audio snippet determined to be a machine greeting. If so, then the stored AMD meta-data is retrieved from that associated account in anticipation of when a subsequent call is established and answered to the number. The RTSA component then analyzes the greeting for the same type of parameters and compares them to the stored value. However, if there is no AMD meta-data stored, then the existing conventional procedures are used. Thus, this approach relies on using the existing procedures if there is no AMD meta-data stored in the account and using the enhanced RTSA/AMD analysis module procedures if there is AMD meta-data in the account.

Figure 15:
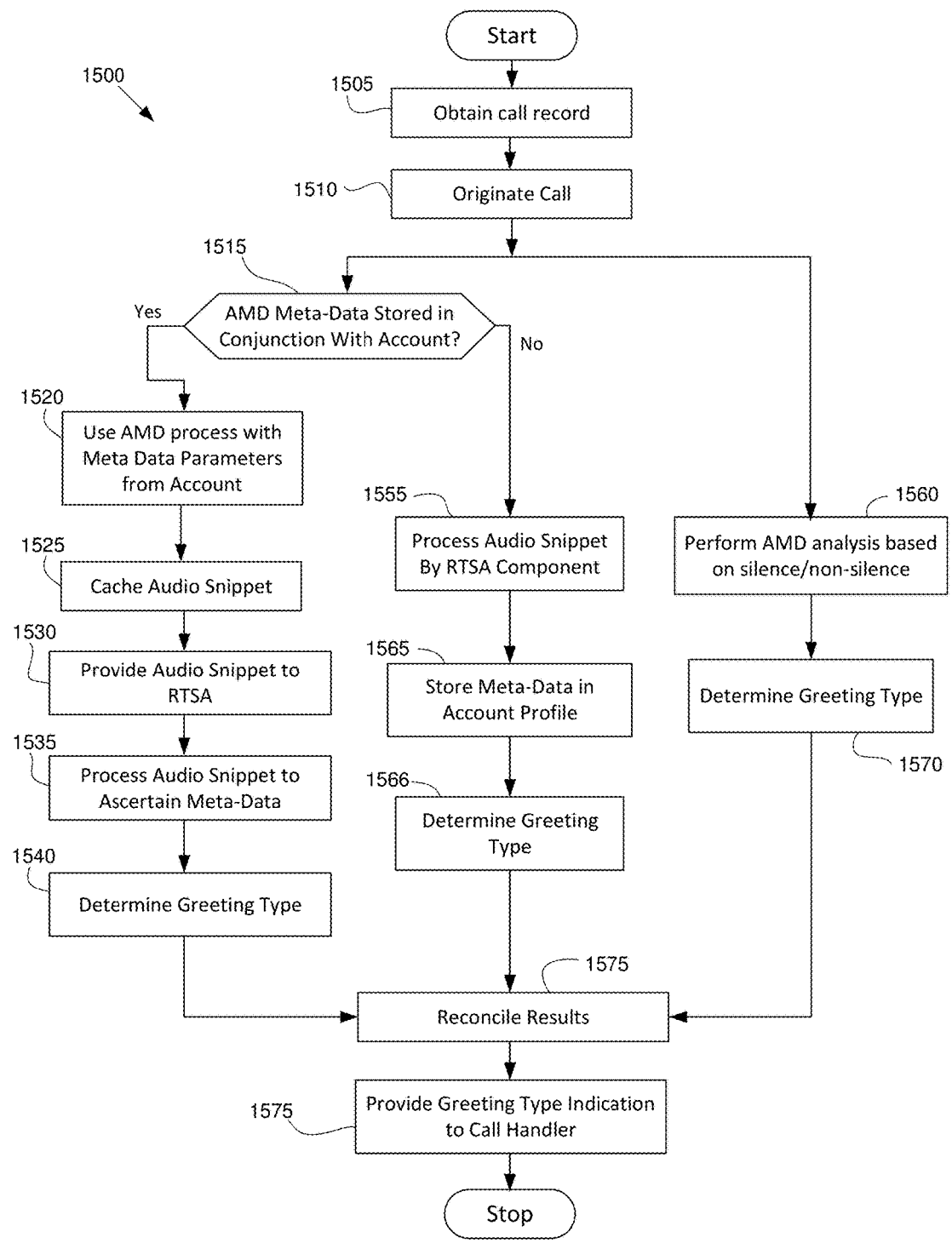

Another embodiment is shown in FIG. 15. In this embodiment, both the RTSA and conventional AMD processes are used, regardless of whether there is prior AMD meta-data. However, how the RTSA/AMD Analysis module is used depends on whether there is stored AMD meta-data. The process 1500 begins with obtaining the call record in operation 1505 and originating the call in operation 1510.

The process then is shown as dividing, but in this case, both paths are followed. That is, the process continues both at operations 1515 and 1560 in parallel. The process that continues to operation 1560 represents the conventional timer-based AMD analysis performed using the detection of silence/non-silence (i.e., voice). From this, a determination is made in operation 1570 as to whether the greeting is from a machine or voice. The results are provided to the AMD analysis module in operation 1575, where it will reconciles the results from the other input in some manner.

Simultaneously, the process flows to the decision in operation 1515. There, a test is made as to whether there is AMD meta-data stored in conjunction with the account. This could be, e.g., AMD meta-data stored in conjunction with the telephone number specifically, or some indication in the call record or other source that AMD meta-data is associated with the account, telephone number, carrier, or other characteristic that the called number is associated with. If there is, then the process continues by retrieving the AMD meta-data for use in the AMD processing in operation 1520. The audio snippet is cached for further processing in operation 1525. The audio snippet is then provided to the RTSA component in real-time in operation 1530. The RTSA performs the analysis and provides the results to the AMD analysis module in operation 1535. The AMD analysis module performs a preliminary analysis of the greeting type in operation 1540. This is a preliminary analysis, because in this embodiment, the AMD analysis module is also the entity that reconciles the results in operation 1575. Turning to that operation 1575, the results from the RTSA analysis (operations 1520-1540) are reconciled with the results performed in operation 1560-1570.

If however, there is no AMD meta-data stored or indicated in the call record in operation 1515, then this means there is no prior AMD meta-data to analyze. However, that does not mean that the RTSA component cannot perform an analysis on the greeting. The audio snippet greeting is provided and processed by the RTSA in operation 1555. There may be more than one type of analysis performed at this step. A first analysis may be to process the audio snippet to ascertain the AMD meta-data so that it is available for subsequent call processing. These results are stored as AMD meta-data in the account in operation 1565. This could be accomplished in various ways, including indicating the AMD meta-data is associated with the telephone number, the account, or call record, using a variety of indicators and/or data structures. While that analysis performs an initial analysis of the audio greeting to characterize it via meta-data, that analysis does not by itself indicate whether it is a machine greeting or live person greeting.

Additional processing may occur at operation 1555 to determine whether the audio snippet is a greeting from a machine. This may involve analysis of the phonemes, e.g., to determine the number and type of words being uttered. If the number words is greater than a threshold, then this suggests a machine greeting. This analysis, while similar to the silence/non-silence type of analysis, is more accurate in its results. That is because words spoken quickly without a pause are not registered as separate words using a silence/non-silence analysis, but a phoneme analysis can distinguish multiple words with minimal pausing. Further, the phoneme analysis can detect phonemes which may commonly be expected on a machine greeting, such as "record" "please" "after", "can't answer", "not here", as well as the presence of a numbers in a telephone (e.g., the greeting states the number reached), etc. The detection of phonemes is an improvement over analyzing speech to produce text which is analyzed, because phoneme matching is faster. Text-based analysis requires analyzing the phonemes to develop words, and typically several words have to be analyzed in order to properly ascertain the text. The combination of the number of phonemes, their order, and the words matched may suggest that the audio snippet is a machine greeting. For example, rarely does a person answer a phone call by stating "You have reached 555-1212." However, it is not uncommon for an AVMC greeting to indicate the number reached. Thus, detecting numbers in the greeting by the RTSA system suggests the greeting originated by an AVMC. This analysis occurs in operation 1566. The results are then reconciled in operation 1575. It is apparent that the operations shown in operations 1555 and 1565 can occur in reverse order.

The reconciliation occurring in operation 1575 uses the results from the RTSA AMD processing and conventional timer-based AMD process. The reconciliation is straightforward if both indications suggest the same outcome. The reconciliation process is more involved if the indications are different, such as when the RTSA/AMD analysis module outcome indicates a machine and the conventional processing indicates a live person. Or, the RTSA/AMD analysis module outcome indicates a live person and conventional processing indicates a machine.

In such situations, a relative confidence indicator of each process could be used to weigh the outcomes of each result. In this case, if the determination does not exceed a threshold (e.g., 'highly confident') then the outcome may be given less weight. In another embodiment, the RTSA/AMD analysis may override the conventional AMD processing, since the RTSA/AMD analysis is likely to be more accurate. In such instances of conflicting indications, the audio recording may be stored and labeled for subsequent analysis. In other embodiments, a rule may be applied such that if there is a discrepancy in the two processes, treatment for encountering a live person should be the default treatment. Assuming there is a live person will result in the agent being connected to the call. This will avoid accidentally hanging up on a live person that may be the treatment if the greeting is incorrectly interpreted as an AVMC. Further, if a live person is presumed, but is incorrect, the agent can then disposition the call, and an updated analysis of the AMD meta-data may be performed.

Once a determination is made based on the two inputs, the AMD analysis module provides the indication to the call handler in operation 1575. The operation is then completed. The call handler will connect the agent or terminate the call as indicated by the determination. The process may be repeated for the next call record (not shown).

Storing AMD Meta-Data in Conjunction with an Account

In FIGS. 14 and 15, a test is defined (e.g., operations 1410 and 1515) that determines whether any specific AMD meta-data is to be applied. That AMD meta-data is to be applied could be ascertained by reviewing a flag or other indicator in the call record itself or in another data structure, which indicates that specific AMD meta-data is to be retrieved and applied. In one embodiment, a flag associated with the telephone number is included in the call record that indicates the existence of such AMD meta-data and indicates a location from which it can be retrieved. In other embodiments, account level information may be accessed, which may store or indicate such AMD meta-data for various numbers associated with the account. A variety of ways can be defined for providing such indications such that the processing of a call record results in retrieving and applying the AMD meta-data for that call. The AMD meta-data may be unique to the called telephone number or it may be common to a number of called telephone numbers. Thus, an AMT meta-data template (e.g., for a particular wireless carrier) could be indicated in the call record or account level information and applied. The process shown in FIGS. 14 and 15 are but one embodiment, and other embodiments are possible and intended to be within the concepts and technologies disclosed herein.

Procedures for Comparing AMD Meta-Data

The comparison of AMD meta-data stored in an account with that generated for a present call can rely on well-known techniques and procedures. There may be minor differences in the AMD meta-data obtained for a present call with that data stored, based on the particular metrics used. These differences may be due to, in part, different carrier network's performances, which may impact a particular set of AMD meta-data, both in the values stored in the account and those obtained for the current call. For example, determining an energy level at various time slots of a greeting may be impacted by attenuation encountered by intervening carrier networks. Thus, two calls to the same number at different times may encounter the same greeting, but with slightly different energy levels. This is possible if analog networks are traversed, if equipment in the carrier's network is configured to alter the gain of the audio signal, or certain packets are delayed in transit, etc. Thus, a series of energy levels may be consistently a fraction of percent higher/lower when comparing AMD meta-data.

In other embodiments, certain digitized voice packets may have a slight time variation due to network congestion. Certain packets may be dropped and appear as silence. A comparison algorithm used to compare the AMD meta-data and should be configured to tolerate certain minor variations as such anomalies. For example, a silence may be a result of "dropped voice" packets. This may have a slightly different characteristic than silence as the result of a pause between words. The exact threshold as to how much of a difference can be tolerated will depend on a case-by-case analysis. For example, using shorter time periods when analyzing the AMD meta-data is likely to result in more discrepancies, but those may be relative minor in scale. Those skilled in the art will recognize some "fine tuning" may be required as to how strict of a comparison is required to determine whether there is a match or not.

Incorrect Determination that Greeting is from a Live Person

When comparing AMD meta-data stored in an account with AMD meta-data generated for a specific present call, it is possible that the comparison indicates there is no similarity of the results. Such an outcome may be due to, in some instances, too strict of a comparison. Some minor discrepancies are possible, as noted above.

However, there is one situation which will likely cause a mismatch. Namely, a machine greeting is analyzed and AMD meta-data is obtained and stored in the account. Then, the called party re-records or changes their AVMC greeting. When the new AVMC greeting is encountered in a subsequent call and used to generate AMD meta-data, the comparison with the stored AMD meta-data will likely result in a mismatch. This may cause the new greeting to be classified as originating from a live person, because the AMD meta-data does not match the old greeting. If so, the outcome will be that the agent will be connected to the call.

In such case, the agent will disposition the call as having been incorrectly classified. As discussed earlier, whenever an error is determined to have occur of this type, the audio snippet of the current call can be re-processed to obtain updated AMD meta-data, and it would replace the prior stored AMD meta-data. In this manner, AMD meta-data for an old machine greeting will be automatically updated and replaced with that of the new machine greeting. Upon a subsequent call to that same number, the AMD meta-data should then be similar. Thus, in this case an error will occur, but it will be corrected for the next call. Thus, this approach is somewhat "self correcting" when such errors are encountered.

Use of Various AMD Templates

A set of AMD data, whether it be timer-based values or AMD meta-data, used in a particular context, whether it be for all lists, a particular list, or a number on the list, may be referred to as a "template." Various AMD templates have been identified above. There may be a generic AMD template used for all calls, across various calling lists. In other applications, a particular template (call-specific list) could be used for dialing numbers in a particular calling list. The calling list could be, e.g., a list of numbers that are wireless numbers served by a particular wireless carrier. In such an application, there may be a template that is optimized for detecting greetings from that wireless carrier's voice mail systems. A calling list comprising wireless numbers from two or three wireless carriers may therefore use two or three corresponding AMD templates. The corresponding template would be used based on the carrier serving the number being dialed. As a new calling list for a new wireless carrier is loaded, an associated AMD template is loaded and used. As noted earlier, the calling list could be organized on some other basis and have an associated AMD meta-data template.

As noted earlier, there may be AMD template specific for a particular call to a number in the calling list. This could be the aforementioned AMD meta-data determined for a particular greeting when calling a particular telephone number. If so, then such a call-specific AMD template could be used, in lieu of a more generic version. For example, a calling list comprising wireless numbers may use a carrier-specific AMD template as a default template, but a wireless number specific template may be used when dialing that specific wireless number.

Figure 16:
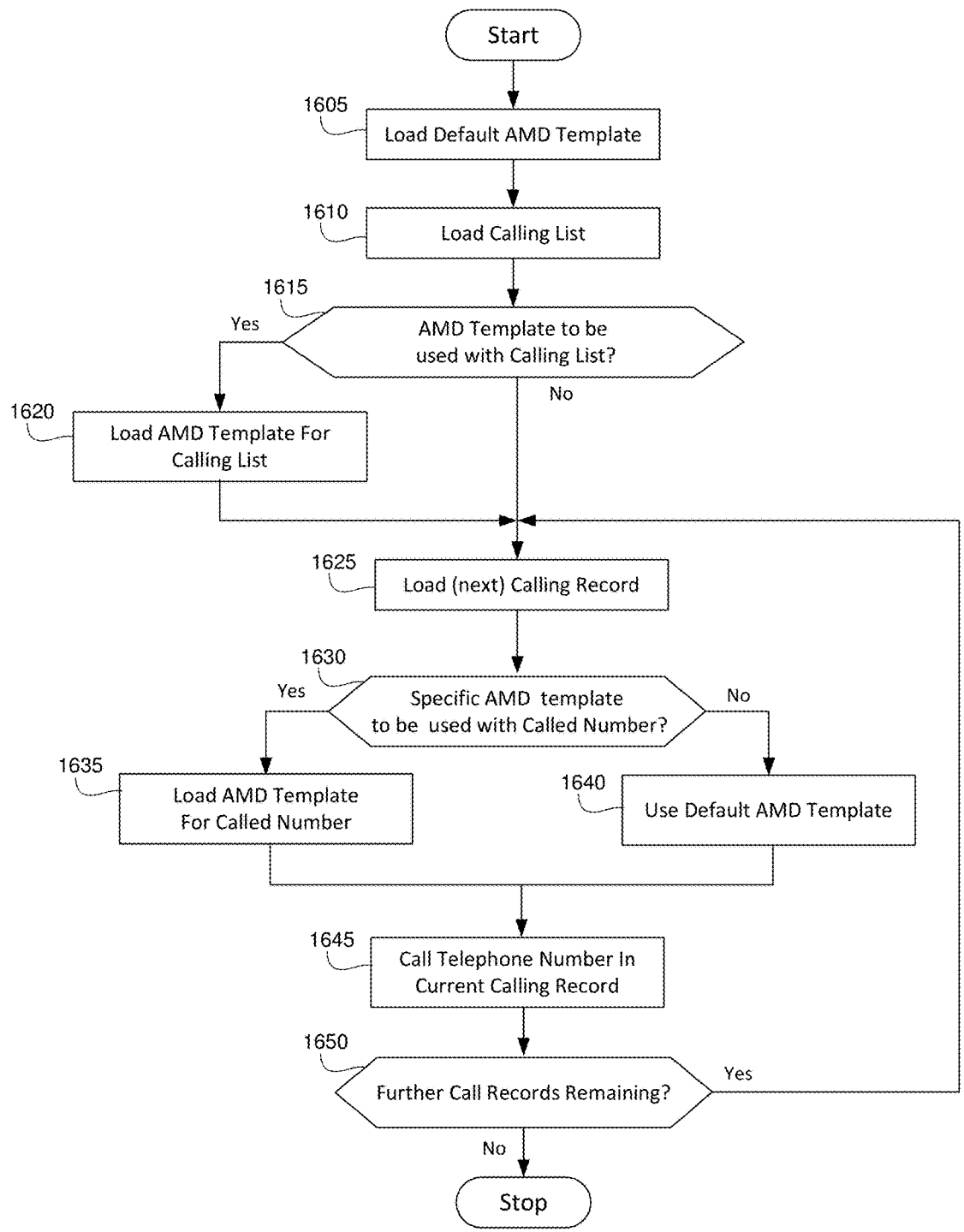
FIG. 16 illustrates one embodiment of how various AMD meta-data templates may be used when originating calls.

One embodiment of a process flow to illustrate how different AMD templates may be used is shown in FIG. 16. Turning to FIG. 16, the process begins with loading a default AMD template in operation 1605. This may be a template optimized for general usage that could generally apply to any number in the absence of more specific information.

Next, the particular calling list to be processed in loaded in operation 1610. That list may have an optimized AMD template associated with it. If so, as determined in operation 1615, that particular AMD template is loaded in operation 1620. This may be e.g., a template optimized for the carrier used in making calls to records in the calling list. It may be a template optimized for a particular demographic associated with the calling records in the list. Other variations are possible. If there is no particular template to be used, then the process continues from operation 1615 to operation 1625.

In operation 1625, the next appropriate calling record from the calling list is retrieved and processed for call origination. That calling record may indicate (in various ways) that a more specific AMD template may be associated in some manner with the telephone number to be dialed. If that determination is made in operation 1630, then that AMD template is loaded in operation 1635 and used. If not, then the presently applicable AMD template is used in operation 1640. The presently applicable AMD template may be a generic or list specific form, and it could be timer-based or meta-data based.

Next, the call to the telephone number is originated in operation 1645 and the selected ADM template is used to ascertain a greeting, if encountered, is from a machine or a live person. A determination is made in operation 1650 whether there are additional call records in the calling list to process. If so, the process loops back to retrieving the next call record in the calling list in operation 1625. If there are no more records, then the process is completed.

For purposes of this process flow, it is possible to have a mix of timer-based AMD parameters as a generic template used when e.g., processing a list, and then using a telephone number specific set of AMD meta-data. Or, a generic set of AMD meta-data may be used as a template for all calls, but replaced with a more specific AMD meta-data template for calls involving a specific wireless carrier, and/or replaced with a number-specific AMD meta-data template if one exists for a particular wireless number. Thus, it is possible to have a number of templates and types of AMD data involve when calling numbers on a list.

Call Pickup Time Analysis

Another approach for obtaining information as to whether a live person or AVMC has answered the call can be obtained by analyzing the call pickup time. The "call pickup time" refers to the duration of how quickly the call is answered. Thus, this involve analyzing data obtained before the call has been answered, and does not involve analysis of the greeting itself. In one embodiment, the call pickup time is the duration between when alerting begins at the called party's interface and the called party answers the call. This can be measured at the called party's interface using signaling messages indicating when alerting begins and the call has been answered. Another measurement that will be discussed is the "call answering time," which is the duration from when the call is originated to when the called party answers.

Figure 17A:
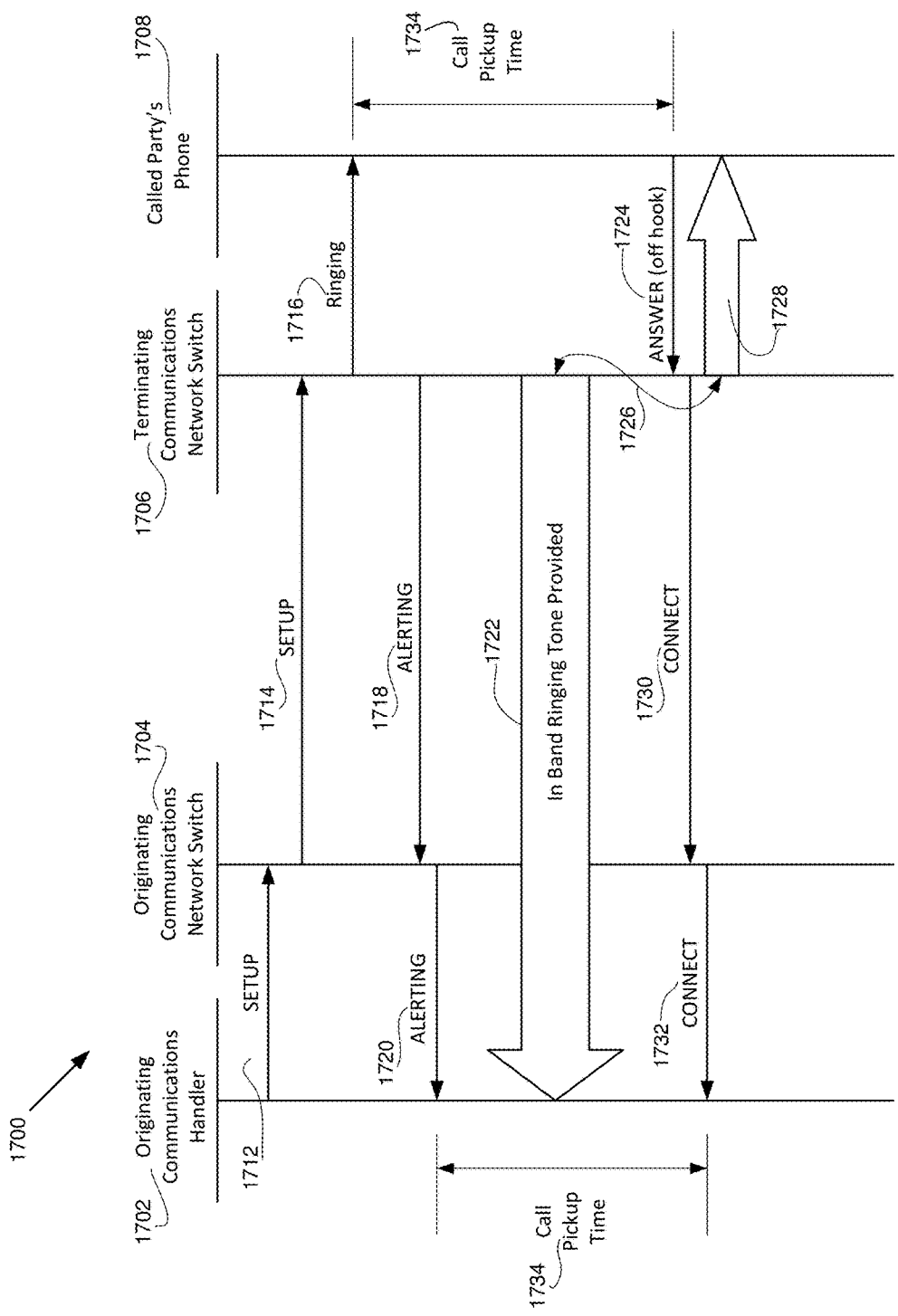
FIGS. 17A-17B illustrate embodiments of messaging diagrams related to detecting call pickup time or call answer time in various situations.

Turning to FIG. 17A, a messaging diagram 1700 provides a more detailed explanation of the call pickup time. A call is originated by a communications handler 1702 to the called party's phone 1708. In this example there is an originating communications network switch 1704 receiving the call request from the originating communications handler 1702. The originating communications network switch 1704 then establishes the call to a terminating communications network switch 1706 that serves the called party. In other examples, there may be only one switch serving both parties, or three or more switches involved in routing the call to the destination. Further, a variety of technologies may be involved, such as ISDN, signaling system #7 ("SS7"), SIP, and other signaling systems. Those skilled in the art of signaling protocols will recognize that various approaches for interworking are possible. The message diagram of FIG. 17A is based on one potential signaling protocol, though other types and messages may be used. Those skilled in the art will be able to recognize functional equivalents to the messages indicated in various signaling protocols.

The call originates by the communications handler sending a call origination request in operation 1712. In one embodiment, an ISDN signaling protocol may be used, such as those based on the Q.931 standard, for a basic rate or primary rate interface. Thus, the call origination request could be an ISDN SETUP message. In other embodiments, SIP, ISDN User Part ("ISUP"), H.323, or other VoIP signaling protocols may be used. Assuming an ISDN signaling protocol is used, the originating communications network switch then sends a SETUP 1714 message (or an equivalent message, such as an ISUP Initial Address Message, based on the appropriate signaling protocol) to the terminating communications network switch 1706. This causes ringing (a.k.a. an alerting indication) 1716 to be initiated to the called party's phone. The terminating communications network switch 1706 will typically provide a signaling indication message, such as the ALERTING message 1718 back to the originator reflecting that the called party's interface is alerting or ringing. In other words, this message indicates that the call is being offered to the called party's interface. The originating communications network switch 1704 receives the ALERTING message and provides a similar or the same ALERTING message 1720 to the communications handler. Now the communications handler 1702 knows that the call is being offered to the remote party's interface.

During this time, the terminating communications switch may be providing an audible ringing tone 1722, which is conveyed in-band through the originating communications network switch 1704 to the originating communications handler 1702. Thus, the originating communications handler will "hear" in-band ringing signifying the call is being offered to the called party. The originating communications handler will typically rely on the ALERTING signaling message, as opposed to interpreting the in-band tones, to determine the call is being offered, but an audio signal processor could be used to also detect any in-band tone or information. A person who originates the call (e.g., in lieu of the originating communication handler) would rely on hearing the audible ringing as an indication that the call is being offered. Hence, the in-band audible ringing is largely provided for the benefit of a human caller.

At some point, the called party may answer the call. By lifting the phone receiver off hook (e.g., lifting the handset or other appropriate action), an Answer signal 1724 is conveyed to the terminating communications network switch 1706. At that point, the audio channel 1728 to the called party's phone is connected to the audio channel 1722 established to the originating party. This bridging is represented by line 1726. This results in establishment of a bi-directional voice path between the calling and called parties.

At the same time, the terminating communications switch 1706 transmits a CONNECT signaling message 1730 (or equivalent message) to the originating communications network switch 1704, which sends a CONNECT messages 1732 to the communications handler 1702. The CONNECT message indicates that an end-to-end call has been established, i.e., the call has been answered and audio information may be exchanged.

The above example is illustrated using signaling indications found in the ISDN protocol. Those skilled in the art will recognize that other signaling schemes could be used, such as SIP, which is a common VoIP protocol, or ISUP. In SIP, a message referred to as "180 Ringing" may be conveyed that reflects the call is alerting, e.g., it has been offered to the remote interface. Further, in SIP, a message referred to as "200 OK" may be used to reflect that the call has been answered. Further, an "INVITE" message is used in SIP in lieu of a SETUP message. Those skilled in the art will recognize that a variety of messages and signaling protocols could be used to indicate when the call is being offered to the remote interface and when the call has been answered.

The are two instances of "call pickup time" shown in FIG. 17A. The first instance 1734 is the time (measured at the calling party's interface) from when the called party is alerted of the call (i.e., becomes aware of the ringing or alerting of the telephone) and when the called party answers the call. The other instance 1734 is measured at the called party's interface and reflects the duration from when the originating communication handler is aware the call is offered and answered. While these two instances are closely correlated, they may not be exactly the same, due in part to variations in the delay of transmitting the indications back to the originating communications handler. When the called party is offered the call, the resulting ALERTING message conveyed to the originating party (which in this example is the originating communications handler) has to traverse various network elements and will incur a slight, but variable delay. Similarly, the signaling of the called party answering the call must also be communicated back to the communications handler and may incur a variable delays.

For purposes herein, the analysis of the call pickup time refers to the call pickup time 1734 measured at the originating communications handler, unless stated otherwise. As noted above, the call pickup time closely correlates with the events at the called party interface. The call may be answered by a live person, an answering machine, or a voice mail service. A call pickup timer is defined in the communications handler, which is started upon detection of the ALERTING message 1720 and terminated upon detection of the CONNECT message 1732. In a SIP environment, the call pickup timer may be started upon receiving a "180 Ringing" message and stopped upon receiving a "200 OK" message.

If the call is answered by a live person, the call pickup time may depend on how long it takes for the live person to reach the phone and answer the call. If the person is sitting at a desk where the phone is located when the phone rings, the time to answer the call may take only a second or two. If the person has a mobile phone on their person, this also may take a few seconds to answer. On the other hand, if the person is not located near their phone, it may take more time for them to get to the phone and answer it. Furthermore, if the person cannot get to the phone quickly, then they may not attempt to answer it at all. Rather, they may know they have an answering machine which will pick up the call or that the call will be forwarded to a voice mail service.

An answering machine will typically be configured to answer the call after a configured number of rings. In the context of an answering machine, it is assumed that the telephone number called is a wireline telephone number, as an answering machine is typically not possible to be configured to work with a wireless number. Typically, if the telephone number is wireless, then the mobile carrier provides a voice mail service.

Many answering machines allow the user to select whether the call will be answered in 1, 2, 3, 4, or more rings. Common default settings are 3-5 rings, which allows enough time for the user to pickup the phone if there is a call, but are still short enough to encourage the caller to leave a message. If the device is configured to answer at, e.g., 10 rings, the caller may hang up (abandon) the call before the machine answers the call. The duration of a ring cycle is standardized in the U.S. to be four seconds "on" and two seconds "off". This means the ring cycle is 6 seconds. When a device is configured to pickup after 1 ring, then it will pickup the call around 6 seconds. It is possible that the first ring will be less than a full 6 second ring cycle. If the answering machine is configured to pickup after two or more ring cycles, then typically the pickup will occur based on multiples of 6 seconds, e.g., 2 rings will be approximately 12 seconds, 3 rings will be 18 seconds and 4 rings will be 24 seconds of ringing, etc. If the answering machine is set to answer at 5 or more rings, which is 30 or more seconds, then some callers may abandon their call before the answering machine picks up. Thus, setting the answering machine to pickup after 6 rings (36 seconds) may result in caller abandonment and no message will be recorded.

A statistical pattern may be observed as to how humans answer a landline phone. Consider situations where the user happens to be sitting at a desk with a landline phone. Upon ringing, and assuming the call is answered, there is a high probability that the call will be answered very quickly, within a few seconds or one ring cycle. It is also possible that an answering machine may be configured to quickly pick it up, but typically, an answering machine is set for 3-4 cycles. Thus, if the call is answered less than, e.g., 18 or 24 seconds, it may be more likely that a human is answering the call than an answering machine. If the call is answered greater than 18, 24, or 30 seconds, it may be more likely that the answering machine answered the call.

Figure 17B:
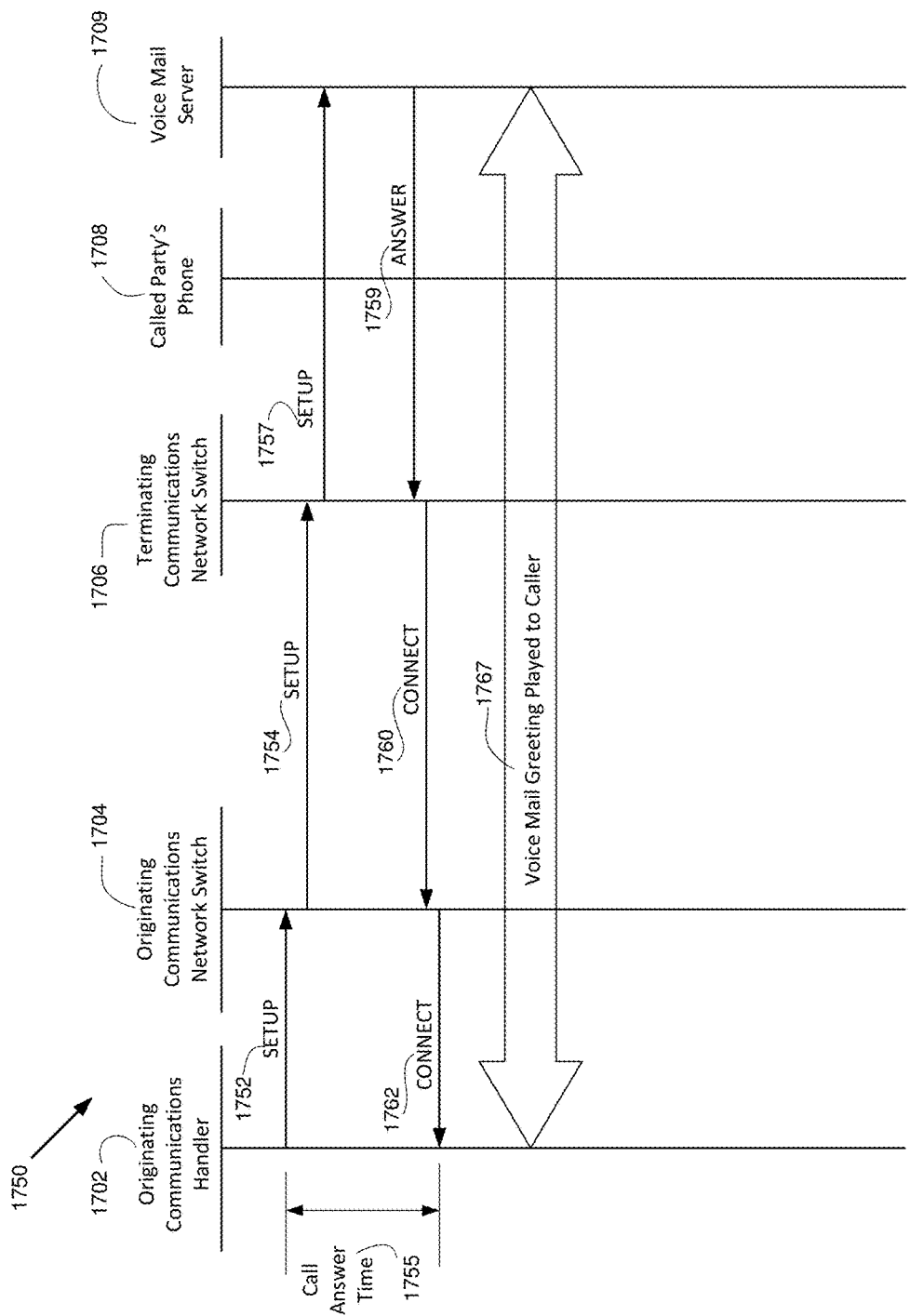

Turning to FIG. 17B, another messaging line diagram 1750 is disclosed that reflects another common situation where the called party has a voice mail service and the call is forwarded to the voice mail server. In the line diagram 1750, a voice mail server 1709 is shown, as are the previously discussed originating communications handler 1702, the originating communications network switch 1704, the terminating communications network switch 1706, and the called party's phone 1708. In one embodiment, the called party's phone may be a wireless mobile phone which is either turned off or presently engaged on a voice call. In either case, an incoming call to the mobile phone will be immediately forwarded to voice mail system. The called party's phone may also be a landline phone. If the phone also involved on a current call, then a second call will also be forwarded to a voice mail service, assuming that the called party has such a network based voice mail service.

This aspect is reflected in the messaging diagram 1750. The originating communications handler 1702 originates the call 1752 to the called party's phone 1708. This results in the originating communications switch 1704 sending a SETUP message 1754 (or equivalent) to the terminating communications network switch 1706. The terminating communications network switch 1706, in turn, determines that the called party's phone cannot be offered the call, so the call is forwarded by establishing a SETUP message 1757 to the voice mail server 1709.

Typically, the voice mail server 1709 will answer a forwarded call immediately, as opposed to sending back a ringing or alerting indication. Thus, the voice mail server will signal that the call is answered by immediately sending back an ANSWER indication 1759 of some sort to the switch. This will cause the terminating communications network switch 1706 to send a CONNECT message 1760 to the originating communications network switch 1704, which in turn causes another CONNECT message 1762 to be sent to the originating communications handler 1702. Contemporaneously, a voice channel 1767 is established, where a voice mail greeting can be played by the voice mail server to the originating communications handler 1702.

In this embodiment, there is no call pickup time as measured between an ALERTING message and a CONNECT message at the calling party's interface. Essentially, the voice mail server immediately answers the call, and so the originating communications handler 1702 does not receive any ALERTING message, as was the case in FIG. 17A. However, the originating communications handler 1702 can start a timer upon originating the call 1752, which is terminated upon receiving the CONNECT message 1762. This timer reflects the call answer time 1755.

In the case where a call pickup time cannot be determined because no ALERTING was received, the call answer time information may be useful. In this case, the fact the call pickup time is non-existent (which can be defined as defaulting to zero) but the call was answered reflects that the call was not offered to the remote interface, but was likely forwarded to a voice mail server. While it is possible that the called party could respond to a SETUP by immediately responding with an Answer indication, typically an ALERTING message would be returned, so that the diagram of FIG. 17A would apply. This is because the called party only knows to answer the phone after it is ringing, at which time the ALERTING indication has been returned back to the originating communications handler. Hence, if the originating communication handler does not see an ALERTING message, then it is unlikely the called party has answered the phone and more likely the call has been forwarded. For the same reason, it is unlikely that the called party has an answering machine, since an answering machine can only answer the call after a ringing indication is provided, which means an ALERTING message was returned.

From this, the following observation may be deduced. Assume an ALERTING indication is received at the originating communications handler (which means the call is not forwarded to a voice mail service). If during a time period of the first ring cycle (e.g., 0-6 seconds) the call is answered, it may presumed that it is more likely that a human, as opposed to an answering machine, has answered the call. In some small number of cases, the answering machine may be configured to immediately answer the call, but this is rare.

A call pickup time in 1-3 ring cycles, or 6-18 seconds, reflects a greater likelihood that a human is answering the call as opposed to an answering machine, since most answering machines are configured to answer after 3 ring cycles. A call pickup time longer than 4 ring cycles, or 24 seconds, reflects an increased likelihood that an answering machine is answering. It may not be clear which is more likely to answer if the call is answered between 3-4 rings.

These relative likelihoods (as between a human or answering machine) of who/what is answering the call is based on the call pickup time. Any statistical analysis can be expected to have exceptions to a rule. However, it is possible to analyze a sampling of answered landline calls and determine a probability curve as to when a live person answers the call versus when an answering machine answers the call.

Irrespective of applying this statistical analysis, it can be surmised that a call that has a 24 or 30 second call pickup time (which is 4 or 5 ring cycles) reflects the time associated with a common default configuration for answering machines. Thus, a call answered 24 or 30 seconds after being offered has a greater probability of being an answering machine. Thus, knowing that the observed call pickup time is a multiple of ring cycles, such as 18, 24, or 30 seconds, can provide improved accuracy and insight in determining whether an answering machine or live person answered the call. In summary, knowing the call pickup time provides additional value to the analysis, which is not obvious from merely analyzing the greeting. Thus, the selection of these values should not be merely construed as selecting a value as a design choice.

In order to perform the statistical analysis of the prior call pickup times, the call pickup timer values may be stored in memory for processing along with related meta-data. Specifically, the call pickup time values may be stored on an aggregate basis (i.e., from a variety of calls) and/or stored for each particular number called, and the determined/observed outcome. Thus, an average of the call pickup times in general may be derived from this data, as well as a standard deviation. This can be determined on an aggregate level for different classes, including all calls: answered by an AVMC, answered by an answering machine, answered by a voice mail service, directed to landline numbers, directed to wireless numbers, directed to a wireless number served by a particular wireless carrier, or directed to a particular number. Thus, if a particular average call pickup time is known for an answering machine to answer a call at a particular number, then this value can be compared to an observed call pickup time on a present call to that number. A close match would then suggest the call has been answered by the answering machine.

In other words, if it is known in advance that the wireline number being called does have an answering machine attached to it, and the average call pickup time for the answering machine is known, then greater confidence occurs that when a call pickup time occurs having a similar value, then the call is more likely to be answered by an answering machine. For example, a wireline number for which it is know that an answering machine picked up the call after 24 seconds means that a current call which is also answered after 24 seconds from being offered is likely to be answered by the answering machine as opposed to a live person. Of course, it is possible that by coincidence a human did also answer the call at 24 seconds, but statistically it is more likely the call was answered by an answering machine.

Alternatively, instead of an answering machine answering the call, the call may be answered by a voice mail system. Such situations can be detected if there is no call pickup time, e.g., there is no ALERTING received at the originating communications handler. In such embodiments, the call is forwarded by the service provider to a voice mail system, which immediately answers the call. If the called party is not on a call or has not turned off their mobile phone, then the call is forwarded after a default amount of time (sometimes called the "rollover time") measured in seconds. This will result in a measured call pickup time at the originating communications handler. Quite often, the voice mail provider forwards the call after a defined number of seconds, as opposed to a defined number of ring cycles. The rollover time may be changed by the called party, but frequently the value is not altered and left at the default value. Further, certain carriers may consistently use a common default value of the rollover time, so that if the call is answered at or near that default value, an increased likelihood may be presumed that the call was answered by a voice mail system, as opposed to a human.

Figure 18:
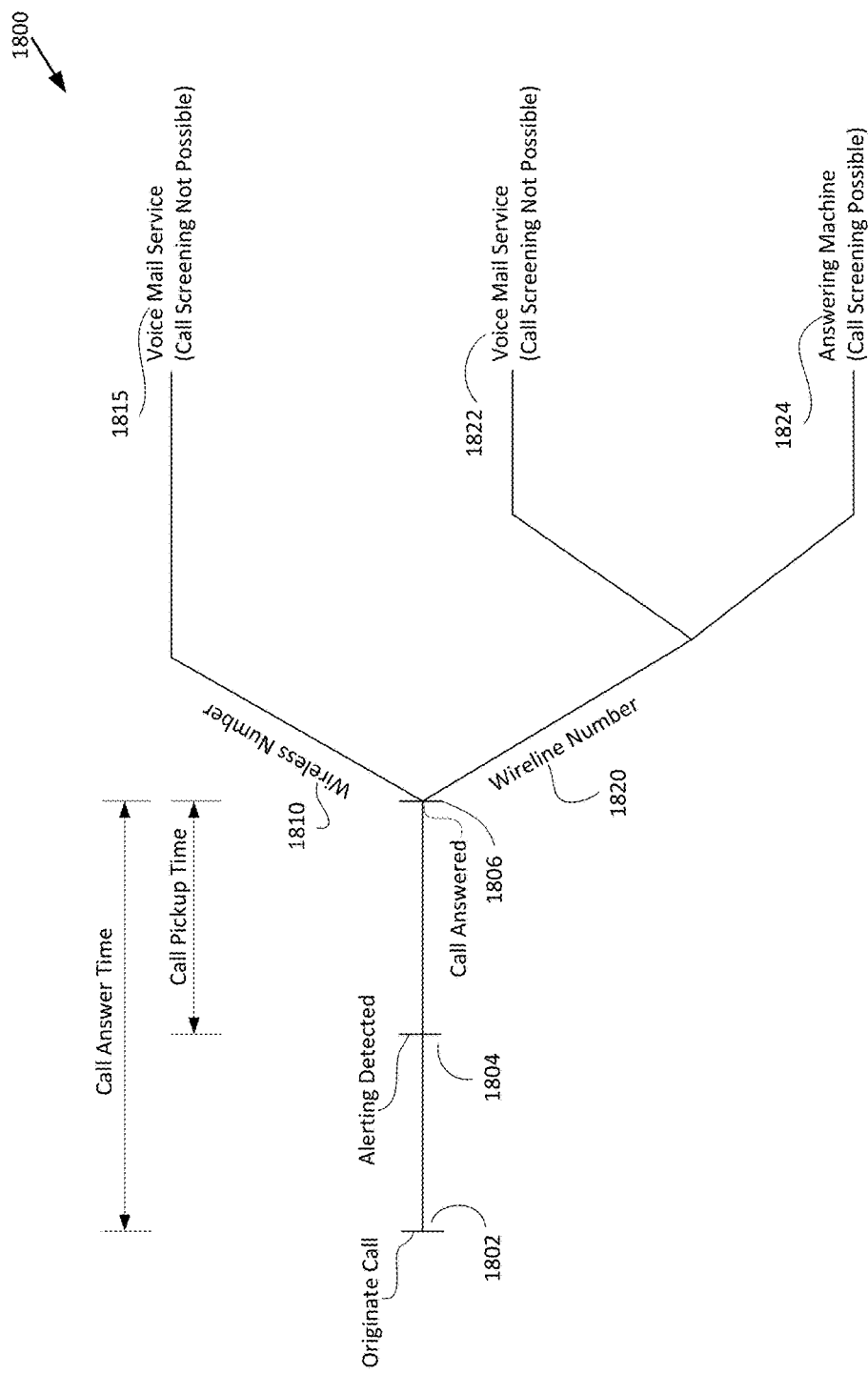
FIG. 18 illustrates various outcomes for when a call may be answered by a voice mail or answering machine.

The various outcomes that are possible as to different types of AVMC systems are illustrated in FIG. 18. The process begins with originating a call by a communications handler at point 1802. A call answer timer may be started. Shortly thereafter, the communications handler will likely receive an alerting indication 1804 of some form, indicating that the call is being offered to the called party's interface. This will cause a call pickup timer to be started. An absence of such alerting followed by an answering of the call suggests the call has been forward to a voice mail service. If the called party is not on another call or has their mobile phone turned off, then the called party's phone will alert the user and the alerting indication will be received at the originating party. Next, the call will be answered. Both the call answer timer and the call pickup timer are stopped.

It may be known prior to originating the call whether the number dialed is a wireless number 1810 or a wireline number 1820. Many contact centers routinely identify the type of number for various regulatory reasons. Thus, one of two branches are followed in FIG. 18. A wireless number 1810 may result the call being directed to a voice mail service as opposed to an answering machine. Once the call is unanswered for a defined amount of time, the call is forwarded to a voice mail system, and the called party cannot answer the call after it is forwarded. In other words, the called party cannot 'screen' their call as is possible with using an answering machine. That is, the called party cannot listen to the message being left by the caller and then barge in by picking up the call.

If the number dialed is a wireline number 1820, then another branch is taken. There are two possibilities. The called party may have a voice mail service 1822, which means the AVMC answering the call is a voice mail system. In this case, call screening is not possible. Or, the called party may have an answering machine 1824, which means that call screening is possible. Specifically, the called party may listen to the message as it is being left by the caller and lift the receiver to join or barge into the call. This screening process allows the called party to retain an additional degree of control in handling their calls, as they can decide in real time whether to answer the call or let the answering machine handle the call. Of course, a live person may answer in any of these flows. The diagram illustrates the different possible scenarios if an AVMC answers the call.

It may be known from prior calls to that wireline number, whether a voice mail service or an answering machine is expected. There are a couple of methods for ascertaining this. In one embodiment, speech analytics may be used to detect a default greeting of a carrier's voice mail service. If the user has not altered the default greeting, this can be detected and from this it can be ascertained that a voice mail service is being used. In another method, the condition of a user screening their call and then picking up to join the call can be detected. The user may speak or enter DTMF digits, which indicates that a live person has jointed. This is not possible with conventional voice mail service offerings, so it indicates that an answering machine is present. Finally, if a call to a landline encounters an AVMC in some instances and a busy condition in others, then this likely reflects the existence of an answering machine. A landline user on a call will result in incoming calls reaching busy (the presence of call waiting will negate this, but nevertheless, the answering machine will not receive the call). However, a landline users on a call having voice mail service will result in in the incoming call being forwarded. This can be detected by a zero call pickup time. While it is possible to receive a busy signal when calling a landline subscriber with voice mail, this is relatively uncommon. Finally, in some signaling protocols, an indication is provided to the originating entity reporting that the call has been forwarded. This can be interested as the call being forwarded to the voice mail system.

Once a determination is made as to whether a voice mail or an answering machine is present, the information can be noted in the communications handler in association with the called number, so that on subsequent calls, this information may be used in determining whether an AVMC or human has answered the call. While it is possible that a user may replace their voice mail service with an answering machine (or vice versa) at a later time (thereby obsoleting this information), this fact pattern situation rarely occurs.

One reason why it may be useful to know whether the AVMC is an answering machine or voice mail system is that the message played to the called party may depend on which type of AMVC device is expected to handle the call. Some announcements or messages played by the originating communications handler may indicate that if the called party is listening to or screening the call (via an answering machine), then the called party can pickup the call and respond by entering DTMF or speaking certain phrases. In response to receiving DTMF or human speech while playing the message, the message may be terminated and an agent may be connected to the call. While the called party cannot respond in this way if the call is forwarded to a voice mail system, call screening is possible if the call is answered by an answering machine. Thus, if the call is directed to a voice mail system, the message selected to be played to the voice mail system may not incorporate such options. On other hand, if it is known the call may be answered by an answering machine, then knowing the type of AVMC may impact the message played.

Figure 19A:
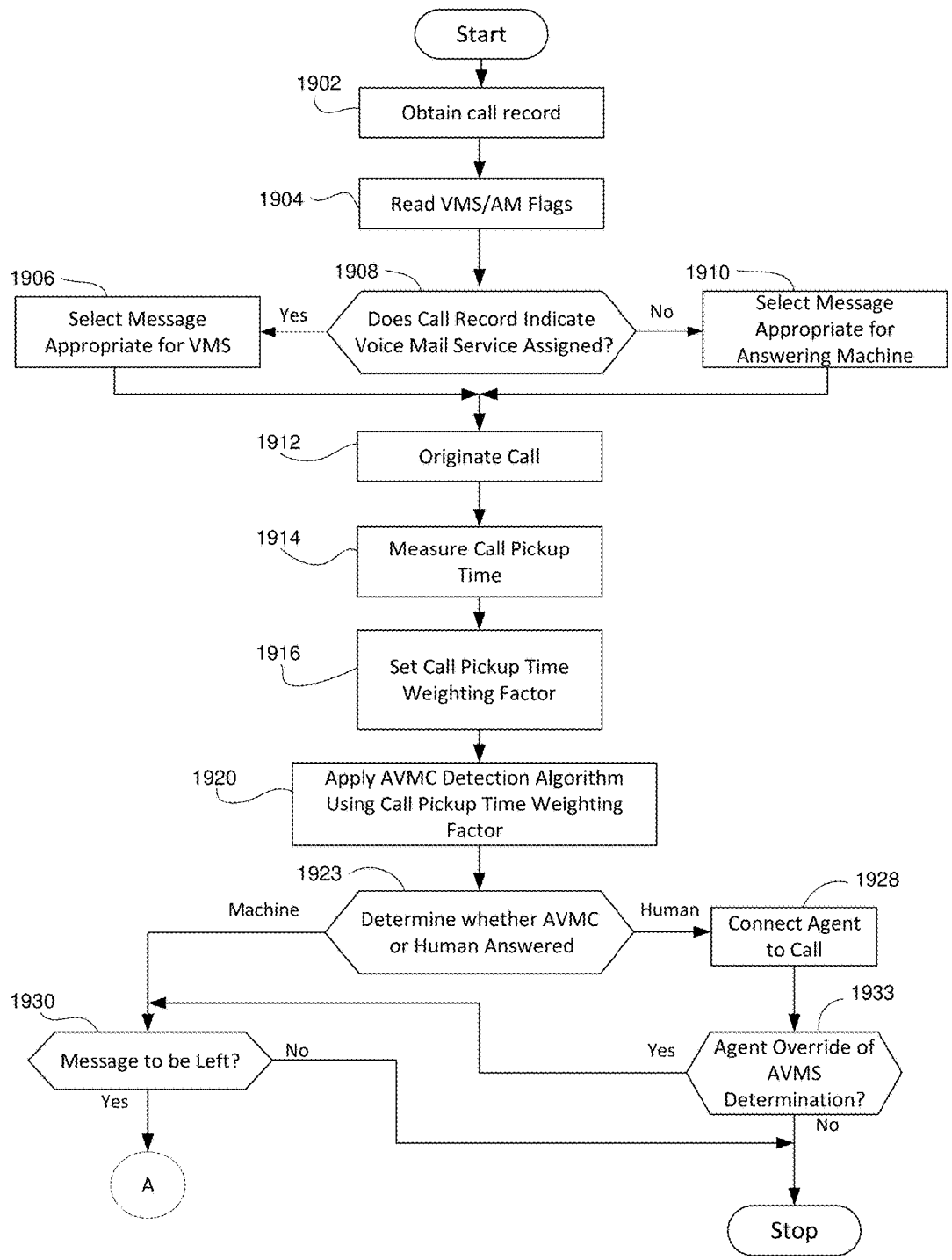
FIGS. 19A-19B illustrate a process flow associated with using call pickup time in determining whether the call was answered by a live person or an automatic voice messaging capability.
Figure 19B:
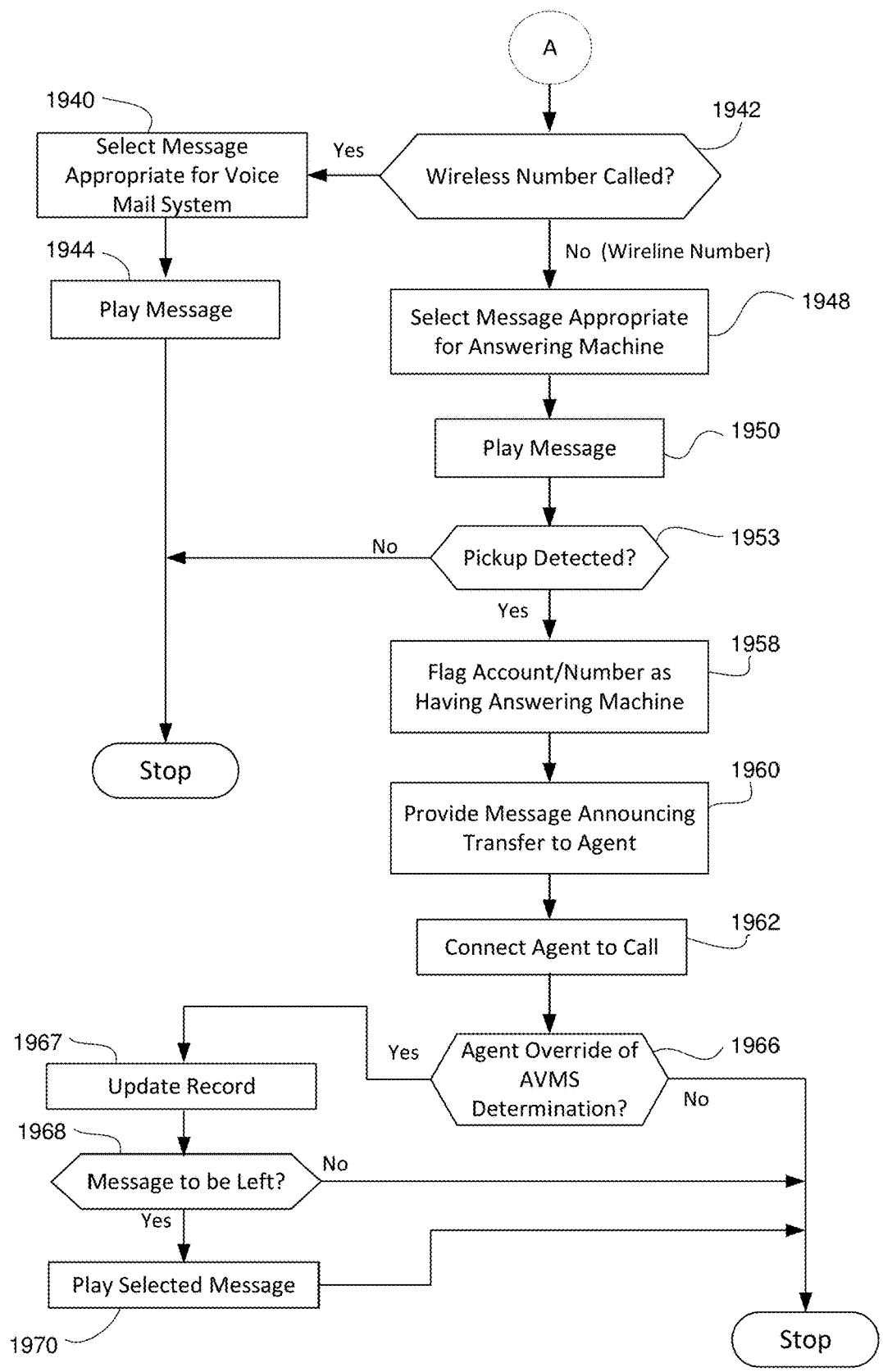

One embodiment of the application of these concepts is reflected in the process flow of FIGS. 19A-19B. Turning to FIG. 19A, the process flow begins with retrieving a call record to be dialed in operation 1902. In this embodiment, the call record may indicate various parameters, such as whether prior calls encountered an AVMC, where it was an answering machine, voice mail service, or whether no AVMC was encountered at all. Further, information may be stored indicating a prior average call pickup time or specific call pickup time for the last call. Other information may indicate a relative weighting (referred to herein as a "call pickup time weighting factor" or "CPTW-F") used in determining whether the AVMC answered the call, as opposed to a live person. In other embodiments, information in the call record may be used to access other systems which store this information.

For example, prior calls may have resulted in the call being answered, which were determined to have been answered by a human, and resulted in an agent being connected to the call. However, the agent may have overridden this determination or otherwise indicated that an error occurred in determining that a live person was detected. The occurrence of such an error, along with a relative score as to the likelihood of the AVMC determined for that call, could be recorded for later analysis. For example, a AVMC score from 0-100 may be defined, with 0 reflecting a strong likelihood of a human and 100 reflecting a strong likelihood of an AVMC. A score of 50 represents a very determination that it is more likely to be an AVMC than a human (by only the slightest amount) and a score of 49 represents a very slight determination that it is more likely to be a human than an AVMC. Thus, modifying a score from 49 to 51 would indicate a change in the likely outcome. These scores and the outcome could be stored for this account for this telephone number. For example, a score of 49 may have been previously reported for a call along with an indication of an agent override that the call was in fact answered by a live person. On subsequently calls, a score of, e.g., 49 may again be generated. The communications handler could use this prior information and determine that the call was actually answered by an AVMC based on prior history. Similarly, the information could indicate that an initial determination that an AVMC answered the call was incorrect and should be treated as a live person answering the call.

This prior outcome information is read in operation 1904. In some instances, prior information may be used to determine whether an AVMC or live person answered, or which particular AVMC type is likely to be encountered. If the information indicates that a voice mail service is present or expected in operation 1908, then the appropriate message may be selected in operation 1906 (assuming a message is to be played; if not, then this operation may be skipped). Otherwise, a message may be selected in operation 1910 appropriate for an answering machine. If the same message is to be played in either situation (or if no message is to be played at all), then it is not necessary to make this distinction.

Next, the call is originated in operation 1912. The communications handler will measure the call pickup time in operation 1914 by determining the duration between the ALERTING and Answering indications. This information may be stored in a data store. The call pickup time for the current call may be used to compare it against other values in general or other values encountered when dialing that particular number, in operation 1916. For example, a call pickup time of 10 seconds may result in setting a CPTW-F favoring that a human picked up the call. Or, if the call pickup time was 24 seconds, then a CPTW-F may be generated that favors that an AVMC picked up the call. If the call pickup time is zero (because no ALERTING message was received), then it is known that the call was forwarded to a voice mail system (this step not shown in FIG. 19A). This suggests the all was answered by an AVMC.

The CPTW-F from operation 1916 is used with the AVMC detection algorithm in operation 1920. The AVMC detection algorithm may be based on the concepts disclosed herein, or other algorithms, provided that they are amenable to application of a weighting factor. Many AVMC detection algorithms generate a score, which is applied against a threshold, for determining whether the call has been answered by a live person or AVMC. The CPTW-F weighting factor could be applied that increases (or decreases) the score based on call pick up time, prior AVMC flags, etc. The CPTW-F could be a factor that is multiplied with an initial determination of the score to then increase (or decrease) it to generate a final score.

For example, the AVMC may generate a score of 49, which suggests the call was answered by a human based on processing the speech. However, prior to the call being answered, information from prior call attempts indicates that no AVMC was ever detected. That is, prior calls may have gone unanswered for 45 seconds, which suggests no answering machine or voice mail service is present. If so, the AVMC score may be modified by the AVMC weighting factor suggesting that it not a close case, but most certainly a human answering the call. In other example, the CPTW-F may alter the determination, indicating that the score of 49 is inaccurate, and should be incremented by 10% (i.e., the CPTW-F is 1.1 or 110%) which when multiplied by the score of 49 increases it to over 50, thereby suggesting that the call has been answered by an AVMC.

The determination of whether an AVMC or a live person answered the call is reflected in operation 1923, which takes into account the call pickup time (i.e., using the aforementioned CPTW-F) in determining whether the call has been answered by a live person or AVMC. Note that not all embodiments will incorporate consideration of the CPTW-F. If the determination is that a human has answered the call, then the process continues by connecting an available agent in operation 1928 to the call. The agent may determine the classification is correct in operation 1933 and proceed as normal, and the process is completed. If the agent determines the classification is incorrect in operation 1933, and the call has been actually answered by an AVMC, then the process continues to operation 1930. This is, the same operation occurs as if an AVMC was determined to have answered the call in operation 1923.

If no message is to be left in operation 1930, the call may be terminated (not shown) and the process is completed. If a message is to be left, then the process continues to label A, which continues to FIG. 19B.

Turning to FIG. 19B, the process continues with determining the type of number (wireless or wireline) that was called in operation 1942. If the number is a wireless number, then the only type of AVMC that can be associated with that number is voice mail service. Thus, a message appropriate for a voice mail system may be selected in operation 1940. If a prior message was selected that was inappropriate for a voice mail system, then an appropriate one can be selected at this point. The message is then played in operation 1944 after the voice mail greeting is completed.

If the number is a wireline number in operation 1942, then the AVMC may be either a voice mail system or an answering machine. This process flow presumes that prior information from earlier calls does not sufficiently indicate what type of AVMC is present. Consequently, a message is played in operation 1950 that is suitable for an answering machine. If the message is played to a voice mail system, then no harm will occur, but any prompt for the called party to pick up will not be heard by the called party. That is, the called party can never screen their calls with a voice mail system.

If, however, a pickup is detected in operation 1953 when the message is played, then it can be ascertained that the called party has an answering machine. The message played to the called party may include language stating, e.g., "This message is for John Doe, please call us back immediately at 404-555-1212, or pickup this call if you are screening this call and enter the star key." This type of message is intended to encourage a call pickup during call screening and can only occur if an answering machine answers. If a voice response or DTMF tone is heard, then this likely means that a person is screening their call and has picked up the call.

If a pickup is detected in operation 1953, then the account can be flagged in operation 1958 as having an answering machine associated with it. Further, the current message can be terminated (not shown) and an additional message can be provided in operation 1960 indicating that an agent will be connected shortly, and that the called party should remain on the line. The call is then connected to an agent in operation 1962.

It is possible that a misclassification could occur by the system when detecting a pickup. That is, the system could have erroneously determined that a live person picked up the call, but the agent after being connected, may override this determination in operation 1966. If so, then the process continues by updating the call record to reflect that an AVMC was detected based on an agent override in operation 1967. Knowing that an agent override occurred can be used to fine tune the detection algorithm. If a message is to be left in operation 1968, then it is provided in operation 1970 and the process terminates. If the message is not to be provided, then the process terminates.

Figure 20:
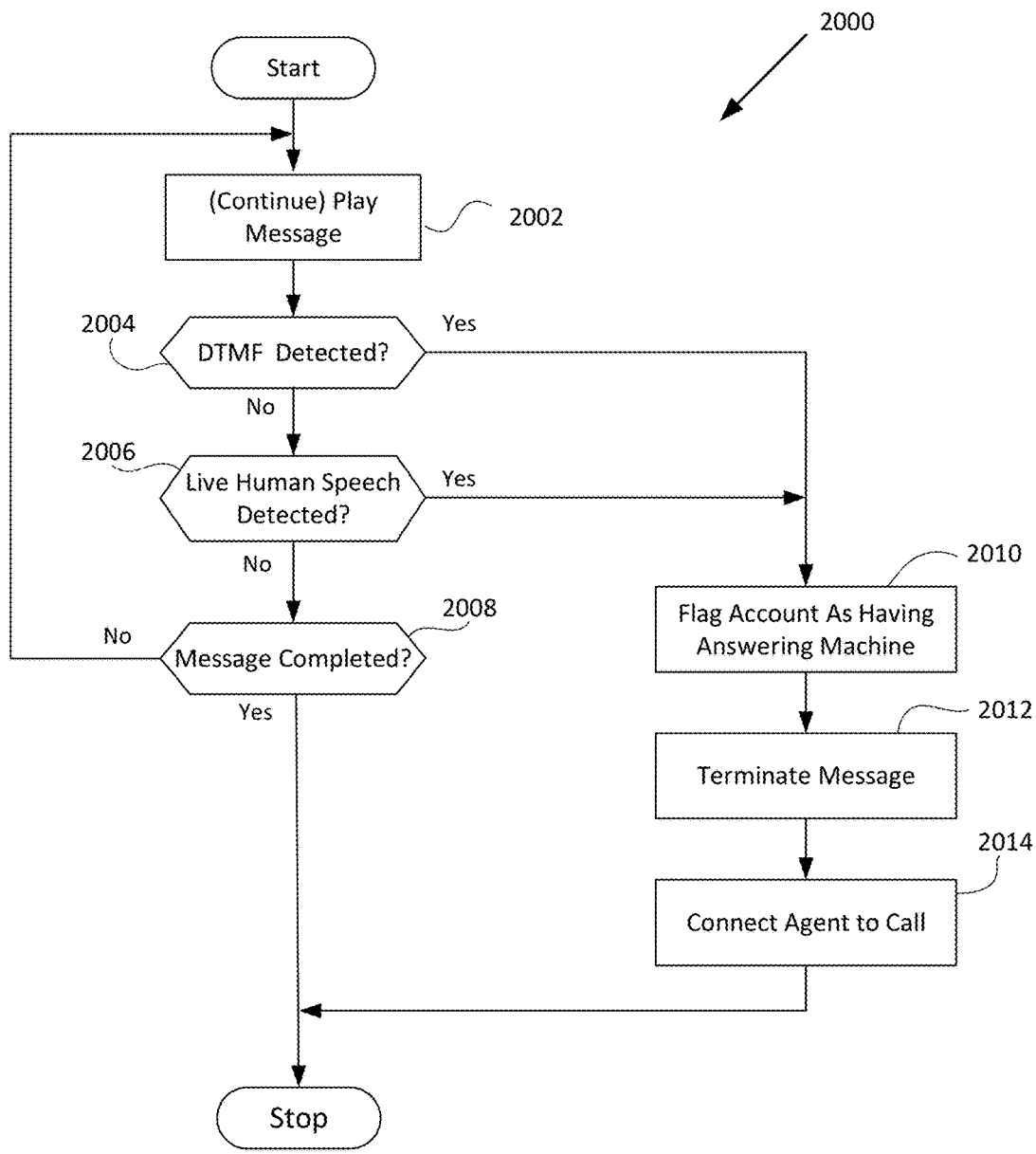
FIG. 20 illustrates a process flow for detecting a live person picking up a call while screening the call after the call was answered by an answering machine.

The process for playing the message in operation 1950 and detecting a pickup in operation 1953 is elaborated in process 2000 shown in FIG. 20. This process reflects how an answering machine may be detected after an AVMC is determined to have answered the call. The process begins with playing the message (or continuing to play the message) in operation 2002. The message may be of the form where a potential listener may be prompted to speak or enter DTMF digits, in case they are screening their calls. If DTMF is detected in operation 2004, or if live human speech is detected in operation 2006, then this indicates the called party was screening their calls.

If this is detected, then the communications handler may flag the account has having an answering machine associated with it in operation 2010. This information may be accessed for subsequent calls and used to indicate whether an answering machine may be expected or not. This may impact which announcement are selected, whether certain resources are allocated to the call, etc. The message played is terminated in operation 2012 and an agent is connected to the call in operation 2014. The process then completes.

If no DTMF is detected in operation 2004, and if no live human speech is detected in operation 2006, then a subsequent test in operation 2008 determines whether the greeting is completed. If not, then the process loops back to operation 2002, where the message is played and input for DTMF or live human speech continues to be monitored. Once the message is completed as determined in operation 2008, then the process is completed.

Related Actions when Detecting Call Screening

A contact center may frequently record calls involving a live person. However, a contact center typically will not record calls that are answered by an AVMC. Thus, a communications handler is configured to not record any call for which an AVMC is detected as having answered the call. However, as noted above, if a call to a wireline number encounters an answering machine, which is detected as such by the communications handler, then it is possible that the called party may be screening their calls, and the called party may pickup the call while a message is being left on their answering machine. Thus, even when an AVMC (consisting of an answering machine) is detected, it may be appropriate to record the call on the chance the called party may pickup the call while a message is being play on the answering machine. On the other hand, the call may be recorded once the message is being played to the AVMC and if a human pickup is not detected, then the communications handler can discard the recording, since no human was detected. Alternatively, call recording can commence once it is determined that the call party has screen the call and picked up.

Similarly, the communications handler may attach a real time speech analytics system in response to detecting a human in such a situation. The communications handler may normally not connect a real time speech analytics system when detecting an AVMC, but may do so if an answering machine is known to have answered or if a live person picks up the call that is being screened.

Application of Call Pickup Time with Other AVMC Detection Algorithms

The analysis of call pickup time (i.e., prior to call establishment) can be combined with any of the aforementioned AVMC detection algorithms. Any of the aforementioned techniques could be augmented or modified by using the call pickup time analysis. For example, the timer-based AMD analysis approach could be modified or incorporate the call pickup time analysis. In some phone calls, the called party may be located near the phone (e.g., located working at a desk) and may answer their phone in short order. The ringing duration may be on the order of a second or two. In such cases, the called party may provide a short, rapid greeting to the caller. Specifically, the called party may hear the phone ring, and quickly answer it by quickly stating "hello." The fact that the call is quickly answered may by itself suggest a human has answered the phone, since the AVMC is typically configured to answer the phone only if the called party does not have time to answer the call. Specifically, the AVMC is typically not configured to answer the phone under e.g., two seconds. Further, the fact that a terse greeting is provided further suggests that a human has answered the phone. Many times an AVMC is not configured to provide a one-word greeting (either as a default greeting or one that the called party typically has recorded). Thus, the presence of a short call pickup time coupled with a short greeting is more suggestive of a human answering the call than either event, by itself, would suggest. Thus, turning to FIG. 1, a short call pickup time and a short Time Period A (initial silence) and/or a short Time Period F (duration of greeting) is suggestive of a live person.

In this embodiment, the CPTW-F may be defined so that a value of 1 (e.g., 100%) reflects a neutral expectation of whether the call has been answered by an AVCM or a live person. A value less than 1 may reflect a live person is more likely, while a value greater than 1 may reflect an AVCM is more likely. Thus, the CPTW-F for a quickly answered call may be e.g., 0.8 or 80%. The AVMC algorithm that analyzes the greeting may determine a score of 45, which suggests a live person. Applying the CPTW-F algorithm to the AVMC score (0.8*45=36) in this example strongly suggests a live person answered the call more so than just relying on the AVMC algorithm and the score it produces.

In another potential application, a long call pickup time coupled with certain types of analysis of the greeting may also suggest the presence of a live person answering the phone. For example, as noted earlier, many AVMCs are configured to answer the phone after 4 or 5 ring cycles, which is 24 or 30 seconds. It is possible that the called party may have to rush to the phone to answer the call, before the AVMC answers the call. In such situations, the called party may "race" to the phone to answer in order to answer it before the AVMC does. In such situations, upon answering the call, the called party may utter a short greeting, such as "Yes" or "Hello." Again, a relatively long call pickup time followed by a short greeting, or one in which a speech analytics system detects only a single word as a greeting, may strongly suggest a live person has answered the call. On the other hand, a long call pickup time (corresponding to 4 or 5 ring cycles) coupled with a long greeting, or one that includes, e.g., detection of specific words, may strongly suggest an AVMC answered the call.

In some embodiments, an RTSA system will be attached to the call for the purpose of analyzing specific words. The detection of certain words by a speech analytics system in a greeting may suggest an AVMC. Typical phrases in an AVMC greeting may include: "not home", "not here", "can't answer", or "leave a message." Other phrases, such as the presence of a number (as in, "You have reached 555-1212") are typically not used in the greeting by a live person and are suggestive of a recorded greeting provided by an AVMC. If the call pickup time occurs at e.g., 24 seconds (which is four ring cycles), then this only bolsters the determination that an AVMC has answered the phone.

One simple algorithm for bolstering the determination of the source of the greeting is to modify a score reflective of an outcome (i.e., an outcome score) by using the CPTW-F that increases or decreases the score by a percentage, where the weighting factor is derived from the call pickup time. However, in other embodiments, the application of the CPTW-F may modify the duration of the AMD analysis of the greeting, so that a determination of the outcome score may be made faster and without a decrease in accuracy. For example, a very short call pickup time coupled with a short initial greeting message may allow the greeting type indication to be generated faster and with greater accuracy, than if the call pickup time was not considered in the analysis. Thus, if a typical AVCM algorithm takes up to a maximum of 5 seconds if the initial analysis indicates a level of uncertainty, the duration of the analysis may be shortened in some instances to 1 or 2 seconds, without sacrificing accuracy. Thus, when the CPTW-F increases the confidence of a current analysis of the greeting, the processing may be terminated earlier rather than extending the greeting analysis.

Exemplary Computer Processing Device

Figure 21:
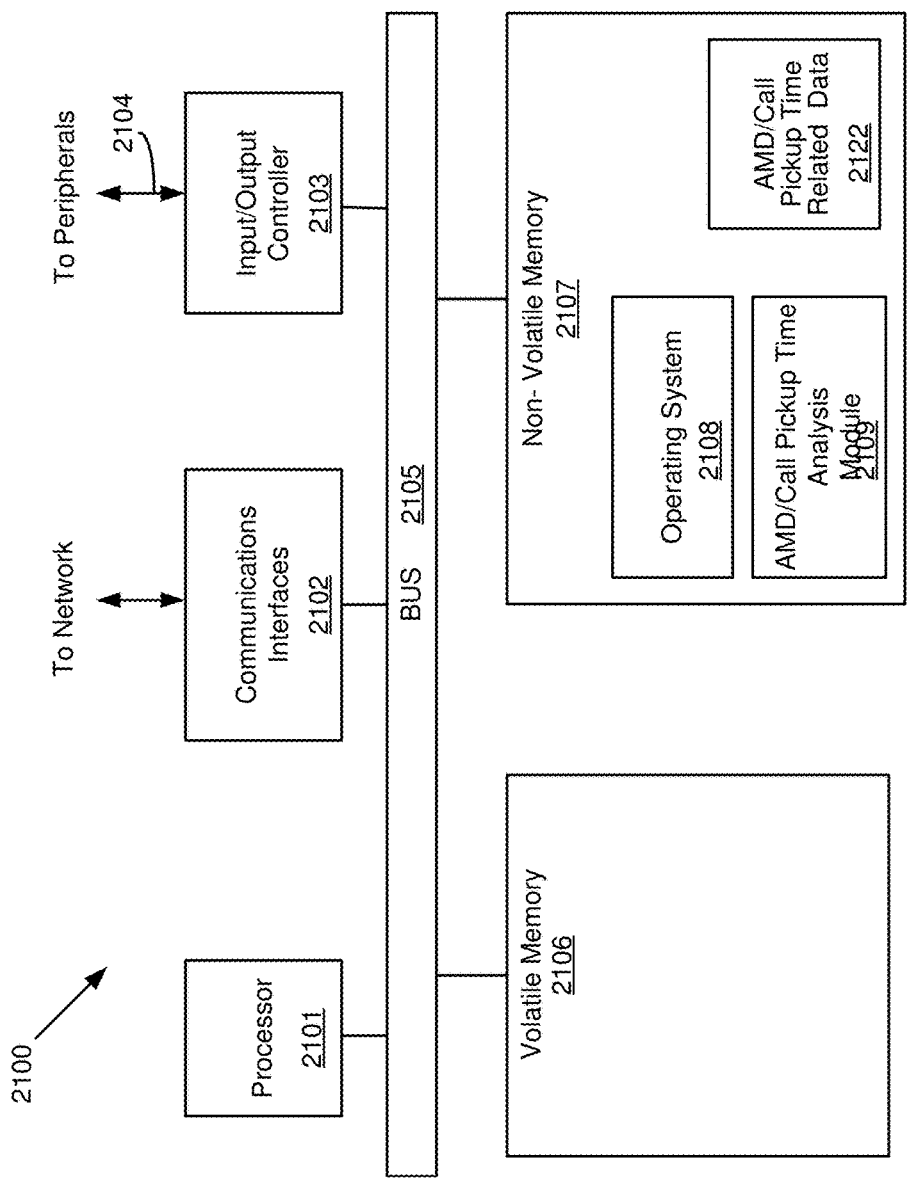
FIG. 21 illustrates one embodiment of a processing component that may be used in conjunction with the concepts and technologies presented herein.

FIG. 21 is an exemplary schematic diagram of a computer processing system that may be used in embodiments of various architectures, such as components shown in the architecture 200 of a contact center in FIG. 2 to practice the technologies disclosed herein. In general, the term "computer processing system" may be exemplified by, for example, but without limitation by any specially configured or programmed: personal computer, server, desktop computer, tablet, smart phone, notebook, laptop, distributed processing system, server, blade, and the like, as well as any combination of devices or entities adapted to perform the functions described herein, such that the resulting system is a specialized processing system configured to perform the functions and capabilities disclosed herein. The computer processing system may also be a specially configured system, designed to optimize the operation of the component in the contact center based in part on the specialized software configured to perform the functions disclosed herein. For example, the "communications handler" could be a computer processing system that is specially configured to perform the functions disclosed herein. A "communications handler" as used herein would be interpreted by one skilled in the art as a special purpose processing system, performing functions that are not typical of a generic computer. This also may be the case for the other components disclosed herein including the various dialing components, SMS gateway, RTSA components, dialing list storage systems, etc.

As shown in FIG. 21, the processing system 2100 may include one or more computing processors 2101 that is configured to communicate with other elements within the processing system 2100 via a bus 2105. The computing processor 2101 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. In many cases, in order to perform the necessary analysis, such as determining frequencies, energy level, etc. of the audio signal, this will requires something more than a general purpose computer processor, such as a DSP processor.

In one embodiment, the processing system 2100 may also include one or more communications interfaces 2102 for communicating data via a network (such as LAN 170 from FIG. 1) with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 2103 may also communicate with one or more input devices or peripherals using an interface such as, but not limited to: a keyboard, a mouse, a touch screen/display input, microphone, pointing device, etc. The input/output controller 2103 may also communicate with output devices or peripherals, such as displays, printers, speakers, headsets, banner displays, etc.

The computing processor 2101 may be configured to execute instructions stored in volatile memory 2106, non-volatile memory 2107, or other forms of computer readable storage media accessible to the processor 2101. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2107 may store program code and data, which also may be loaded into the volatile memory 2106 at execution time. For example, the non-volatile memory 2107 may store one or more modules 2109 that may perform the above-mentioned process flows and/or operating system code 2108 containing instructions for performing the process and/or functions associated with the technologies disclosed herein. The AMD/Call Pickup Time analysis module(s) 2109 may also access, generate, process, or store related AMD/Call Pickup Time data 2122, including, for example, the data described above in conjunction with performing the various aspects of the aforementioned analysis in the non-volatile memory 2107, as well as in the volatile memory 2106. This would include, but is not limited to: AMD meta-data, AMD parameter sets, call pickup times, average data values from prior calls, timer values, account related data, call records, or any other data used to perform the disclosed functions and concepts. The volatile memory 2106 and/or non-volatile memory 2107 may be used to store other information including, but not limited to: records, applications, programs, scripts, source code, object code, byte code, compiled code, interpreted code, machine code, executable instructions, or the like. These may be executed or processed by, for example, the computing processor 2101 and may form a part of, or may interact with, the module(s) 2109. The module 2109 is shown as being the AMD/Call Pickup Time analysis module, but it could be an RTSA processing module, timer-based AMD module, or any other module used to perform the concepts disclosed herein.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for determining whether a call originated by a contact center to a telephone number was answered by an automatic voice messaging capability ("AVMC") or a live person, the method comprising:
   originating the call from a call handler in the contact center by signaling to a communication service provider;
   starting a call pickup timer in the call handler in response to receiving a first signaling indication comprising a "180 Ringing" SIP message from the communication service provider reflecting the call is offered to a called party;
   stopping the call pickup timer in the call hander in response to receiving a second signaling indication comprising a "200 OK" SIP message from the communication service provider reflecting the call was answered by the called party, whereby a value of the call pickup timer is determined by a duration between starting the call pickup timer and stopping the call pickup timer;
   using the value of the call pickup timer in part to determine whether the call was answered by the AVMC or the live person; and
   connecting the call by the call handler to an agent in response to determining the call was answered by the live person.

2. The method of claim 1, further comprising:
   analyzing a greeting detected on the call to determine a preliminary determination whether the greeting was provided by the AVMC or the live person;
   using the value of the call pickup timer to ascertain a call pickup time weighting factor; and
   using the call pickup time weighting factor and the preliminary determination to determine the call was answered by the live person.

3. The method of claim 2, wherein the value of the call pickup timer is less than 24 seconds.

4. The method of claim 1, further comprising:
   retrieving historical call pickup timer data derived from prior calls;
   comparing the value of the call pickup timer to the historical call pickup timer data to ascertain a call pickup time weighting factor; and
   using the call pickup time weighting factor and a preliminary determination of whether the greeting was provided by the AVMC or the live person to determine the call was answered by the live person.

5. The method of claim 1, further comprising:
   receiving an agent override indication reflecting the greeting originated from the AVMC; and
   terminating the call in response to receiving the agent override indication.

6. The method of claim 1, further comprising:
   storing the value of the call pickup timer in association with the telephone number.

7. A system for determining a call originated by a contact center to a telephone number of a called party was answered by an automatic voice messaging capability ("AVMC") or a live person, the system comprising:
   a call handler comprising a computer processor configured to:
      originate the call to a communication service provider using a Voice over Internet Protocol ("VoIP") signaling protocol;
      start a call pickup timer in response to receiving a first signaling indication comprising a "180 Ringing" SIP message from the communication service provider reflecting the call is offered to the called party;
      stop the call pickup timer in response to receiving a second signaling indication comprising a "200 OK" SIP message from the communication service provider reflecting the call was answered by the called party, thereby determining a value of the call pickup timer;
      use the value of the call pickup timer in part to determine whether the call was answered by the AVMC or the live person; and
      connect the call to an agent in response to determining the call was answered by the live person.

8. The system of claim 7, wherein the computer processor is further configured to:
   analyze a greeting of the call to determine a preliminary determination whether the greeting was provided by the AVMC or the live person;
   use the value of the call pickup timer to ascertain a call pickup time weighting factor; and
   use the call pickup time weighting factor and the preliminary determination to determine the call was answered by the live person.

9. The system of claim 7, wherein the computer processor is further configured to:
   retrieve historical call pickup timer data derived from prior calls; and
   compare the value of the call pickup timer to the historical call pickup timer data to ascertain a call pickup time weighting factor.

10. The system of claim 7, wherein the computer processor is further configured to:
    receive an agent override indication reflecting the greeting originated from the AVMC; and
    terminate the call in response to receiving the agent override indication.

11. The system of claim 10, wherein the computer processor is further configure to terminate recording after receiving the agent override indication.

12. A non-transitory computer readable medium storing instructions that when executed by a computer processor cause the computer processor to:
- originate a call by a call handler in a contact center to a communication service provider using a Voice over Internet Protocol ("VoIP) signaling protocol;
- start a call pickup timer in response to receiving a first signaling indication comprising a "180 Ringing" SIP message from the communication service provider reflecting the call is offered to a called party;
- stop the call pickup timer in response to receiving a second signaling indication comprising a "200 OK" SIP message from the communication service provider the call was answered by the called party, thereby determining a value of the call pickup timer; and
- use the value of the call pickup timer in part to determine whether the call was answered by an automatic voice messaging capability ("AVMC") or a live person.

13. The non-transitory computer readable medium of claim 12, wherein the instructions when executed by the computer processor further cause the computer processor to:
- analyze a greeting of the call to generate a preliminary determination whether the call was answered by the AVMC or the live person;
- use the value of the call pickup timer to ascertain a call pickup time weighting factor; and
- use the call pickup time weighting factor and the preliminary determination to determine the call was answered by the live person.

14. The non-transitory computer readable medium of claim 12, wherein the instructions when executed by the computer processor further cause the computer processor to:
- determine the call been answered by an AVMC;
- provide an announcement to the AVMC;
- detect either dual tone multiple frequency ("DTMF") tones or speech from a live person while the announcement is being provided to the AVMC;
- terminate providing the announcement to the AVMC in response to detecting either DTMF tones or speech; and
- connect the call to an agent.

15. The non-transitory computer readable medium of claim 12, wherein the instructions when executed by the computer processor further cause the computer processor to:
- determine a greeting has been provided by the live person;
- connect the call to an agent;
- receive an agent override indication from the agent reflecting the greeting was not provided by the live person but by the AVMC; and
- terminate the call after receiving the agent override indication.

16. The non-transitory computer readable medium of claim 15, wherein the instructions when executed by the computer processor further cause the computer processor to:
- record an indication associated with a called telephone number of the call reflecting that an AVMC was detected on a prior call to the called telephone number.

* * * * *